United States Patent
Hu et al.

(10) Patent No.: US 8,918,238 B2
(45) Date of Patent: Dec. 23, 2014

(54) MACKAY COLD-EXPANSION ENGINE SYSTEM

(76) Inventors: Lung-Tan Hu, Langley (CA); Gordon Ching Chen, Burnaby (CA)

( * ) Notice: Subject to any disclaimer, the term of this patent is extended or adjusted under 35 U.S.C. 154(b) by 1113 days.

(21) Appl. No.: 12/798,744

(22) Filed: Apr. 12, 2010

(65) Prior Publication Data

US 2011/0251743 A1  Oct. 13, 2011

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC .......................................................... 701/22

(58) Field of Classification Search
CPC ....... Y02T 10/14; F02B 41/06; F02B 75/021; F02B 75/02; F02B 41/08
USPC .......................................................... 701/22
See application file for complete search history.

(56) References Cited

U.S. PATENT DOCUMENTS

| | | | | |
|---|---|---|---|---|
| 1,601,548 | A * | 9/1926 | Zier et al. | 123/58.1 |
| 3,623,463 | A * | 11/1971 | De Vries | 123/70 R |
| 4,159,699 | A * | 7/1979 | McCrum | 123/58.8 |
| 4,202,300 | A * | 5/1980 | Skay | 123/432 |
| 4,351,290 | A * | 9/1982 | Melchior | 123/58.7 |
| 5,056,471 | A * | 10/1991 | Van Husen | 123/51 R |
| 5,213,067 | A * | 5/1993 | Kramer | 123/51 BA |
| 5,243,938 | A * | 9/1993 | Yan | 123/197.1 |
| 5,265,564 | A * | 11/1993 | Dullaway | 123/70 R |
| 5,456,219 | A * | 10/1995 | Clarke | 123/42 |
| 5,509,382 | A * | 4/1996 | Noland | 123/66 |
| 5,542,382 | A * | 8/1996 | Clarke | 123/51 AA |
| 5,566,549 | A * | 10/1996 | Clarke | 60/620 |
| 5,785,015 | A * | 7/1998 | Philippe et al. | 123/70 R |
| 6,026,769 | A * | 2/2000 | Anbarasu et al. | 123/70 R |
| 6,318,310 | B1 * | 11/2001 | Clarke | 123/70 R |
| 6,508,223 | B2 * | 1/2003 | Laimbock et al. | 123/195 P |
| 6,698,405 | B2 * | 3/2004 | Bigi | 123/560 |
| 6,841,497 | B1 * | 1/2005 | Krell et al. | 501/153 |
| 6,852,923 | B2 * | 2/2005 | Perry et al. | 174/50 |
| 6,871,497 | B2 * | 3/2005 | Isogai | 60/598 |
| 6,880,501 | B2 * | 4/2005 | Suh et al. | 123/70 R |
| 6,952,923 | B2 * | 10/2005 | Branyon et al. | 60/597 |
| 6,994,057 | B2 * | 2/2006 | Loth et al. | 123/27 R |
| 7,017,536 | B2 * | 3/2006 | Scuderi | 123/70 R |
| 7,146,966 | B2 * | 12/2006 | Nakamura | 123/481 |
| 7,201,156 | B1 * | 4/2007 | Wait | 123/556 |

(Continued)

*Primary Examiner* — Khoi Tran
*Assistant Examiner* — Harry Oh

(57) ABSTRACT

The present invention provides an integrated engine system; said integrated engine system includes an air-compressor, an air-buffer-system, a power-management-unit, and a cold-expansion-chamber for operating a Mackay Cold-Expansion cycle, which includes a first-intake-process, a hot-combustion-process, a fuel-cooling-process, a second-intake-process, a cold-expansion-process, and an exhaust-process; said air-buffer-system supplies a cooled compressed air to be injected during said first-intake-process, and a heated compressed air to be injected during said second-intake-process; an air-fuel mixture is ignited to produce a hot-expansion-medium during said hot-combustion process, and the hot-expansion-medium is cooled by a fuel vaporization and an injection of heated compressed air to produce a cold expansion medium at an optimal expansion temperature, thereby accelerating the conversion of carbon-monoxide to carbon dioxide in the cold-expansion-medium and reducing heat loss.

14 Claims, 43 Drawing Sheets

(56) References Cited

U.S. PATENT DOCUMENTS

| | | | |
|---|---|---|---|
| 7,383,798 B1* | 6/2008 | Antonov et al. | 123/70 R |
| 7,628,126 B2* | 12/2009 | Scuderi | 123/70 R |
| 7,748,352 B2* | 7/2010 | Zajac | 123/68 |
| 2009/0277403 A1* | 11/2009 | Hu | 123/64 |
| 2009/0277404 A1* | 11/2009 | Hu | 123/64 |
| 2010/0012058 A1* | 1/2010 | Hu | 123/58.1 |
| 2010/0012082 A1* | 1/2010 | Hu | 123/301 |
| 2010/0018479 A1* | 1/2010 | Hu | 123/58.1 |
| 2010/0018480 A1* | 1/2010 | Hu | 123/58.1 |

* cited by examiner

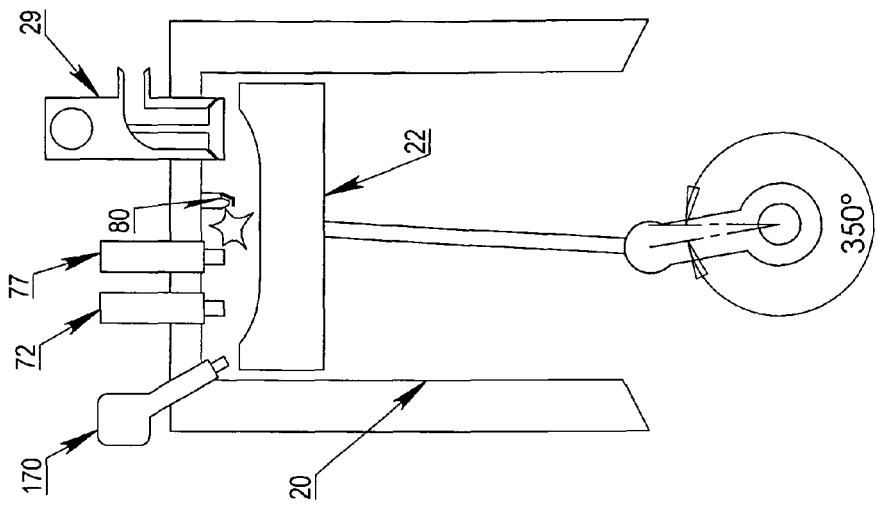
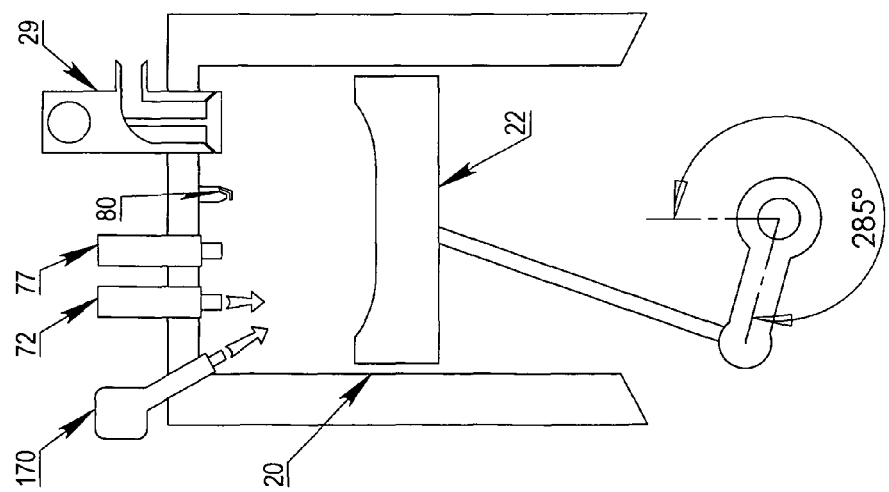

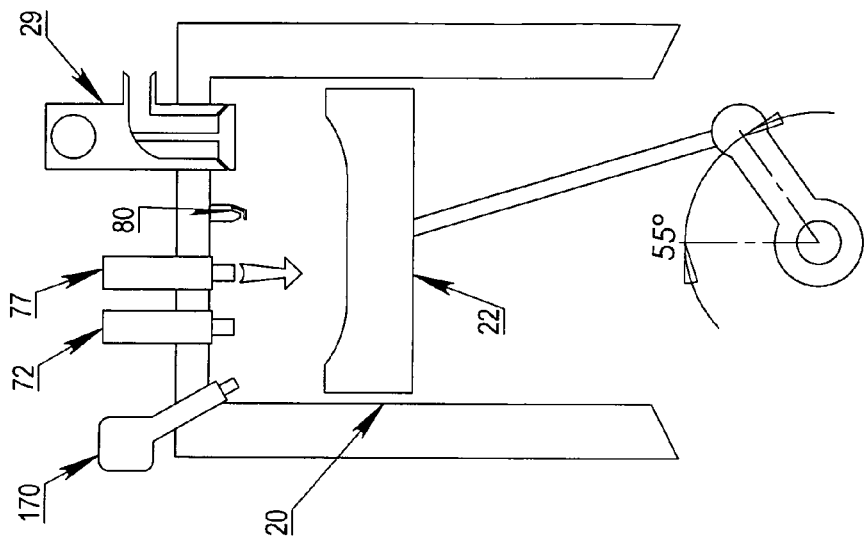
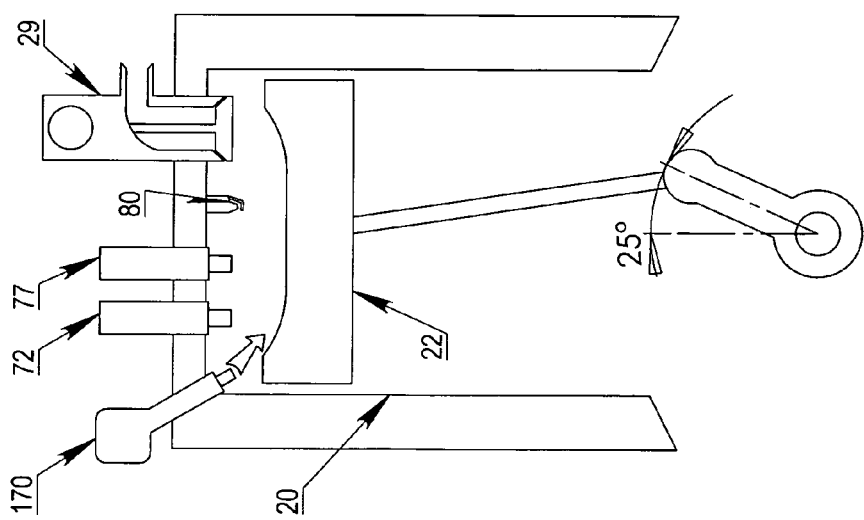

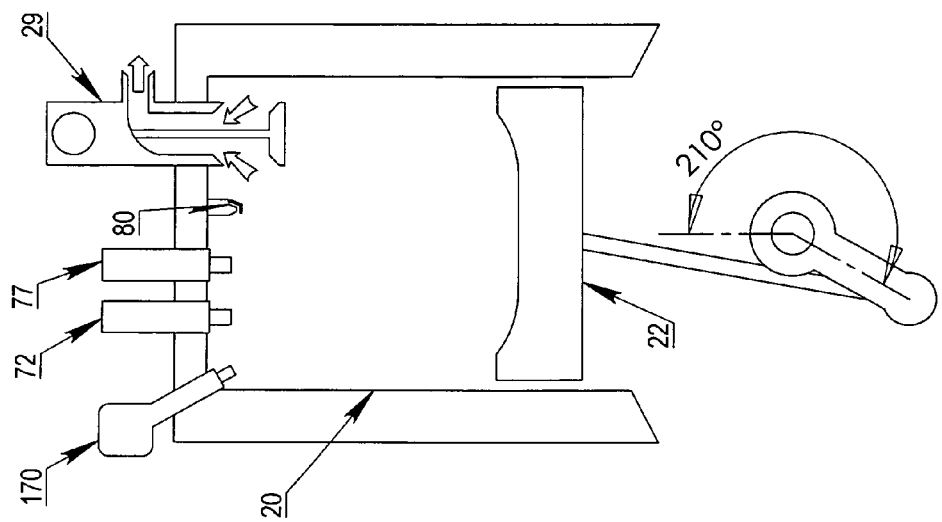
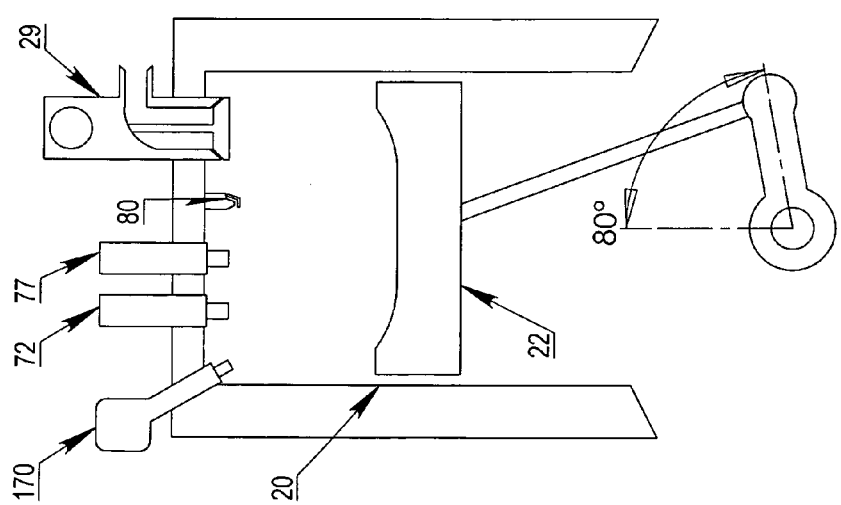

FIG. 37 (Process Chart 2)

FIG.38 (Process Chart 3)

FIG. 39 (Process Chart 4)

FIG. 40 (Process Chart 5)

FIG. 41 (Process Chart 6)

FIG. 42 (Process Chart 7)

(Process Chart 8)

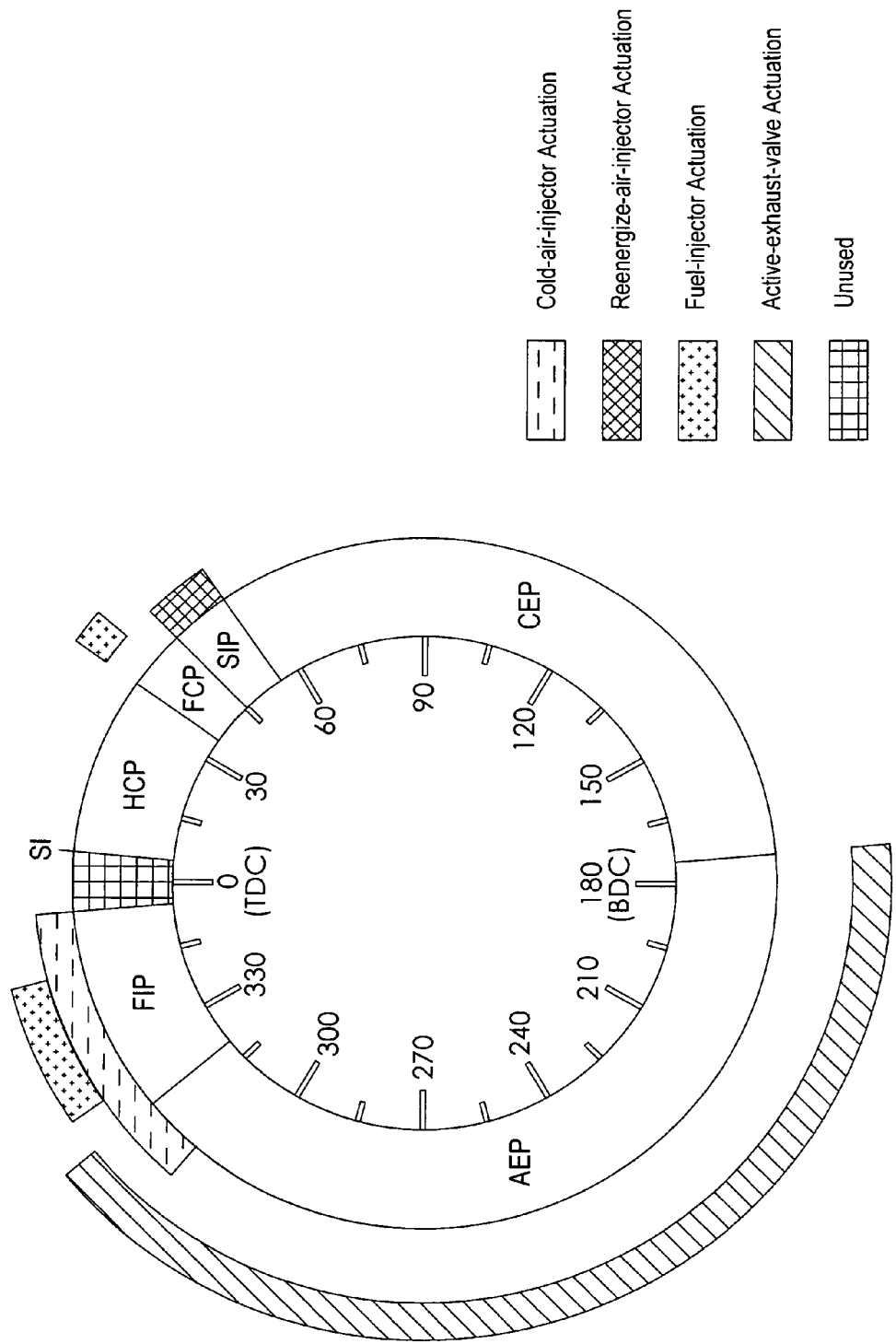
FIG. 44 (Process Chart 9)

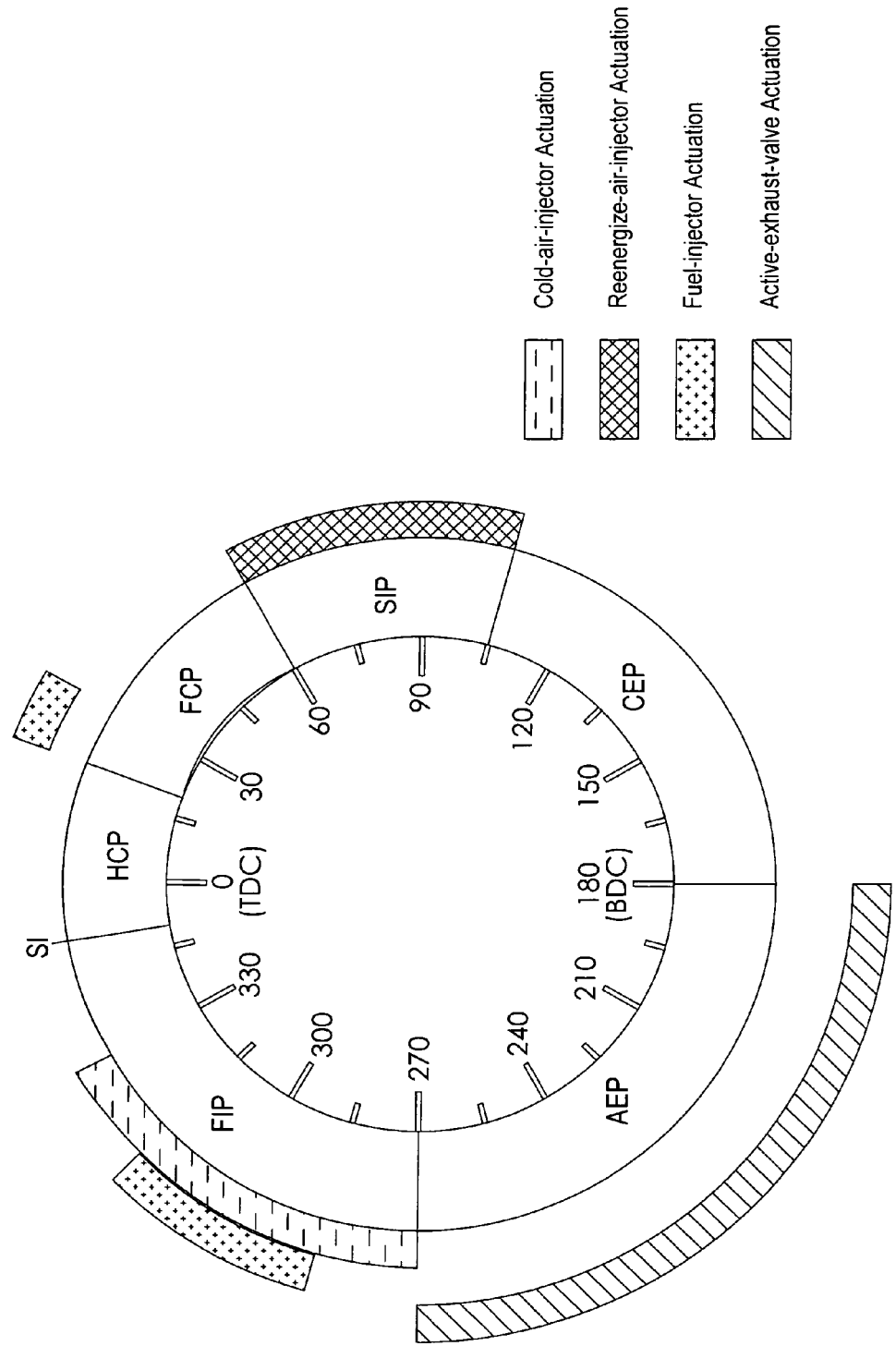
FIG. 45 (Process Chart 10)

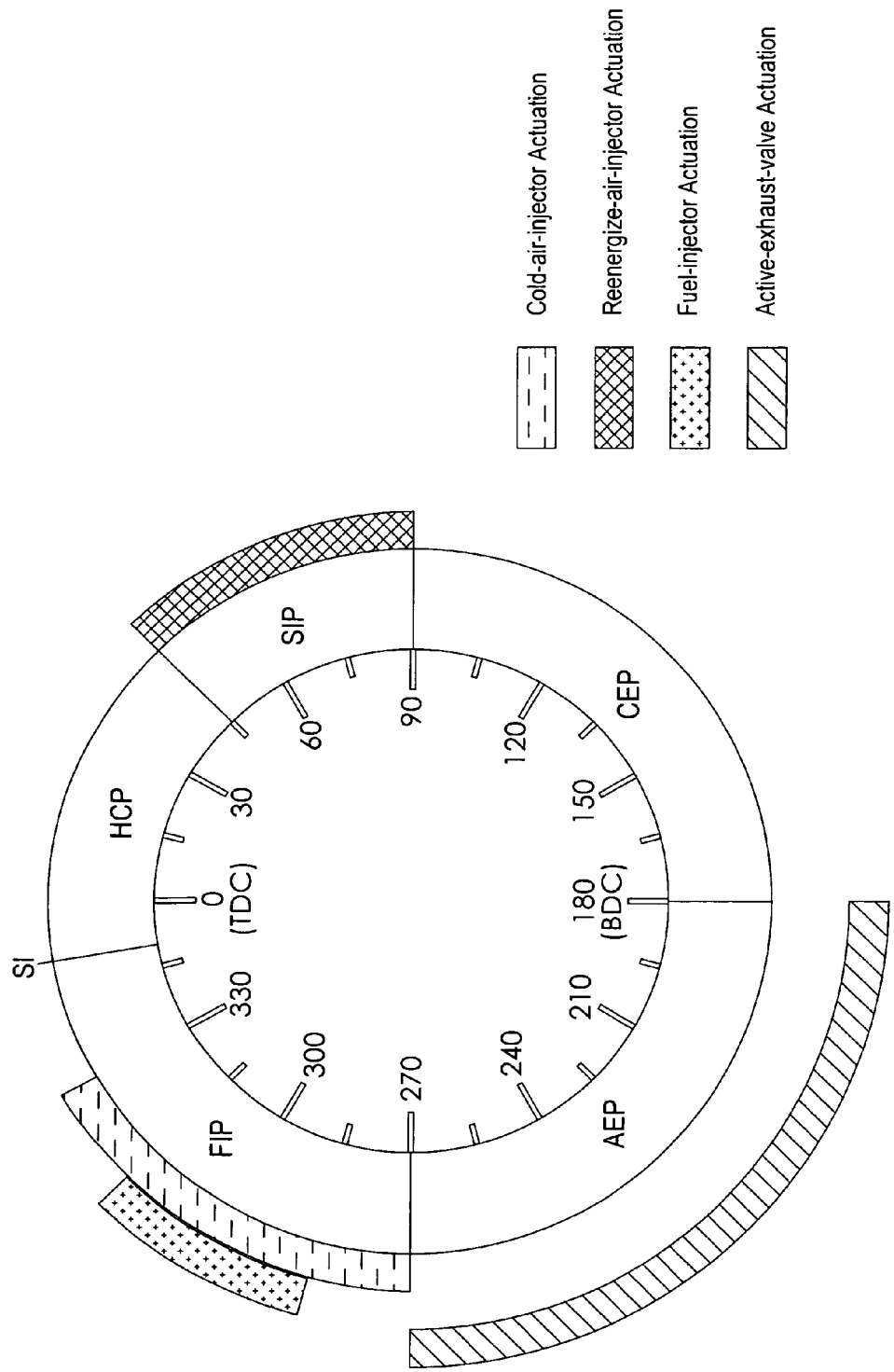
FIG.46 (Process Chart 11)

MACKAY COLD-EXPANSION ENGINE SYSTEM

FIELD OF THE INVENTION

The present invention relates to an integrated engine system operating with Mackay Cold-Expansion Cycle, more particularly to a spark-ignition based engine system that operates on a cycle consisting of the first-intake-process, the hot-combustion-process, the fuel-cooling-process, the second-intake-process, the cold-expansion-process, and the exhaust-process.

The present invention can be used in the field of automobile, transportation, and commercial power generation.

BACKGROUND OF THE INVENTION

The present invention is a further developed engine system based on the cold-expansion concept in the eight-stroke-cycle used in an eight-stroke-engine, which is now U.S. Pat. No. 6,918,358; the theory of the eight-stroke-cycle is to reduce the heat dissipation by way of releasing the fuel energy in two processes, thereby shortening the time that the combustion-medium is heating the cylinder wall and the cylinder head, so a better fraction of the fuel energy is conversed in a low-temperature oxygen-rich cold-expansion-medium for producing power with the least heat-loss.

The abovementioned two processes are the hot-combustion-process and the cold-expansion-process; the hot-combustion-process will combust the fuel and the air at a high temperature (about 2500 degree Celsius to 1700 degree Celsius) as a hot-combustion-medium, the hot-combustion-medium consists of nitrogen-gas, carbon-monoxide-gas, and other hot gases (except carbon-dioxide-gas due to the environment condition); the second-intake-process will mix a controlled amount of pressurized air with the hot-combustion-medium, thereby blocking the heat-loss by an instant cooling effect that rapidly cools the average temperature of the hot-combustion-medium down by 30%-80%, thereafter forming a low-temperature oxygen-rich cold-expansion-medium at a precisely regulated temperature range (400-1100 degree Celsius) according to the engine load; next the cold-expansion-medium expands with almost no heat-loss since the temperature difference between the cold-expansion-medium and the cylinder wall is now reduced significantly, which stops the heat current from conducting throughout the cylinder wall into the cooling circulation of the engine, and the conversion of the carbon-dioxide-gas is accelerated due to high oxygen-gas concentration presented in the cold-expansion-medium; therefore, almost all the carbon-monoxide-gas is converted into the carbon-dioxide-gas before the up-stroke of the piston, which yields an very high average expansion pressure during the down-stroke of the piston with virtually 50% the heat-loss of the conventional engine, in other words, the eight-stroke-cycle allows the fuel energy to be released in two distinctive steps (the hot-combustion-process and the cold-expansion-process), instead of the sudden and complete energy release that occurs in the conventional engine.

In a regular (medium load) operation with the optimal efficiency of the eight-stroke-cycle, the cold-expansion-medium is expanding at an average medium temperature about 850-600 degree Celsius during the cold-expansion-process, the heat current conducing throughout the cylinder wall is significantly lower than that of the convention engine (gasoline type), whereas the exhaust-gas of the conventional engine has an average temperature of about 1500 degree Celsius or higher during the power-stroke, and an average temperature of about 1400 degree Celsius during the exhaust-stroke.

As the heat current is directly proportional to the temperature difference between the combusting medium and cylinder wall, it can be seen that the total heat-current conducted over time (or the heat-loss) of the eight-stroke-engine is roughly about half of that of the conventional engine; therefore the eight-stroke-cycle is capable of performing at a relatively higher energy efficiency and power-to-weight ratio than the conventional engine.

And a secondary advantage is that, the eight-stroke-engine requires a cooling-system about half of that of the conventional engine, which also reduces the weight of the entire engine system.

However, there is a few drawbacks on the eight-stroke-engine, one of which is the high cost of the variable crankshaft control system of the slave-cylinder of the eight-stroke-engine and the variable-timing-coordinate-valve-system that makes it difficult for the eight-stroke-engine to adapt to the automobile applications.

As the automobile applications require a demanding power-responsive performance that can almost instantly accelerate from 10% of the maximum engine load to 100% of the maximum engine load in about 3 or 4 seconds.

After experimenting on improving the eight-stroke-engine for years, my research team develops a more advanced engine system named Mackay Cold-Expansion Engine System based on the operation concept of the eight-stroke-engine.

Mackay Cold-Expansion Cycle takes in the idea of the two combustion processes of the eight-stroke cycle, and further controls the expansion temperature and increases the power-to-weight ratio with the fuel-cooling-process, wherein the hot-combusting-medium is cooled down with the vaporization of the fuel before the second-intake-process is initiated; and more importantly, Mackay Cold-Expansion Cycle can now respond to a change in engine load much faster and smoother than the eight-stroke-engine by a systematic control means.

Mackay Cold-Expansion Engine System (MCES) consists of an air-compression means, an air-buffer-system, at least two cold-expansion-chambers, and a power management unit; wherein each cold-expansion-chamber will operate in a Mackay Cold-Expansion Cycle consisting of the first-intake-process, the hot-combustion-process, the fuel-cooling-process, the second-intake-process, the cold-expansion-process, and the active-exhaust-process (or the exhaust-process).

Mackay Cold-Expansion Engine System may also operate each cold-expansion-chamber in a Simplified Mackay Cold-Expansion Cycle, in which the fuel-cooling-process is disabled, such that each cold-expansion-chamber will operate in a Simplified Mackay Cold-Expansion Cycle consisting of the first-intake-process, the hot-combustion-process, the second-intake-process, the cold-expansion-process, and the active-exhaust-process (or the exhaust-process).

In comparison with the conventional engine, the MCES will have a relatively higher average expansion pressure and a relatively lower average expansion temperature during the entire down-stroke of the piston; therefore the heat energy dissipated in the engine cooling system of the MCES is only about 7%-15% of the total fuel energy, whereas the conventional engine dissipates about 35% of the total fuel energy in the engine cooling system.

For the ease of comprehension, a MCES and a conventional engine of the equivalent power output are compared as follows in their respective medium load operations at their standard energy efficiencies:

The hot-combustion-medium of the MCES will be heating the chamber wall at an average temperature about 1600-2000 degree Celsius during the hot-combustion-process (a duration of about 45 degree crankshaft rotation), and then heating the chamber wall at an average temperature about 500-800 degree Celsius from the second-intake-process to the active-exhaust-process (a total duration of about 270 degree crankshaft rotation).

Whereas the working-medium of the conventional engine (4-stroke spark-ignition) will be heating the chamber wall at an average temperature about 1500-2000 degree Celsius during its combustion process (a duration of about 160 degree crankshaft rotation), and then heating the chamber wall at an average temperature about 1200-1400 degree during its exhaust-process (a duration of about 180 degree crankshaft rotation.

As the heat-loss of the MCES is significantly less than the conventional engine, this converts more a better fraction of the fuel energy into expansion force, to be more detailed, the airflow-volume and the exhaust pressure measured at the exhaust-means of the MCES are also relatively higher than the conventional engine, which induces the MCES to recover the energy of the cold-expansion-medium from a different approach, therefore, a heat-energy-recovering means (the heat-transfer-catalytic-converter) and a kinetic-energy-recovering means (the turbo-turbine and the turbo-compressor) are integrated into the MCES to maximize the overall energy efficiency.

Due to the low temperature characteristic of the expelled cold-expansion-medium, the most widely used steam-heat-recovery-systems nowadays which utilizes the exhaust-gas to generate a high pressure steam to drive turbine for electricity is not suitable for collaborating with the MCES; this is because the general steam-heat-recovery-system requires the exhaust-gas to be at least 600 degree Celsius or higher to be economically efficient in terms of the equipment cost, whereas the temperature of the exhaust gas from a Mackay Cold-Expansion Engine System is only about 300-400 degree Celsius in the regular operation; therefore, a configuration of the MCES consisting of the refrigerant-regenerator is also provided in the disclosed embodiments for the power generation purpose.

Various configurations and design concepts of Mackay Cold-Expansion Engine System are provided herein to the best of the applicants' knowledge, so that those skilled in the art of the power generation can maximize the potential of the Mackay Cold-Expansion Cycle according to the operation environments, and it is the earnest wish of my research team to provide an efficient engine system that can contribute to alleviate the ongoing energy crisis.

SUMMARY OF THE INVENTION

1. The first objective of the present invention is to provide an integrated engine system that is capable of performing Mackay Cold-Expansion Cycle, wherein said integrated engine system includes at least two cold-combustion-chambers for performing said Mackay Cold-Expansion Cycle in the sequence of the first-intake-process, the hot-combustion-process, the fuel-cooling-process, the cold-expansion-process, the active-exhaust-process.

2. The second objective of the present invention is to provide an integrated engine system that can precisely control the expansion temperature of the cold-expansion-medium in the cold-expansion-process, thereby improving the overall energy efficiency and ensure the functionality of the catalytic converter.

3. The third objective of the present invention is to provide a reliable air-buffer-system of Mackay Cold-Expansion Engine System that can maintain a constant operation pressure, thereby ensuring the performances of the cold-air-injection means and the reenergize-air-injection means; wherein the air-mass injected in the second-intake-process is adjusted according to the engine operation condition, and the actuation timing of the reenergize-air-injection means is adjusted according to the pressure decline rate of the hot-combustion-medium, such that the second-intake-process is only initiated after the pressure of the hot-combustion-medium is decreased to lower than the operation pressure of the reenergize-buffer.

4. The fourth objective of the present invention is to provide a Mackay Cold-Expansion Engine System that can optimize the energy efficiency of the cold-expansion-process by the accelerated conversion of carbon-monoxide gas to carbon-dioxide gas, such that the thermal energy of the injected fuel can be fully released in the form of expansion force prior to the active-exhaust-process 5. The fifth objective of the present invention is to provide an efficient and reliable Mackay Cold-Expansion Engine System that can minimize the necessary compression energy for performing Mackay Cold-Expansion Cycle; wherein the power-management-unit controls the airflow speeds of the heated high-boost-air in the reenergize-buffer and the cooled high-boost-air in the cold-buffer by adjusting the operation speed of the air-compression means.

6. The sixth objective of the present invention is to provide an environmental-friendly Mackay Cold-Expansion Engine System that can increase energy efficiency by blocking the heat-current conducted from the cold-expansion-medium to the cold-expansion-chamber.

7. The seventh objective of the present invention is to provide a power management unit of Mackay Cold-Expansion Engine System that can adjust the amount of the cold-expansion-medium being expelled out of the cold-expansion-chamber according to the engine output condition, thereby controlling the ratio of oxygen and fuel for the preceding cycle.

8. The eighth objective of the present invention is to provide an efficient air-buffer-system of Mackay Cold-Expansion Engine that can recover the thermal energy from the expelling cold-expansion-medium to heat up the high-boost-air of the reenergize-buffer.

9. The ninth objective of the present invention is to provide an efficient cold-expansion-chamber structure of Mackay Cold-Expansion Engine System that can maximize the expansion efficiency by reducing both the heat loss and the pumping loss.

10. The tenth objective of the present invention is to provide an efficient air-cool type configuration of Mackay Cold-Expansion Engine System that can be used in the automobile applications.

11. The eleventh objective of the present invention is to provide a subzero-intake type Mackay Cold-Expansion Engine System that can operate with high expansion efficiency for the power generation applications.

12. The twelfth objective of the present invention is to provide a Mackay Cold-Expansion Engine System that can adjust ratio of the injected air-mass in the first-intake-process to the injected air-mass in the second-intake-process to regulate the temperature of the cold-expansion-medium within the range of 400-1100 degree Celsius, thereby accelerating the conversion of carbon-monoxide-gas to carbon-dioxide-gas in the cold-expansion-process.

BRIEF DESCRIPTION OF THE DRAWINGS

FIG. 2-7 shows the six processes of a Mackay Cold-Expansion Cycle in the medium load operation corresponding to Process Chart.2; wherein FIG. 2 shows the chamber condition at 285 degree crankshaft reference angle, which is in the first-intake-process; FIG. 3 shows the chamber condition at 350 degree of crankshaft reference angle, which is in the hot-combustion-process; FIG. 4 shows the chamber condition at 25 degree of crankshaft reference angle, which is in the fuel-cooling-process; FIG. 5 shows the chamber condition at 55 degree of crankshaft reference angle, which is in the second-intake-process; FIG. 6 shows the chamber condition at 80 degree of crankshaft reference angle, which is in the cold-expansion-process; FIG. 7 shows the chamber condition at 210 degree of crankshaft reference angle, which is in the active-exhaust-process.

FIG. 44 (Process Chart.9) demonstrates an operation of Mackay Cold-Expansion Cycle, wherein the first-intake-process is completed before the TDC position, whereas the spark-ignition is delayed to after the TDC position.

FIG. 45 (Process Chart.10) demonstrates an operation of Mackay Cold-Expansion Cycle for the low-pressure type air-buffer-system (such as 4 bar); which is specialized for the low-end inexpensive air-buffer-system that has an low operation pressure for both the cold-buffer and the reenergize-buffer; in which the second-intake-process is relatively delayed to a later crankshaft reference angle as the high-boost-air in the reenergize-buffer can only overcome the pressure of the hot-combustion-medium at a relatively later crankshaft reference angle; even though the energy efficiency of this type of MCES is much lower than a MCES operating with a high-pressure type air-buffer-system (such as 8 bar to 30 bar), the low-pressure type air-buffer-system still serves as a less expensive option for powering small bikes or boats.

FIG. 46 (Process Chart.11) demonstrates an operation of Mackay Cold-Expansion Cycle for the low-pressure type air-buffer-system, wherein the fuel-cooling-process is disabled.

DETAILED DESCRIPTION OF THE PREFERRED EMBODIMENTS

The pressure unit (bar) in the following embodiments is the gauge pressure.

Figure 1:
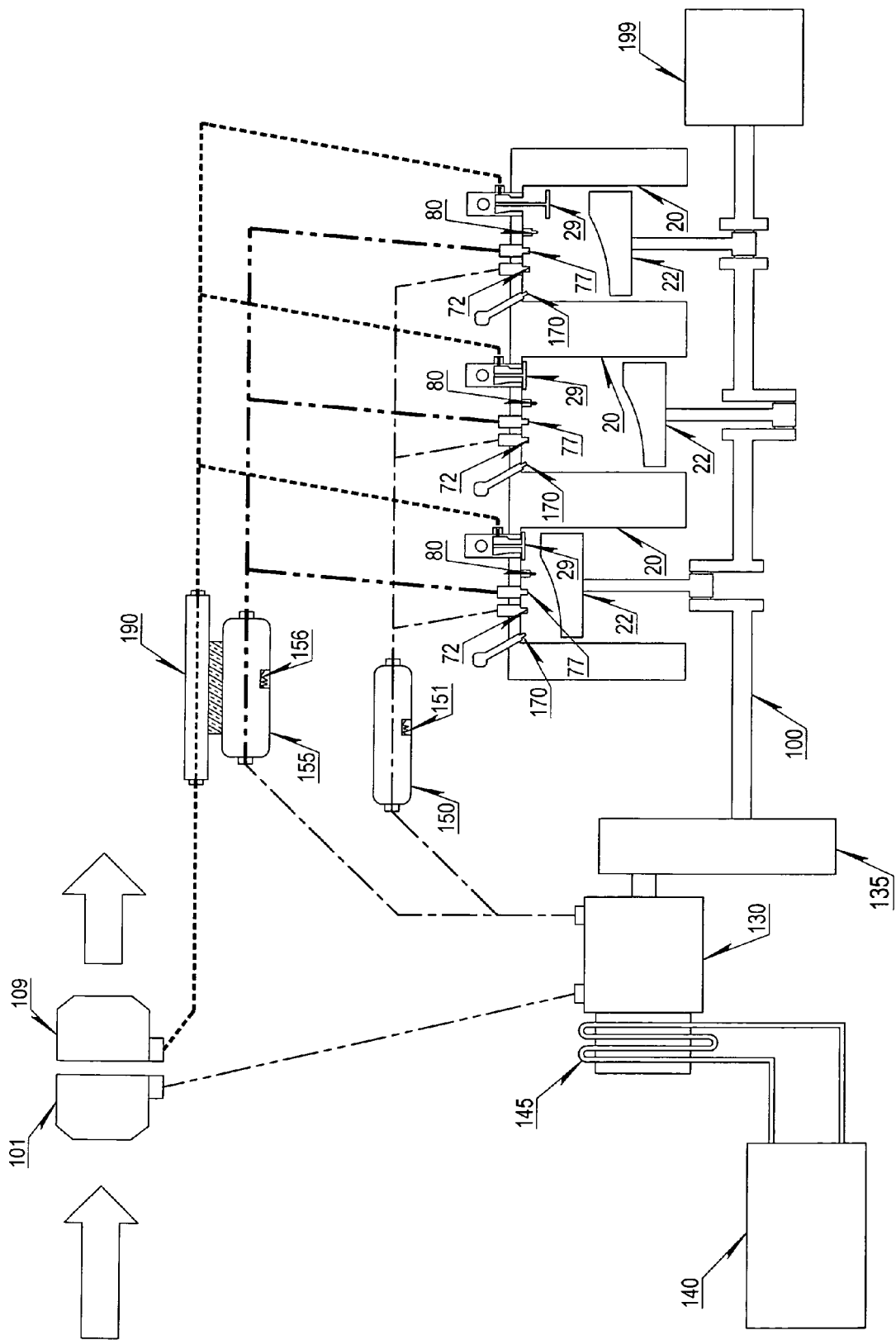
FIG. 1 is an illustrative view of the first embodiment of Mackay Cold-Expansion Engine System (MCES), which is a basic MCES configuration preferable for mid-size commercial applications such as a long-distance bus with an integrated refrigerant-circuit.

Referring to FIG. 1 for the first embodiment, this Mackay Cold-Expansion Engine System (MCES) is specifically configured for the mid-size automobiles or the power generators that prefers a smaller engine system capable with high power output; and this first embodiment is most useful in a commercial bus that can integrate the refrigerant-circuit of the air-conditioning system to the compressor-cooler 145, thereby reducing the system size and the system weight.

In FIG. 1, the components of MCES are labeled as the turbo-compressor 101, the turbo-turbine 109, the central-compressor 130, the compression-cooler 145, the refrigerant-circuit 140, the compressor-transmission 135, the cold-buffer 150, the cold-air-injectors 72, the reenergize-buffer 155, the reenergize-air-injectors 77, the cold-buffer-sensor 151, the reenergize-buffer-sensor 156, the cold-expansion-chambers 20, the pistons 22, the fuel-injectors 170, the spark-plugs 80, the active-exhaust-valves 29, the heat-transfer-catalytic-converter 190, the crankshaft 100, and the output-shaft 199.

The MCES includes a power-management-unit for controlling the compression-transmission 135, the cold-air-injectors 72, the reenergize-air-injectors 77, the fuel-injectors 170, the spark-plugs 80, and the active-exhaust-valves 27 to perform a Mackay Cold-Expansion Cycle in each cold-expansion-chamber.

In FIG. 1, the ambient air is inhaled into the turbo-compressor 101 to produce a flow of low-boost-air to the central-compressor 130; next, the central-compressor 130 will compress said low-boost-air to produce a high-boost-air, and said high-boost-air is distributed to the cold-buffer 150 and the reenergize-buffer 155.

The compression-cooler 145 consists of a refrigerant-evaporator-coil that circulates through the central compressor 130 for cooling said low-boost-air to reduce the compression energy required to generate said high-boost-air.

The refrigerant-circuit 140 consists of a refrigerant-condenser (not shown) and a refrigerant-compressor (not shown); the refrigerant-circuit 140 is preferably integrated with the air-conditioning system of the vehicles to save up space for the engine compartment of the vehicle.

Next, said high-boost-air is distributed from the central-compressor to the cold-buffer 150 and the reenergize-buffer 155.

The cold-buffer 150 will buffer and supply a cooled high-boost-air to the cold-air-injectors 72 at a constant operation pressure set by the power-management-unit; wherein a cold-buffer-sensor 151 will transmit an airflow pressure data or a airflow speed data to the power-management-unit, so that the power-management-unit can adjust the gear ratio setting of the compression-transmission to keep said constant operation pressure of the cold-buffer 150; wherein, said constant operation pressure is essential for the proper functionality of the cold-air-injectors, which is to precisely control the injected air-mass for the first-intake-process.

The reenergize-buffer 155 will buffer and supply a heated high-boost-air to the reenergize-air-injector 77 at a constant operation set by the power-management-unit; wherein a reenergize-buffer-sensor 156 will transmit an airflow pressure data or a airflow speed data to the power-management-unit, so that the power-management-unit can adjust the gear ratio setting of the compression-transmission to keep said constant operation pressure of the reenergize-buffer 155; wherein, said constant operation pressure of he reenergize-buffer 155 is essential for the proper functionality of the reenergize-air-injectors, which is to precisely control the injected air-mass for the second-intake-process.

Both the cold-buffer and the reenergize-buffer may include free-spinning turbines or rotors to stabilize the flow speed therein, which can assist the cold-air-injectors and the reenergize-air-injectors to generate a more constant airflow during their respective actuations, therefore the power-management-unit can have a precise control on the injected air-mass of the first-intake-process and the injected air-mass of the second-intake-process.

The compressor-transmission 135 will adjust its gear ratio to control the airflow speed of the high-boost-air buffered in the cold-buffer 150 and the reenergize-buffer 155, such that the cold-buffer is kept at a constant operation pressure in a range of 4-25 bar, and the reenergize-buffer is kept at a constant operation pressure in a range of 4-30 bar, wherein the reenergize-buffer should have an operation pressure equal to or higher than the operation pressure of the cold-buffer for the best performance.

The compressor-transmission may be a mechanical transmission, a hydraulic transmission, a continuous-variable-transmission or a planetary-gear-transmission; in some other embodiment that includes an inverter, the compression-transmission is replace with an electrical-motor.

The operation pressure setting of the reenergize-buffer 155 generally depends on the overall compression efficiency of the air-compression means; ideally, if the air-compression means is an extremely high-efficient air-compressor, the power-management-unit can set a constant operation pressure of the reenergize-buffer to as high as 30 bar, which in terms allows the second-intake-process to be initiated at an earlier crankshaft reference angle without losing any overall efficiency.

In the case of an automobile application, the operation pressures of the cold-buffer and the reenergize-buffer are preferred to be set in a range of 4-15 bar for the public traffic safety and the performance limitation of a small central compressor.

In the case of a stationary power generator application, as the air-compression means can be an extremely high-efficient and complex central-compressor, the operation pressure of the reenergize-buffer may be set to 20 bar or higher in order to perform the cold-expansion-process more efficiently because the MCES is located in a relatively stationary and controlled environment, wherein the injected air-mass of the second-intake-process can be as much as 350% of the injected air-mass of the first-intake-process, which results in a cold-expansion-medium forming at a temperature just above the operable temperature of a regular catalytic converter such as 400 degree Celsius; in other words, ideally the cold-expansion-process will produce power with a cold-expansion-medium at an average temperature about 400 degree Celsius from about 45 degree crankshaft reference angle to 180 degree crankshaft reference angle, which results in an expansion-process with almost no heat, loss, and all the thermal energy of the supplied fuel are preserved in the form of expansion force by an accelerated conversion of carbon-dioxide-gas, so that the expansion pressure is slowly decreasing during the cold-expansion-process.

Now referring to FIG. 1 again for a regular operation with the assumption that the power-management-unit will keep a constant operation pressure of 10 bar in both the cold-buffer 150 and the reenergize-buffer 155; wherein, in an operation with decreasing power output, the power-management-unit commands the compression transmission 130 to be set to a lower gear, which decreases the airflow speeds in both the cold-buffer 150 and the reenergize-buffer 155, however the operation pressures of both the cold-buffer 150 and the reenergize-buffer 155 are still maintained at 10 bar, while the cold-buffer-sensor 151 and the reenergize-buffer-sensor 156 will feedback the airflow conditions of said two buffers to the power-management-unit to check if a proper gear ratio is selected for the compression transmission 130; in an operation with increasing power output, the power-management-unit commands the compression transmission 130 to be set to a higher gear, which increases the airflow speeds in both the cold-buffer 150 and the reenergize-buffer 155, however the operations pressures of both the cold-buffer 150 and the reenergize-buffer 155 are still maintained at 10 bar, while the cold-buffer-sensor 151 and the reenergize-buffer-sensor 156 will feedback the airflow conditions of said two buffers to the power-management-unit to check if a proper gear ratio is selected for the compressor transmission 130.

In general, the compressor-transmission 130 will shift to a higher gear to increase the airflow speeds in said two buffers when the power-management-unit is requested to output more power by the user, inversely the compressor-transmission 130 will shift to a lower gear to decrease the airflow speeds in said two buffers when the power-management-unit is requested to output less power by the user; at the same time, the cold-buffer-sensor 151 and the reenergize-buffer-sensor 156 will feedback the airflow data to the power-management-unit to check if any of their associated buffers is under-pressured or over-pressured; as an over-pressured condition means a loss in the efficiency, while an under-pressured causes faulty operations of the cold-air-injectors 72 and the reenergize-air-injectors 77.

The power-management-unit should also include a computation circuit for calculating the correct actuation time of the reenergize-air-injector 77 that can inject a designated amount of the heated high-boost-air from the reenergize-buffer 155 in the second-intake-process; wherein said designated amount of the heated high-boost-air should have an air-mass that is at least 50% of the injected air-mass of the first-intake-process.

In FIG. 1 the reenergize-buffer 155 will perform a reenergize-process to recover the internal energy of the expelled cold-expansion-medium flown through the heat-transfer-catalytic-converter 190 and the exhaust pipeline (not shown); wherein, the high-boost-air buffered in the reenergize-buffer 155 will be heated up by the heat energy conducted from the heat-transfer-catalytic-converter 190; in general, the high-boost-air buffered in the reenergize-buffer 155 can be heated up to about 80-300 degree Celsius depending on the engine operation condition, which significantly decreases the required workload of the central-compressor 130 to keep the reenergize-buffer 155 at its preset operation pressure, thereby raising the overall energy efficiency of Mackay Cold-Expansion Cycle.

It should be noted that, even though the heated high-boost-air may be heated up to as high as 300 degree Celsius before injecting into each cold-expansion-chamber to mix with a hot-combustion-medium therein, the cooling effect of the second-intake-process is still very effective and energy-efficient, as said hot-combustion-medium will have an average temperature of about 1800-1200 degree Celsius prior to the second-intake-process; therefore, by injecting a heated high-boost-air to mix with said hot-combustion-medium, it is still feasible to form a cold-expansion-medium that is regulated in the targeted temperature range of 400-1100 degree Celsius; wherein the injected air-mass of the second-intake-process is to be controlled by the power-management-unit in such a way that the compression energy consumed by the air-compression means does not cause a significant drop in the overall energy efficiency; to be more specifically defined, the power-management-unit should limit the injected air-mass of the second-intake-process to be within 50%-350% of the injected air-mass of the first-intake-process, so that a hot-combustion-medium is mixed with a heated high-boost-air to form a cold-expansion-medium, wherein the temperature of said hot-combustion-medium will be reduced by 30%-80% as a result of the second-intake-process, thereby said cold-expansion-medium will expand with an average temperature of 400-1100 degree Celsius in the cold-expansion-process of Mackay Cold-Expansion Cycle.

Now referring to FIG. 2-7 and FIG. 37 (Process Chart.2) for a complete and detailed explanation of Mackay Cold-Expansion Cycle in the first embodiment with the following assumed condition for a medium load operation: the central-compressor 130 will supply a flow of high-boost-air at about 25 degree Celsius, the cold-buffer 150 takes in said high-boost-air to buffer a flow of cooled high-boost-air to the cold-air-injectors 72 at a constant operation pressure of 10 bar, the reenergize-buffer 155 also takes in said high-boost-air to buffer a flow of heated high-boost-air to the reenergize-air-injectors 77 at a constant operation pressure of 12 bar, the power-management-unit will adjust the gear ratio setting of the compressor-transmission 135 to keep the cold-buffer 150 and the reenergize-buffer 155 at their respective operation pressures, the reenergize-buffer will heat up the high-boost-air buffered therein with the reenergize-process to about 150 degree Celsius or higher.

Figure 37:
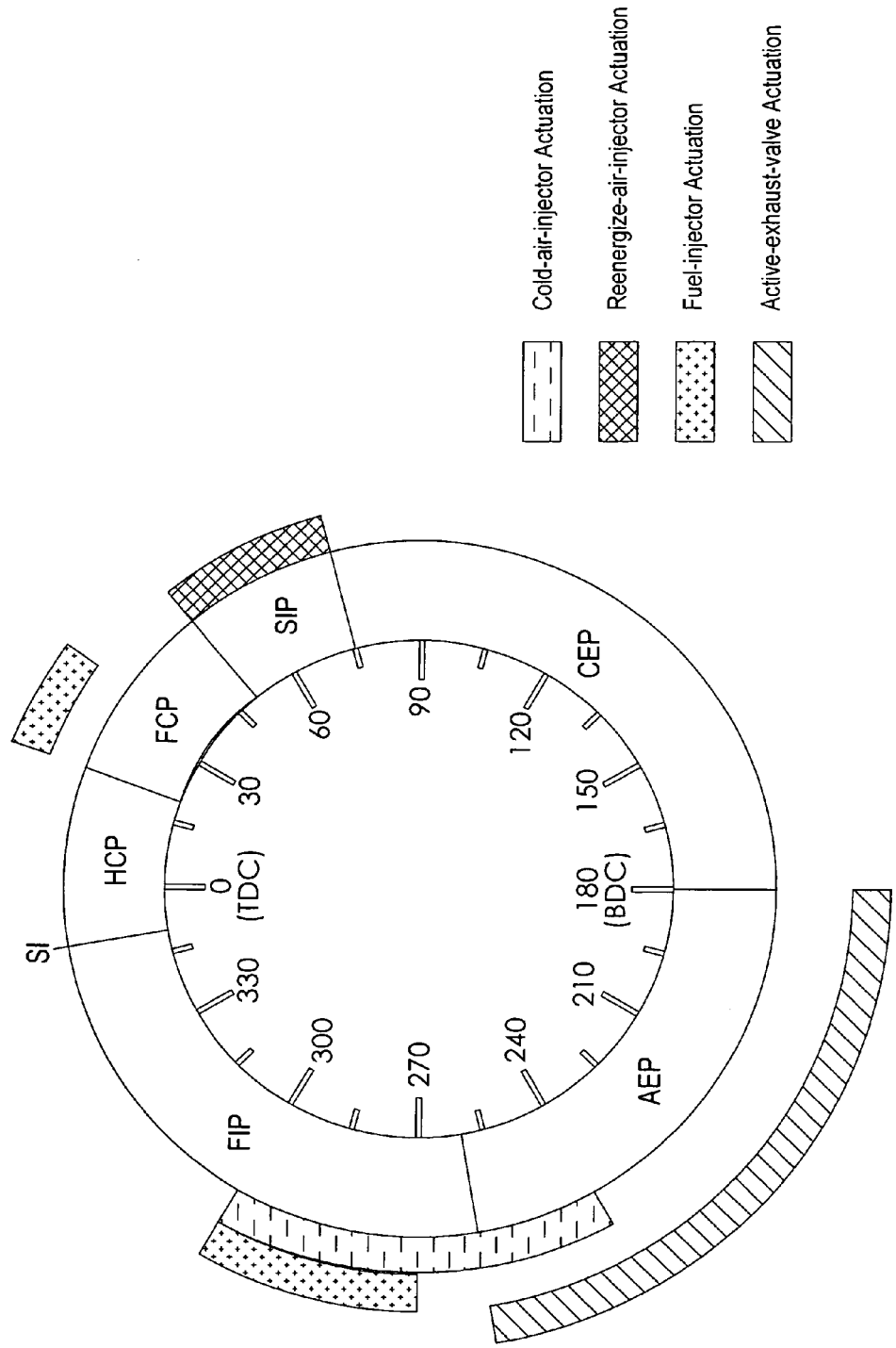
FIG. 37 (Process Chart.2) demonstrates a medium load operation of Mackay Cold-Expansion Cycle for high-rpm-engine applications.

In FIG. 1, each cold-expansion-chamber 20 will perform in a Mackay Cold-Expansion Cycle, this cycle includes a first-intake-process (FIG. 2), a hot-combustion-process (FIG. 1B), a fuel-cooling-process (FIG. 3), a second-intake-process (FIG. 4), a cold-expansion-process (FIG. 5), and an active-exhaust-process (FIG. 6); wherein the fuel-cooling-process may be disabled in an engine idling operation or a light load operation to preserve fuel. FIG. 37 (Process Chart.2) is used a reference to FIG. 2 to FIG. 7 for the medium load operation, wherein FIG. 2 represents the chamber condition at 285 degree of crankshaft reference angle, FIG. 3 represents the chamber condition at 350 degree of crankshaft reference angle, FIG. 4 represents the chamber condition at 25 degree of crankshaft reference angle, FIG. 5 represents the chamber condition at 55 degree of crankshaft reference angle, FIG. 6 represent the chamber condition at 80 degree of crankshaft reference angle, FIG. 7 represents the chamber condition at 210 degree of crankshaft reference angle.

The first-intake-process (FIG. 2) is the process to supply an air-fuel-mixture into the cold-expansion-chamber before the piston 22 reaches the associated TDC position (0 degree of crankshaft reference angle); during this process, the cold-air-injector 72 will be actuated to supply the cooled high-boost-air of the cold-buffer 150 into the cold-expansion-chamber 20, the fuel-injector 170 will supply an adequate fuel to mix an air-fuel-mixture at a stoic ratio or fuel-rich ratio in the cold-expansion-chamber 20 before the spark-ignition.

The hot-combustion-process (FIG. 3) is the process to ignite and combust said air-fuel-mixture until most oxygen content of said air-fuel-mixture are combusted into carbon-monoxide-gas; during this process, the spark-plug 80 ignites said air-fuel-mixture into a hot-combustion-medium at an average temperature of about 2000-1200 degree Celsius, wherein said hot-combustion-medium has a high concentration of carbon-monoxide-gas because the carbon-monoxide-gas cannot be converted into carbon dioxide due to the high combustion temperature and the absence of oxygen-gas.

The fuel-cooling-process (FIG. 4) is the process to inject a highly-pressurized fuel with the fuel-injector 170 into said hot-combustion-medium for lowering the medium temperature by the vaporization process of said high-pressurized fuel; during this process, said highly-pressurized fuel should only be injected into the portion of said hot-combustion-medium that has very little or no oxygen content so that this highly-pressurized fuel will be vaporized by the heat of the carbon-monoxide-gas, instead of further combustion with oxygen-gas (ideally the fuel-cooling-process should not cause any sudden temperature surge), thereafter said hot-combustion-medium will be consisting of the vaporized fuel, the carbon-monoxide-gas and other hot gases; generally, the fuel-cooling-process should start at 15-50 degree of crankshaft rotation after the spark-ignition, and this process will instantly reduce the average temperature of the hot-combustion-medium by about 100-300 degree Celsius in the medium load operation and the heavy load operation.

In a light load operation, the fuel-cooling-process (FIG. 4) may be disabled, and the hot-combustion-process will be followed by the second-intake-process once the average pressure of the hot-combustion-medium decreases to lower than the operation pressure of the reenergize-buffer 155.

In some other embodiments of MCES, the first-intake-process and the fuel-cooling-process may utilize more than one fuel-supplying-means in order to control the fuel amount more precisely, it is because the shut-off interval between the fuel injection of the first-intake-process and the fuel-injection of the fuel-cooling-process may be as short as 2 milliseconds to 5 milliseconds for high speed engine applications, a single fuel-injector may fail to perform said two fuel-injections with precise control over the injection timing and the injected fuel mass; in addition, it can easily wear down its mechanical service-life due to the quick shut-and-open operation.

It should also be noted that it is undesired to have the fuel-injector supplying the fuel during the hot-combustion-process, this is because the injected fuel will instantly combust with any existing oxygen gas and produce soot in a reaction environment of high pressure and high temperature, and the formation of soot will cause severe air-pollution and lower the fuel efficiency.

The second-intake-process (FIG. 5) is the process to inject the heated high-boost-air of the reenergize-buffer 155 into the cold-expansion-chamber 20 with the reenergize-air-injector 77; this process will be initiated after the average pressure of the hot-combustion-medium has decreased to lower than the operation pressure of the reenergize-buffer 155, during this process, a controlled amount of the heated high-boost-air is injected and mixed with the hot-combustion-medium in the cold-expansion-chamber, thereby forming a cold-expansion-medium at an average medium temperature lower than 1100 degree Celsius by the end of the second-intake-process.

It should be noted that the durations of the fuel-cooling-process and the second-intake-process do not overlap with each other, in other words, there should not be any more fuel injection after the second-intake-process has started.

For a MCES configured for large power generation applications or large transportation applications where the compression efficiency is optimized with cooling and multistage air-compression, the injected air-mass of the second-intake-process should be set to about 150%-350% of the injected air-mass of the first-intake-process.

For a MCES configured for mid-size automobile applications or mid-size power generation applications where the compression efficiency is limited by the size and the operation cost, the injected air-mass of the second-intake-process should be set to about 75%-200% of the injected air-mass of the first-intake-process.

For a MCES configured for light duty applications such as a portable power generator or a motorcycle where the compression efficiency is further limited by the equipment cost, the injected air-mass of the second-intake-process should be set to about 50%-120% of the injected air-mass of the first-intake-process.

It should also be noted that, in order to be energy-efficient with Mackay Cold-Expansion Cycle, the power-management-unit must adjust the injected fuel-mass of the fuel-cooling-process and the injected air-mass of the second-intake-process in such a way that, the cold-expansion-medium is mixed as an oxygen-rich medium throughout the second-intake-process and the cold-expansion-process; in other words, there must be excessive oxygen-gas remained in the cold-expansion-medium after all the injected fuel is converted into carbon-dioxide-gas in the cold-expansion-process.

To be more specifically defined, during the operation of a Mackay Cold-Expansion Cycle, the hot-combustion-process may be a stoic combustion process or a rich-burn combustion process in terms of the oxygen-fuel ratio, but the cold-expansion-process will always be an oxygen-rich expansion process even when the MCES is operating at its maximum power output; in the contrast, the conventional spark-ignition engine will operate with a fuel-rich expansion stroke at its maximum power output, and the exhaust-gas of the conventional spark-ignition engine will consist mostly carbon-monoxide-gas at maximum power output due to the high expansion temperature (which is higher than 1200 degree Celsius at the exhaust manifold).

The cold-expansion-process (FIG. 6) is the process to produce power with the cold-expansion-medium in the cold-expansion-chamber 20; during this process, the cold-expansion-medium will expand with a slowly-decreasing expansion pressure in a low-temperature and oxygen-rich condition, wherein a conversion from carbon-monoxide-gas to carbon-dioxide-gas is accelerated to release more thermal energy in the form of expansion force, any existing fuel-gas is also combusted almost spontaneously into carbon-dioxide-gas due to the low-temperature oxygen-rich environment, in addition the heat-current conducting from the cold-expansion-medium throughout the chamber wall of the cold-expansion-chamber 20 is minimized because of the low temperature difference between the cold-expansion-chamber 20 and the cold-expansion-medium; in other words, the cold-expansion-medium is releasing the thermal energy from said conversion of carbon-dioxide-gas at low temperature, and the cold-expansion-medium dissipates very little heat energy out of the cold-expansion-chamber 20, such that the energy of the injected fuel is fully released in the form of expansion force before the cold-expansion-medium is expelled out of the cold-expansion-chamber 20.

In comparison to the convention spark-ignition engine, the cold-expansion-process of MCES progresses with a relatively stable expansion pressure and an accelerated conversion of the carbon dioxide gas at a low temperature regulated in the range of 400-1100 degree Celsius; whereas the expansion stroke of the conventional spark-ignition engine progresses with a rapid pressure decline, and the conversion of the carbon-monoxide-gas to the carbon-dioxide-gas generally takes place only in the catalytic converter or the exhaust tail-pipe, where the temperature of the exhaust-gas is decreased by dissipating a massive heat into the atmospheric air.

The average expansion temperature of Mackay Cold-Expansion Cycle is also at least 50% lower than that of the conventional spark-ignition engine when comparing at the equivalent power output.

The average expansion pressure of Mackay Cold-Expansion Cycle is also at least 50% higher than that of the conventional spark-ignition engine when comparing the maximum power output with the equivalent size.

To further explain the effect of the cold-expansion-process of Mackay Cold-Expansion Cycle, it is necessary to first identity an optimized expansion process of the internal combustion engine (which is not to be confused with the theoretically expansion process defined by the ideal gas law and the adiabatic expansion process).

An optimized expansion process should be an expansion process that can convert as much energy as possible into an expansion force, meanwhile preventing the heat energy from dissipating into the atmospheric air or the engine cooling system; in order to achieve this optimized expansion process, first of all, the heat current conducting out of the combustion chamber should be minimized, secondly the expansion pressure should be steady and constant through out entire expansion process, thirdly all the available reaction energy (which is the total energy released until the carbon content of a fuel is completely converted into carbon-dioxide-gas) should be converted into the expansion force before the combustion-medium has existed the combustion chamber, fourthly the compression energy exerted in the air-compression process should be minimized, fifthly this expansion process should not produce any soot or pollutant material.

In the conventional spark-ignition four-stroke engine, more than 1/3 of the total reaction energy is dissipated into the engine cooling system, and another 1/3 of the total reaction energy is dissipated into the air with the exhaust-gas, leaving merely less than 30% of the total reaction energy to be converted into the expansion force; this is because the conventional expansion-process will have an average gaseous temperature of 1200 degree Celsius or higher from the beginning of the expansion-stroke to the end of the exhaust-stroke, in plain words, this is equivalent to heat up the combustion-chamber at 1200 degree Celsius from the beginning of the expansion-stroke to the end of the exhaust-stroke; the second reason of this energy-loss is the delayed conversion of the carbon-monoxide-gas to carbon-dioxide-gas, which means that most of the thermal energy released by said delayed conversion is heating the exhaust-gas in the exhaust-tailpipe and the catalytic converter, this is because the carbon-monoxide-gas can hardly react with oxygen to form the carbon-dioxide-gas at high temperature with low oxygen concentration, so most of the carbon-dioxide-gas is formed after the combustion medium has left the combustion chamber into the exhaust-tailpipe and the catalytic converter, where the combustion-medium can reduce its temperature to about 1100 degree Celsius or lower.

As the main purpose of Mackay Cold-Expansion Cycle is to perform the expansion process as close and effective as the previously defined optimized expansion process; Mackay Cold-Expansion Cycle breaks down the regular combustion reaction into a hot-combustion-process and a cold-expansion-process (which is similar to the second-combustion-stroke of eight-stroke-engine), wherein the hot-combustion-process will ignite a fuel-rich mixture to form a hot-combustion-medium with high carbon-monoxide-gas concentration, the fuel-cooling-process and the second-intake-process will have a cooling effect on said hot-combustion-medium and raise the oxygen-gas concentration, so the cold-expansion-process will produce work with a cold-expansion-medium that is capable of fully releasing the reaction energy of the injected fuel; furthermore, in order for Mackay Cold-Expansion Cycle to achieve the optimal efficiency, shortening the durations of the fuel-cooling-process and the second-intake-process will be one of the most effective approaches, which will then require further developments on the specialized high-speed fuel-injector and high-speed air-injector for Mackay Cold-Expansion Cycle, so that the cold-expansion-process can have a longer duration in each crankshaft revolution; the presented FIG. 36-46 (Process Chart.1-11) are only showing the possible forms of Mackay Cold-Expansion Cycle, it should be clear that Mackay Cold-Expansion Cycle can perform with higher efficiency if the fuel-cooling-process and the second-intake-process is completed in shorter durations.

The active-exhaust-process (FIG. 7) is the process to expel the cold-expansion-medium out of the cold-expansion-chamber 20, at the same time adjusting the amount of the expelled cold-expansion-medium according to the engine operation condition, this can be performed in a few different methods; in the first embodiment shown in FIG. 1, the active-exhaust-process will be performed with an active-exhaust-valve operated with a servo-motor, a solenoid-valve, a hydraulic-actuator or a cam-driven-variable-timing-valve, which will adjust the valve closing time (VCT) in such a way that a controlled portion of the cold-expansion-medium will remain in the cold-expansion-chamber 20 at the end of the active-exhaust-process in a lighter load operation, while a lesser portion of cold-expansion-medium will remain in the cold-expansion-chamber 20 at the end of the active-exhaust-process in a heavier load operation; this can be considered as a form of conventional EGR (exhaust-gas-recirculation), where the cold-expansion-medium is not recalculated but directly remained in the cold-expansion-chambers to mix with the cooled high-boost-air of the next cycle, thereby lowering the oxygen concentration of the air-fuel-mixture of the next cycle in a light load operation; whereas the active-exhaust-process should expel out all the cold-expansion-medium therein at the maximum power output of MCES.

Figure 8:
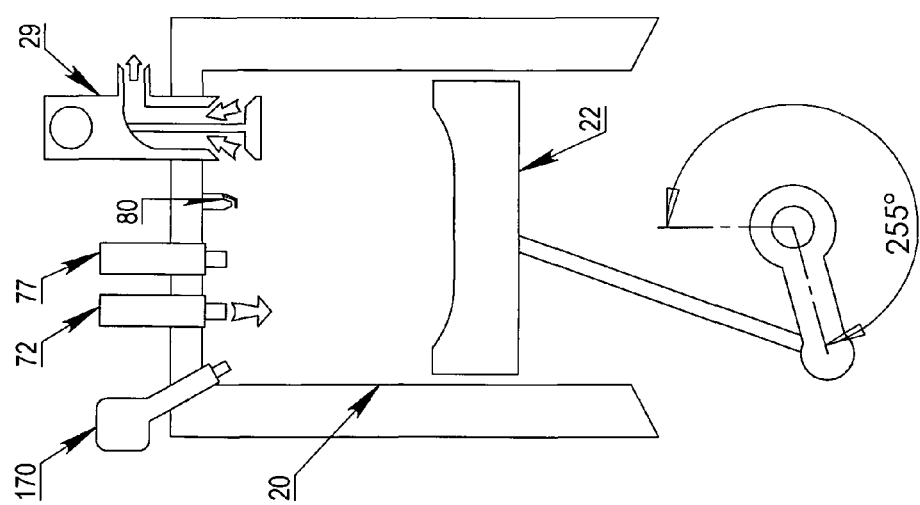
FIG. 8 shows a breathing-effect of the active-exhaust-process, which is used to control the amount of the cold-expansion-medium being expelled, wherein the cold-air-injection means and the exhaust-means co-act to adjust the amount of cold-expansion-medium, such that the actuation time of the cold-air-injection means overlaps with the actuation time of the exhaust means to blow out the cold-expansion-medium with the cooled high-boost-air in a medium load operation or a heavy load operation, thereby increasing the engine power output by a higher oxygen concentration; whereas this breathing-effect is disabled in a light load operation, the actuation time of the cold-air-injection means is delayed to a later (greater) crankshaft reference angle to allow more cold-expansion-medium of the last cycle to remain in the cold-expansion-chamber, thereby mixing an air-fuel-mixture with low oxygen concentration for the light load operation, wherein the exhaust means complements with the cold-air-injection means to adjust the oxygen concentration of the air-fuel-mixture.

FIG. 8 further explains the effect of the active-exhaust-process, in which the cold-air-injector 72 and the active-exhaust-valve 29 are both actuated to speed up the flow speed of the cold-expansion-medium that is expelling out of the cold-expansion-chamber 20; wherein FIG. 8 may also use FIG. 37 (Process Chart.2) as a reference to understand this effect.

Due to the high operation pressure characteristic of the cooled high-boost-air buffered in the cold-buffer, a portion of the cold-expansion-medium may remain in the cold-expansion-chamber and mixed with the cooled high-boost-air of the next first-intake-process during a light load operation because the cold-air-injector will inject a flow of cooled high-boost-air that can overcome the existing pressure in the cold-expansion-chamber, unlike the conventional engine that has to expel out the hot exhaust-gas before the intake of the low pressure fresh air.

Figure 34:
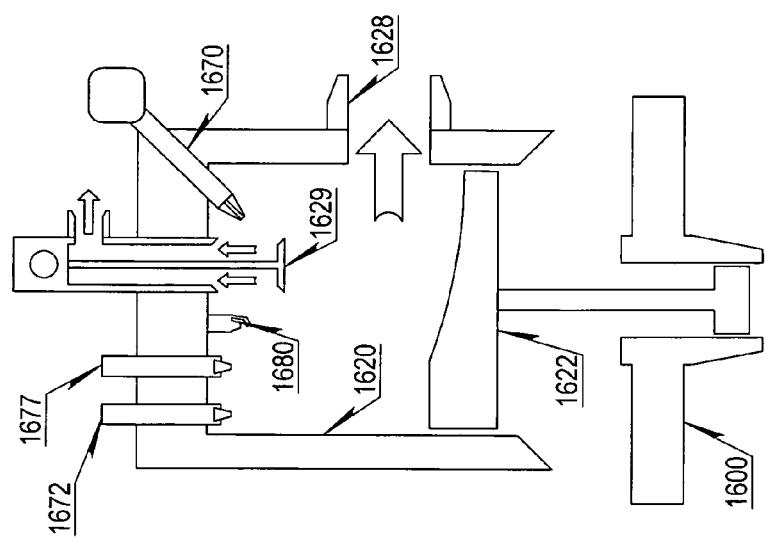
FIG. 34 shows a combined-exhaust type cold-expansion-chamber specialized for Mackay Cold-Expansion Cycle, wherein the chamber-wall-port and active-exhaust-valve co-acts to reduce the pumping loss in the active-exhaust-process.
Figure 35:
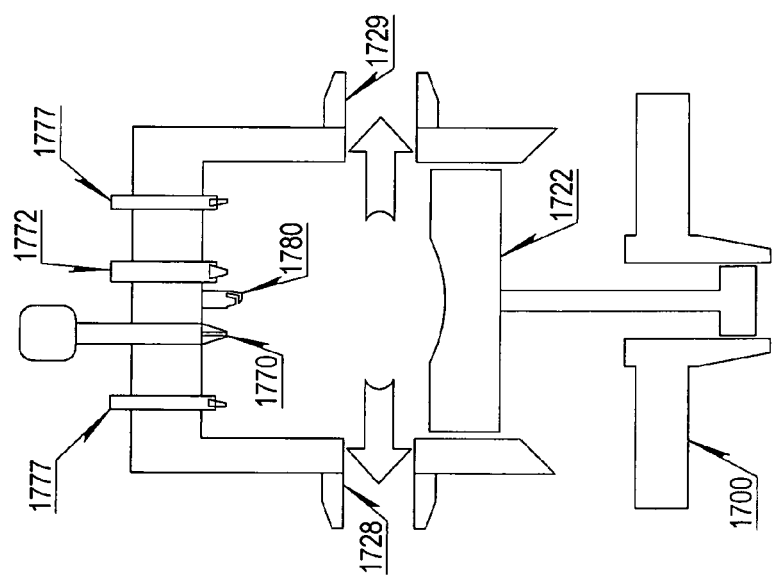
FIG. 35 shows a cold-expansion-chamber specialized for Mackay Cold-Expansion Cycle, which includes multiple reenergize-air-injectors designed to lower the heat loss during the second-intake-process; wherein the reenergize-air-injectors will charge the high-boost-air toward the chamber wall in the second-intake-process, thereby pushing the hot-combustion-medium toward the centre of the cold-expansion-chamber with multiple flows of heated high-boost-air from the reenergize-air-injectors; thereafter, the cold-expansion-medium is expelled throughout the chamber-wall-ports.

For better performance, the active-exhaust-process (FIG. 7) can be perform with one or more chamber-wall-ports as shown in FIG. 35, or a combination of the chamber-wall-port and the active-exhaust-valve as in FIG. 34 as the inertia of the cold-expansion-medium is directed toward BDC, by utilizing an exhaust-means such as the chamber-wall-port can greatly reduce the pumping loss and the heat loss.

In the ideal condition for automobile applications, the first-intake-process and the active-exhaust-process should complement each other to adjust the expelled amount of the cold-expansion-medium according to the engine operation condition; for example, in the heavy load operation, the active-exhaust-valve may delay its valve-closing-time so that all the cold-expansion-medium of the previous cycle can be blown out by the high-boost-air of the incoming first-intake-process; whereas in the light load operation or the idling operation, the active-exhaust-valve may shut at an earlier crankshaft reference angle to allow more cold-expansion-medium of the previous cycle to remain in the cold-expansion-chamber.

In the ideal condition for the power generation application or the large engine application, where the engine output do not change as much as in the automobile application, and the higher fuel efficiency is more important concern than a higher power-to-weight ratio, the chamber-wall-port structure can serve as a more preferable exhaust-means due to low pumping loss.

As for the first-intake-process, the actuation time of the cold-air-injector will basically depend on the performance of the cold-air-injector and the fuel-injector; in the large power generation application, an injection of high-boost-air at a later (greater) crankshaft reference angle (meant closer to TDC) is preferable for keeping the air-fuel-mixture at a low temperature prior to the spark-ignition, as long as an adequate amount of fuel is vaporized in the high-boost-air of the first-intake-process.

Figure 36:
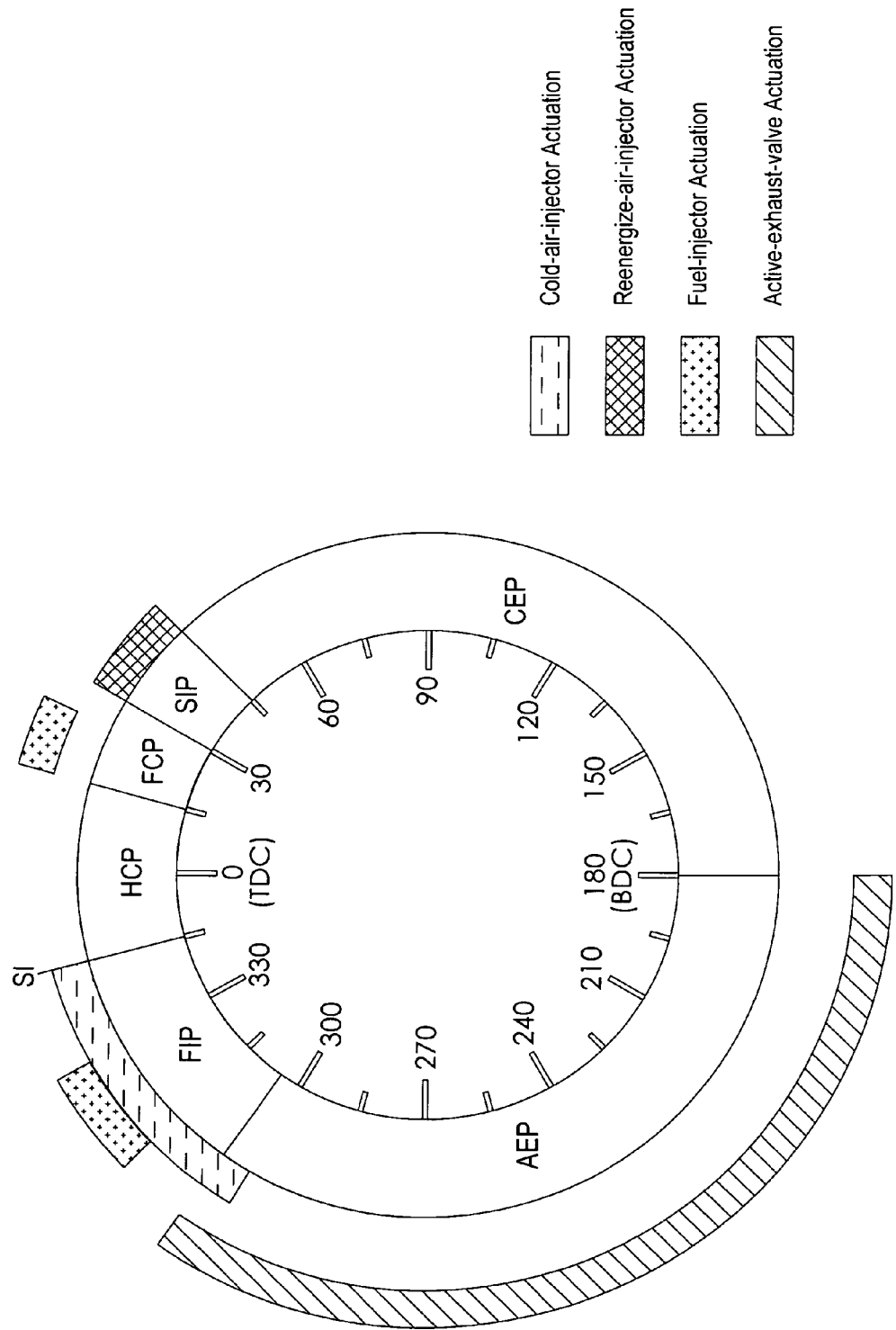
FIG. 36 (Process Chart.1) demonstrates a light load operation of Mackay Cold-Expansion Cycle for high-rpm-engine applications.
Figure 38:
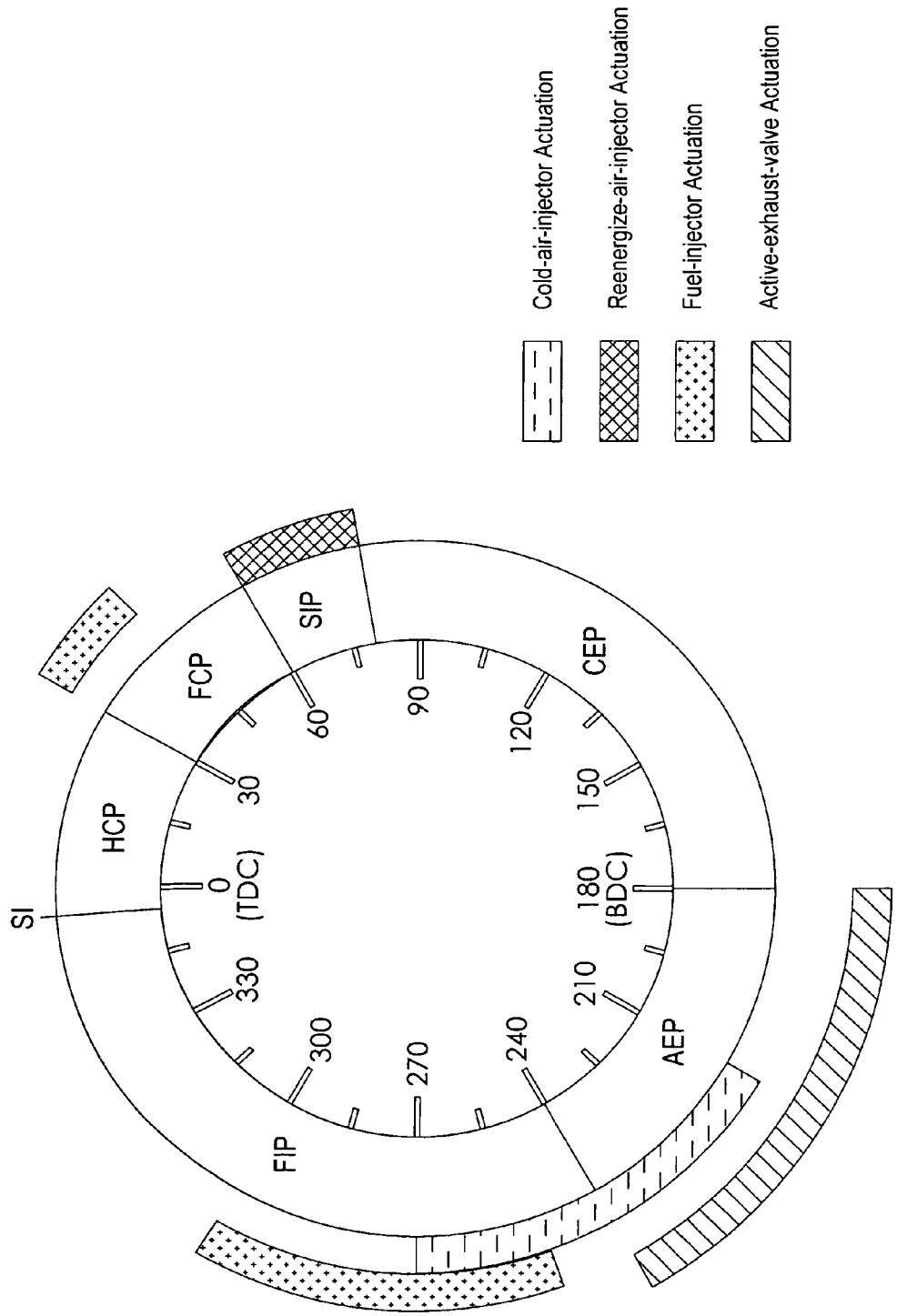
FIG. 38 (Process Chart.3) demonstrates a heavy load operation of Mackay Cold-Expansion Cycle for high-rpm-engine applications.

Now referring to the first embodiment again for the explanation of different load operations with the exemplary operation conditions set by the FIG. 36-38 (Process Chart.1-3), wherein the operation pressure values and the medium temperature values assumed hereafter are only for demonstration purpose:

FIG. 36 (Process Chart.1) shows an example of Mackay Cold-Expansion Cycle in the light load operation, FIG. 37 (Process Chart.2) shows an example of Mackay Cold-Expansion Cycle in the medium load operation, FIG. 38 (Process Chart.3) shows an example of Mackay Cold-Expansion Cycle in the heavy load operation; wherein the durations of each process noted in the process charts are only for demonstrating one of many possible control methods of Mackay Cold-Expansion Cycle.

In this light load operation shown in FIG. 36 (Process Chart.1), the cold-air-injector 72 injects a cooled high-boost-air of the cold-buffer 150 from 300 degree to 345 degree of crankshaft reference angle, and the active-exhaust-valve 29 shuts at 305 degree of crankshaft reference angle to allow some cold-expansion-medium of the last cycle to remain in the cold-expansion-chamber 20; the fuel of the first-intake-process is injected with the fuel-injector 170 from 315 degree to 330 degree of crankshaft reference angle; next, the air-fuel-mixture supplied by the first-intake-process is ignited with the spark-plug 80 at 345 degree of crankshaft reference angle to initiate the hot-combustion-process; next, the fuel-injector 170 injects the fuel again from 15 degree to 25 degree of crankshaft reference angle to commence the fuel-cooling-process, wherein said injected fuel will absorb the heat of the hot-combustion-medium and vaporize as a fuel-gas; next the average pressure of the hot-combustion-medium will decrease as the piston 22 moves toward bottom-dead-center; next, as the average pressure of the hot-combustion-medium decreases to lower than the operation pressure of the reenergize-buffer 155 (which is assumed to be set at 12 bar in the first embodiment) at 30 degree of crankshaft reference angle, the second-intake-process is initiated with the reenergize-air-injector 77 to inject a heated high-boost-air of the reenergize-buffer 155 from 30 degree to 45 degree of crankshaft reference angle, wherein the injected air-mass of the second-intake-process is about 75% of the injected air-mass of the first-intake-process, which forms a low-temperature oxygen-rich cold-expansion-medium by the end of the second-intake-process; next, the cold-expansion-medium will expand at a high expansion efficiency from 45 degree to 180 degree of crankshaft reference angle, wherein a high concentration of carbon-dioxide-gas is presented in the cold-expansion-medium and the average temperature of the cold-expansion-medium is reduced to about 400 degree Celsius; next the active-exhaust-valve 29 is actuated from 180 degree to 305 degree of crankshaft reference angle to expel the cold-expansion-medium into the heat-transfer-catalytic-converter 190, and the thermal energy of the expelled cold-expansion-medium will be conducted to the high-boost-air buffered in the reenergize-buffer 155.

In this medium load operation shown in FIG. 37 (Process Chart.2), the cold-air-injector 72 injects the high-boost-air of the cold-buffer 150 from 240 degree to 300 degree of crankshaft reference angle, the active-exhaust-valve 29 is shut at 260 degree of crankshaft reference angle, thereby expelling out almost all the cold-expansion-medium of the last cycle, the fuel of the firs-intake-process is injected from 270 degree to 300 degree of crankshaft reference angle; as the piston 22 moves up during the first-intake-process, the air-pressure in the cold-expansion-chamber 20 may raise to slightly higher than the operation pressure of the cold-buffer 150 before the spark-ignition; next, the air-fuel-mixture is ignited with the spark-plug 80 at 350 degree of crankshaft reference angle to initiate the hot-combustion-process, wherein the air-fuel-mixture is combusted as a hot-combustion-medium from 350 degree (10 degree before TDC) to 20 degree (20 degree after TDC) of crankshaft reference angle; next the fuel-injector 170 injects the fuel again from 20 degree to 40 degree of crankshaft reference angle to perform the fuel-cooling-process, wherein the injected fuel will absorb the heat of the hot-combustion-medium and vaporize as a fuel-gas; as the piston 22 moves toward bottom-dead-center, the average pressure of the hot-combustion-medium decreases to lower than the operation pressure of the reenergize-buffer 155 (which is assumed to be 12 bar in the first embodiment) at 50 degree of crankshaft reference angle; the second-intake-process is commenced from 50 degree to 75 degree of crankshaft reference angle, wherein the reenergize-air-injector 77 will inject a heated high-boost-air of the reenergize-buffer 155 into the cold-expansion-chamber 20, and the injected air-mass of the second-intake-process is about 120% of the injected air mass of the first-intake-process, which forms a low-temperature oxygen-rich cold-expansion-medium by the end of second-intake-process; next, the cold-expansion-process is commenced with a high expansion efficiency from 75 degree to 180 degree of crankshaft reference angle, wherein a high concentration of carbon-dioxide-gas is presented in the cold-expansion-medium and the average temperature of the cold-expansion-medium is reduced to about 550 degree Celsius; next the active-exhaust-valve 29 is actuated from 180 degree to 260 degree of crankshaft reference angle to commence the active-exhaust-process, wherein the cold-expansion-medium is expelled to the heat-transfer-catalytic-converter 190, and the thermal energy of the expelled cold-expansion-medium will be conducted to the high-boost-air buffered in the reenergize-buffer 155.

In this heavy load operation shown in FIG. 38 (Process Chart.3), the cold-air-injector 72 injects the cooled high-boost-air of the cold-buffer 150 from 210 degree to 270 degree of crankshaft reference angle, the active-exhaust-valve 29 is shut at 240 degree of crankshaft reference angle, thereby expelling out all the cold-expansion-medium of the last cycle and filling in a high amount of cooled high-boost-air from the cold-buffer 150, the fuel of the firs-intake-process is injected from 250 degree to 300 degree of crankshaft reference angle; as the piston 22 moves toward top-dead-center during the first-intake-process, the air-pressure in the cold-expansion-chamber 20 raises to higher than the operation pressure of the cold-buffer 150 before the spark-ignition; next, the air-fuel-mixture is ignited at 355 degree of crankshaft reference angle to initiate the hot-combustion-process, wherein the air-fuel-mixture is combusted as a hot-combustion-medium from 355 degree (5 degree before TDC) to 30 degree (30 degree after TDC) of crankshaft reference angle; next the fuel-injector 170 injects the fuel again from 30 degree to 45 degree of crankshaft reference angle to perform the fuel-cooling-process, wherein the injected fuel will absorb the heat of the hot-combustion-medium and vaporize as a fuel-gas; as the piston 22 moves toward bottom-dead-center, the average pressure of the hot-combustion-medium decreases to lower than the operation pressure of the reenergize-buffer 155 (which is assumed to be 12 bar in the first embodiment) at 60 degree of crankshaft reference angle; the second-intake-process is commenced from 60 degree to 80 degree of crankshaft reference angle, wherein the reenergizeair-injector 77 will inject a heated high-boost-air of the reenergize-buffer 77 into the cold-expansion-chamber 20, and the injected air-mass of the second-intake-process is about 150% of the injected air-mass of the first-intake-process, which forms a low-temperature oxygen-rich cold-expansion-medium by the end of second-intake-process; next, the cold-expansion-process is commenced with a high expansion efficiency from 80 degree to 180 degree of crankshaft reference angle, wherein a high concentration of carbon-dioxide-gas is presented in the cold-expansion-medium and the average temperature of the cold-expansion-medium is reduced to about 700 degree Celsius; next the active-exhaust-valve 29 is actuated from 180 degree to 240 degree of crankshaft reference angle to commence the active-exhaust-process, wherein the cold-expansion-medium is expelled to the heat-transfer-catalytic-converter 190, and the thermal energy of the expelled cold-expansion-medium will be conducted to the high-boost-air buffered in the reenergize-buffer 155.

From the above description, it can be seen that the initiation-time of the second-intake-process may vary according to the operation condition of the hot-combustion-process; generally speaking, the initiation time of the second-intake-process will be shifted to a later (greater) crankshaft reference angle due to a hot-combustion-process with a higher average pressure, whereas the initiation time of the second-intake-process will be shifted to a earlier (smaller) crankshaft reference angle due to a hot-combustion-process with a lower average pressure.

The mass ratio between the injected air-mass of the first-intake-process and the injected air-mass of the second-intake-process may also vary according to the necessary amount of air to cool down the hot-combustion-medium for accelerating the conversion of carbon-dioxide-gas and minimizing heat-loss, wherein the average temperature of the cold-expansion-medium is to be regulated within the range of 400-1100 degree Celsius, so that a regular catalytic converter can still maintain its functionality, as current commercialized catalytic converters usually have an operable temperature limit designed at about 400 degree Celsius; however, a heat-transfer-catalytic-converter capable of operation in a even lower temperature will be more preferable because this can further lower the heat loss of Mackay Cold-Expansion Cycle.

In FIG. 1, the cold-expansion-medium expelled out of the cold-expansion-chamber 20 will flow into the heat-transfer-catalytic-converter 190, and the reenergize-buffer 155 will absorb the heat conducted from the heat-transfer-catalytic-converter, so that the high-boost-air buffered in the reenergize-buffer 155 will have a high internal energy (temperature) with the recovered thermal energy; next the expelled cold-expansion-medium charges into the turbo-turbine 109, which drives the turbo-compressor 101 to provide a flow of low-boost-air into the central compressor 130.

The central-compressor 130 of FIG. 1 can be a scroll type compressor, a screw-type compressor, a piston type compressor, the centrifugal type compressor, a rotary type compressor, an axial-turbine compressor, or any other conventional air-compressor; however the central-compressor should be one that can operate at high revolution speed to produce a continuous flow at all time with variable airflow speed control, so that the cold-buffer 72 and the reenergize-buffer 77 can have a constant operation pressure regardless of the changes in power output.

It is also possible to have two or more central-compressors connecting in parallel with different charging phase to supply the high-boost-air to the air-buffer-system, and this is one of the solutions to have a more stabilized operation pressure for the cold-buffer and the reenergize-buffer if a piston type central-compressor or other low-speed central-compressor is used; this is because the piston type central-compressor or other low-speed central compressor will generate a high compression pressure surge to the air-buffer-system, which might affect the performance and the injected air-mass control of the cold-air-injector and the reenergize-air-injector, thereby causing a faulty operation; therefore, implementing more than one central-compressor into MCES is a much more logical design if the operation cost permits.

As it can be seen that the first embodiment of FIG. 1 can have a higher power-to-weight ratio and occupy only a small engine system compartment in a vehicle, however it requires that the vehicle to have an large air-conditioning system such as one in a commercial long-distance bus, so that the refrigerant-circuit that co-operates with the compressor-cooler will not increase the equipment cost.

Figure 9:
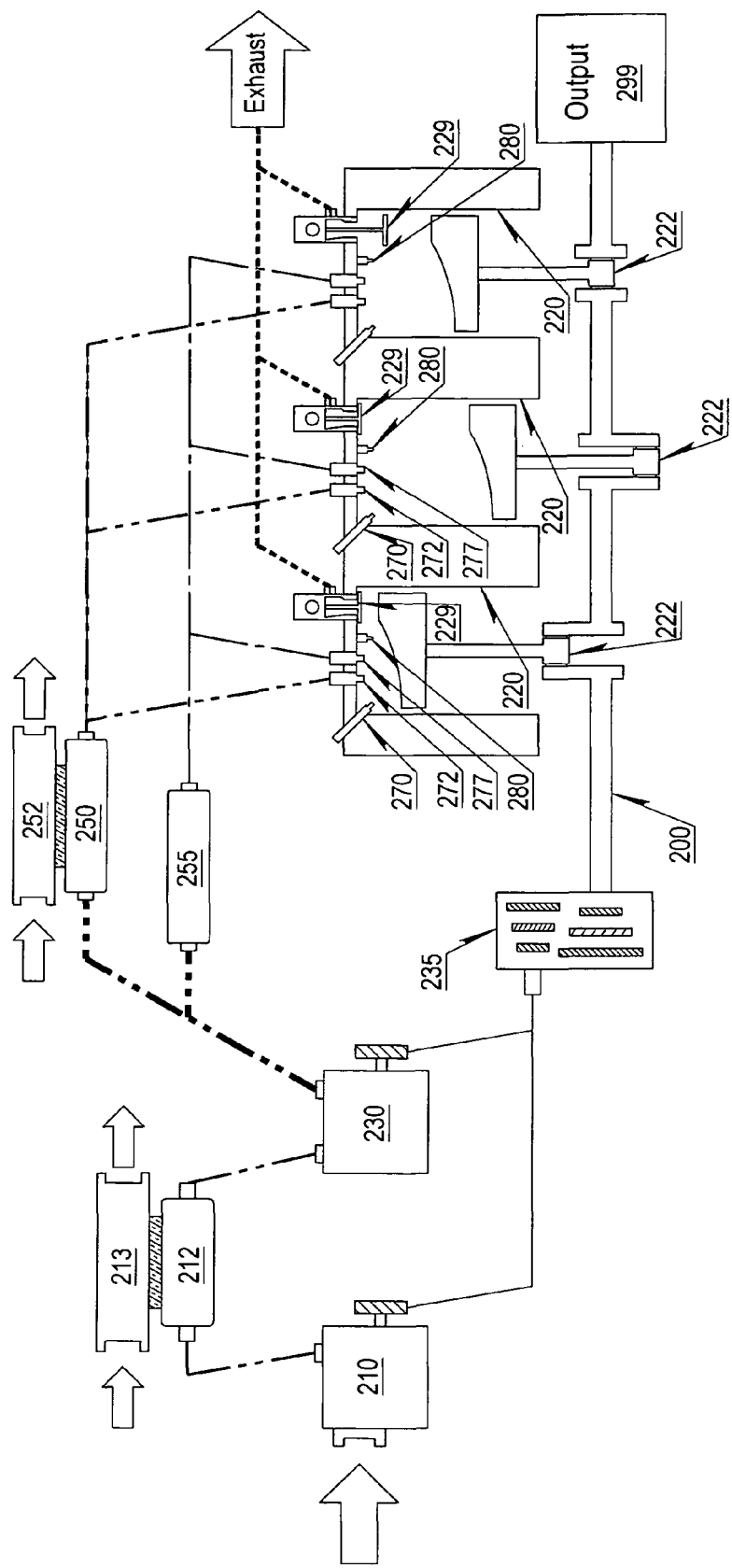
FIG. 9 is an illustrative view of the second embodiment of Mackay Cold-Expansion Engine System, which is a basic MCES configuration preferable for light duty applications such as a passenger vehicle or a light-duty truck; wherein a two-stage air-compressor is used as an air-compression means to provide high-boost-air to the cold-buffer and the reenergize-buffer.

Now referring to FIG. 9 for the second embodiment of Mackay Cold-Expansion Engine System, which is a more suitable configuration for the passenger vehicle and the light-duty truck because the air-conditioning systems equipped in these applications are of a lesser cooling capacity, so the addition of the compressor-cooler will be an excessive equipment cost for both the user and the manufacturer; instead, the applications such as passenger vehicle are more preferable to equip a cooler utilizing the ambient air due to the constant highway usage.

The components in FIG. 9 are labeled as the low-pressure-compressor 210, the low-pressure-buffer 212, the low-pressure-cooler 213, the central-compressor 230, the cold-buffer 250, the cold-buffer-cooler 252, the reenergize-buffer 255, the compressor-transmission 235, the cold-expansion-chambers 220, the pistons 222, the cold-air-injectors 272, the reenergize-air-injectors 277, the fuel-injectors 270, the spark-plugs 280, the crankshaft 200 and the output shaft 299.

The low-pressure-compressor will compress the ambient air to generate a flow of low-boost-air to the low-pressure-buffer 212; next the low-pressure-cooler 213 utilizes an ambient air flow to cool said flow of low-boost-air; next the low-pressure-buffer 212 supplies the cooled low-boost-air to the central-compressor 230; next the central-compressor 230 generate a flow of high-boost-air to both the cold-buffer 250 and the reenergize-buffer 255.

The cold-buffer 250 will buffer and supply a cooled high-boost-air to the cold-air-injectors 272 at a constant operation pressure set by the power-management-unit in the range of 4-25 bar, wherein the cold-buffer-cooler 252 will utilize a flow of ambient air to reduce the temperature of the high-boost-air buffered in the cold-buffer 250.

The reenergize-buffer 255 will buffer a heated high-boost-air to the reenergize-air-injectors 277 at a constant operation pressure set by the power-management-unit in the range of 4-30 bar.

The compression-transmission 235 is controlled by the power-management-unit to keep the operation pressure of the cold-buffer 250 and the operation pressure of the reenergize-buffer 255 stabilized, wherein the compression-transmission 235 adjusts its gear ratio setting to change the operation speeds of the low-pressure-compressor 210 and the central-compressor 230 in such a way that, the airflow speeds in said two buffers will increase proportionally to a increase in the engine power output while the operation pressures of said two buffers remain almost constant.

For the ease of comprehension and the demonstration purpose, the pressure values and temperature values in a regular operation are assumed as follows: the reenergize-buffer has an operation pressure of 12 bar, and the heated high-boost-air has a temperature of about 80-200 degree Celsius, the cold-buffer has an operation pressure of 6 bar, the cooled high-boost-air has an average temperature has an average temperature of 30 degree Celsius, the average temperature of the exhaust-gas (the expelled cold-expansion-medium) is at about 400-550 degree Celsius.

Each cold-expansion-chamber 220 will operate in a Mackay Cold-Expansion Cycle which consists of the first-intake-process, the hot-combustion-process, the fuel-cooling-process, the second-intake-process, the cold-expansion-process, and the active-exhaust-process, wherein the fuel-cooling-process may be disabled in the light load operation or the engine idling operation.

The first-intake-process is performed by injecting a controlled flow of the cooled high-boost-air with the associated cold-air-injector 272 and a controlled fuel with the associated fuel-injector 270, thereby mixing an air-fuel-mixture in the cold-expansion-chamber 220 before the TDC position (0 degree of crankshaft reference angle); wherein the first-intake-process and the active-exhaust-process will complement each other to adjust a proper oxygen-to-fuel ratio in said air-fuel-mixture by controlling the amount of the cold-expansion-medium being expelled in the previous cycle.

The hot-combustion-process is initiated with the spark-plugs to produce a hot-combustion-medium that has a high combustion temperature and a high concentration of carbon monoxide; wherein the spark-ignition may be adjust from 40 degree BTDC (before top-dead-centre) to 40 degree ATDC (after top-dead-centre) depending on the size of the cold-expansion-chamber and the crankshaft revolution speed.

The fuel-cooling-process is performed by injecting a second fuel into said hot-combustion-medium with the fuel-injector 270 after most of the oxygen-gas content of said hot-combustion-medium has combusted into carbon-monoxide-gas; wherein said second fuel should not increase the medium temperature of said hot-combustion-medium because of the absence of the oxygen-gas, so said second fuel is vaporized as a fuel-gas by the heat of the carbon-monoxide-gas and hot gases in the hot-combustion-medium, thus decreasing the overall medium temperature of the hot-combustion-medium.

The second-intake-process is performed by injecting a controlled flow of the heated high-boost-air into said hot-combustion-medium with the associated reenergize-air-injector 277 after the average pressure of said hot-combustion-medium has decreased to lower than the operation pressure of reenergize-buffer 277, thereby forming a cold-expansion-medium that has an average temperature of 400-1100 degree Celsius and a high concentration of oxygen-gas by the end of the second-intake-process.

The cold-expansion-process is performed by producing power with said cold-expansion-medium; generally, the temperature of the hot-combustion-medium is reduced by 30%-80% after mixing with said controlled flow of the heated high-boost-air, which forms the cold-expansion-medium at a low-temperature and high-oxygen-concentration condition ideal for generating power, wherein the average temperature of said cold-expansion-medium is regulated to 400-1100 degree Celsius for accelerating the conversion of carbon-monoxide-gas to carbon-dioxide-gas, and the low medium temperature characteristic of the cold-expansion-medium will prevent the heat energy to dissipate throughout the chamber wall of the cold-expansion-chamber 220.

The active-exhaust-process is performed by controlling the actuation time of the active-exhaust-valve 229; wherein the active-exhaust-valve 229 may utilize a cam-driven variable-timing-valve, a servo-motor-valve, a hydraulic-valve or a solenoid-valve to adjust said actuation time in the range of 135 degree to 330 degree of crankshaft reference angle according to the control instruction from the power-management-unit; wherein the purpose of the active-exhaust-process is to control the amount of the cold-expansion-medium being expelled, thereby adjusting the oxygen-to-fuel ratio of the air-fuel-mixture in the incoming first-intake-process.

In the second embodiment of MCES, the low-pressure-compressor 210 and the central-compressor 230 will together perform a two-stage air-compression, and a low-boost-air supplied by the low-pressure-compressor is cooled with the low-pressure-cooler 213 before charging into the central-compressor 230, thereby decreasing the compression energy required to generate a high-boost-air from the central-compressor 230; next the high-boost-air output from the central-compressor 230 is distributed to the cold-buffer 250 and the reenergize-buffer 255, wherein the cold-buffer 250 will cool the high-boost-air therein by the cold-buffer-cooler 252, and generates a cooled high-boost-air to the cold-air-injectors 272, which in terms lower the temperature of the hot-combustion-medium in the hot-combustion-process, in other words, the purpose of the cold-buffer-cooler 252 is to reduce the peak temperature of the hot-combustion-medium thereby preventing the excessive heat loss in the hot-combustion-process; wherein the reenergize-buffer 255 do not require further cooling since the internal energy of the heated high-boost-air buffered in the reenergize-buffer will eventually be combined with the internal energy of the hot-combustion-medium in the second-intake-process as expansion force.

As a supplementary note, the second-intake-process will have a cooling-effect that reduces the temperature of the hot-combustion-medium by 30%-80%, this is what takes place in the cold-expansion-chamber thought out the second-intake-process with some assumptions in a medium load operation: at the beginning the of the second-intake-process, the hot-combustion-medium is expanding at an average pressure of 10 bar and an average temperature of 1500 degree Celsius, and next a controlled flow of the heated high-boost-air is introduced into the cold-expansion-medium, wherein said heated high-boost-air has an average pressure of 12 bar and an average temperature of 150 degree Celsius (this value changes with the heat transferred from the expelled cold-expansion-medium), and said heated high-boost-air has an air-mass that is at least 50% of the injected air-mass of the first-intake-process; consequently a cold-expansion-medium is formed at a temperature regulated between 1100 degree Celsius and 400 degree Celsius, wherein the oxygen-gas content of the heated high-boost-air will then accelerate the carbon-dioxide-gas conversion, which in terms releases all the reaction energy of the injected fuel in the form of expansion force.

Unlike other engine system, the power-management-unit of MCES needs to further take in the factors of the pressure of the cold-expansion-medium, the temperature of the cold-expansion-medium, the compression energy consumed by the air-compression means (central-compressor and the low-pressure-compression in FIG. 9), the heat-current conducted out of the cold-expansion-chambers (which can be measure by the a temperature sensor embedded in the cold-expansion-chamber or the engine cooling circulation) and the oxygen concentration in the expelled cold-expansion-medium, in order to correctly adjust the actuation time of each injector and the operation speed of the air-compression means.

One of the major difference between a MCES and a conventional engine is that the MCES will expel a cold-expansion-medium with a high oxygen concentration even in a high power output operation; if the oxygen sensor at the exhaust manifold of a cold-expansion-chamber detects no oxygen gas, it would be an obvious indication that the amount of fuel injected in the fuel-cooling-process or the amount of the heated high-boost-air injected in the second-intake-process is incorrect and requires adjustment to some of the operation elements of the MCES.

In the second embodiment of MCES, the compressor-transmission 235 can control one of the pre-compressor and the central-compressor or both of said two compressors according to the necessary air-mass to sustain the preset operation pressures of the cold-buffer and the reenergize-buffer; wherein the operation pressures of the cold-buffer and the reenergize-buffer may be set in the range of 4-25 bar for the automobile applications due to the safety concern and the limit of the compression efficiency, while said operation pressure settings could be higher for the power generator applications with the necessary explosion protection for the cold-buffer and the reenergize-buffer.

Figure 10:
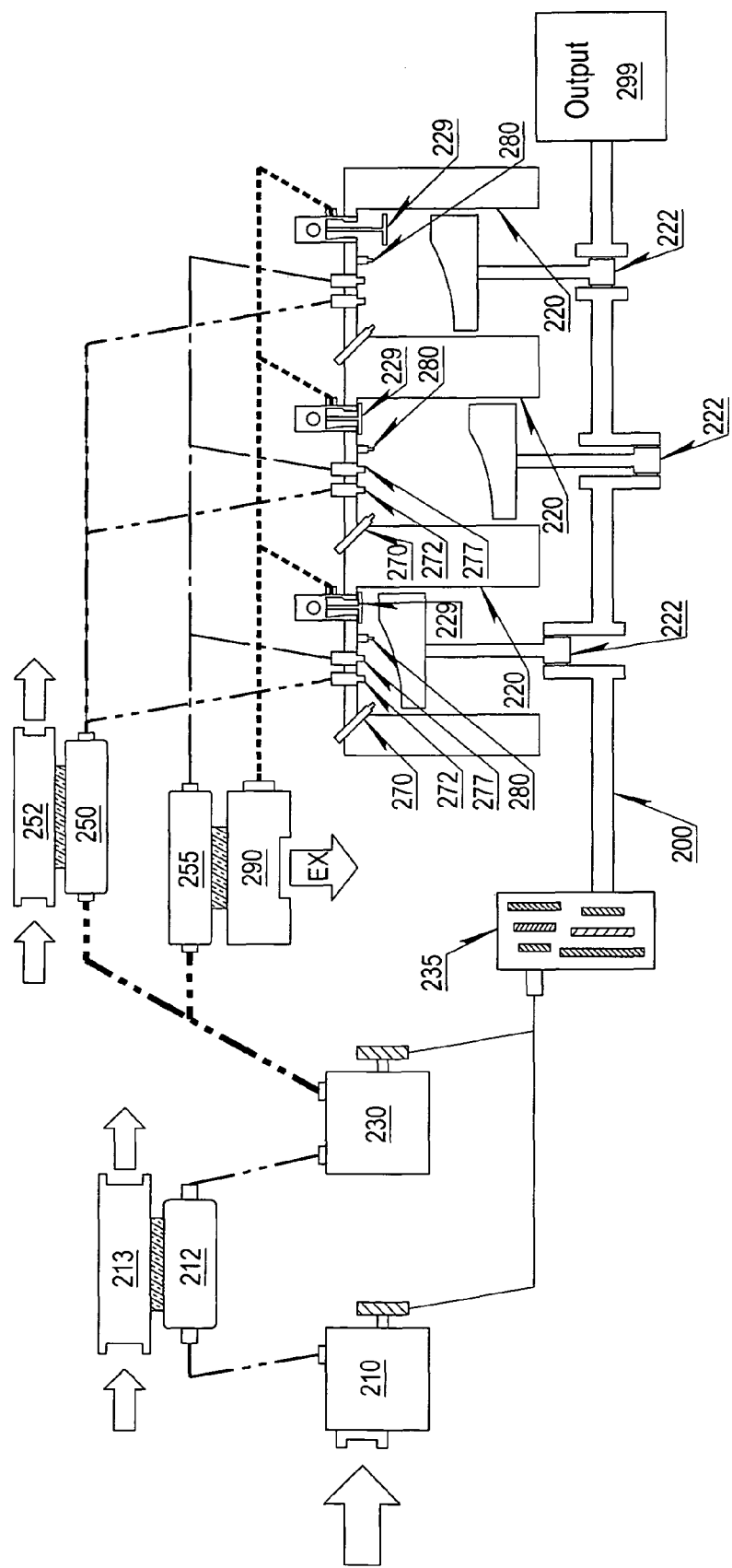
FIG. 10 is a more efficient MCES configuration of FIG. 9, in which a heat-transfer-catalytic-converter is included.

Now referring to FIG. 10, which is an alternative form of FIG. 9, wherein the reenergize-buffer 255 is receiving the heat energy conducted from the heat-transfer-catalytic-converter 290, and this is referred as the reenergize-process; this reenergize-process will keep the temperature of the expelled cold-expansion-medium above the operable temperature of the catalytic-conversion means, thereby effecting a chemical reaction to convert the toxic combustion by-products in the expelled cold-expansion-medium in the light load operation, and increase the overall energy efficiency in the medium load operation and the heavy load operation.

To clarify the effect of the reenergize-process, a light load operation is assumed as follows: the heated high-boost-air of the reenergize-buffer 255 is heated up to about 80-200 degree Celsius, and the operation pressure is kept at 12 bar by adjusting operation speed of the air-compression means, the hot-combustion-process ignites an air-fuel-mixture that combusts as a hot-combustion-medium at an average temperature about 1500 degree Celsius, and the pressure of this hot-combustion-medium decreases to lower than 12 bar at 30 degree of crankshaft reference angle, and the reenergize-air-injector 277 will open in a controlled actuation time computed by the power-management-unit, such that the injected air-mass of the second-intake-process is just enough to keep the temperature of the cold-expansion-medium above the operable temperature of the catalytic conversion means, which is about 400 degree Celsius to 450 degree Celsius as of the current technology can provide, next the cold-expansion-medium is expanding at about 700-450 degree Celsius and then exhausting at about 450-400 degree Celsius into the heat-transfer-catalytic-converter 290, wherein the heat-transfer-catalytic-converter 290 conducts heat energy to the reenergize-buffer 255; in other words, a more efficient heat-transfer-catalytic-converter 290 is, the higher the temperature of the heated high-boost-air is heated up to, at the same time the energy efficiency is maintained at a high level without causing air pollution in the light load operation.

In a light load operation of the MCES without the heat-transfer-catalytic-converter, the MCES will have to reduce the amount of the injected air-mass of the second-intake-process, which will cause a significant drop in the overall energy efficiency, or the MCES will be expelling a cold-expansion-medium that has a average temperature lower than the operable temperature of the catalytic conversion means.

In a heavy load operation of the MCES with the heat-transfer-catalytic-converter, the MCES can recover the heat energy remained in the expelled cold-expansion-medium, which may be at an average temperature of up to 1100 degree Celsius, thereby heating a high-boost-air buffered in the reenergize-buffer up to 400 degree Celsius or higher; in this condition, the power-management-unit will need to compute the amount of the air-mass of the heated high-boost-air is allowed to injected into the cold-expansion-chamber, such that the average medium temperature of the cold-expansion-medium is regulated to lower than 1100 degree Celsius in order for the conversion of carbon-dioxide-gas to take place; in this scenario, the total air-mass of the heated high-boost-air requires to efficiently perform a Mackay Cold-Expansion Cycle is greatly reduced, which in terms decrease the portion of the workload on the air-compression means used to produce the high-boost-air to the reenergize-buffer.

In a heavy load operation of the MCES without the heat-transfer-catalytic-converter, the MCES still controls the injected air-mass of the second-intake-process to regulate the temperature of the cold-expansion-medium, however this MCES will consume relatively more compression energy to provide an equivalent power output than a MCES with the heat-transfer-catalytic-converter.

Figure 11:
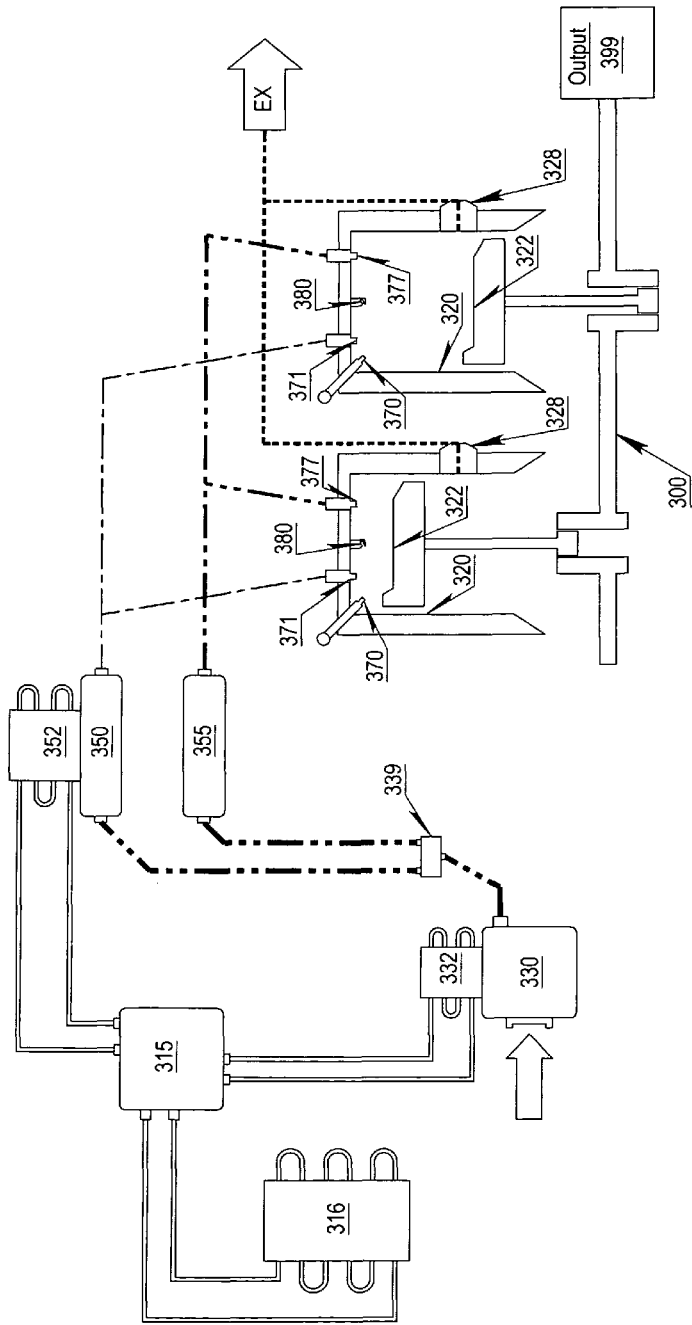
FIG. 11 is an illustrative view of the third embodiment of Mackay Cold-Expansion Engine System, which is a subzero-buffer type MCES configuration preferable for the power generation applications, wherein the air-buffer-system includes a refrigeration-circuit to lower the temperature of the high-boost-air buffered for the first-intake-process, thereby forming a low-temperature hot-combustion-medium in the hot-combustion-process, which will in terms form a cold-expansion-medium at a very low temperature for the best expansion efficiency during the cold-expansion-process.

Now referring to FIG. 11 for the third embodiment of the present invention, which is a basic subzero-intake type MCES configuration preferably for use in a large power generation application; wherein the required range of the engine output is relatively narrow than the other applications, and the engine system is to be situated in a controlled environment for the refrigerant-circuit to operation.

The components of FIG. 11 are labeled as the central-compressor 330, the compressor-cooler 332, the refrigerant-circuit 316, the subzero-buffer 350, the subzero-cooler 352, the reenergize-buffer 355, the refrigerant-condenser 316, the fuel-injectors 370, the spark-plugs 380, the pistons 322, the cold-expansion-chambers 320, the crankshaft 300, the cold-air-injectors 372, the reenergize-air-injectors 377, the chamber-wall-ports 328, the flow-distributor 339 and the output shaft 399.

The operation speed of the central-compressor 330 is controlled by a power-management-unit of MCES, such that the operation pressure of the subzero-buffer and the operation pressure of the reenergize-buffer are stabilized for operations of the cold-air-injectors 372 and the reenergize-air-injectors 377.

The central-compressor 220 will compress the atmospheric air to generate a high-boost-air to the subzero-buffer 350 and the reenergize-buffer 355, wherein the compressor-cooler 332 will cool the air during the air-compression process in the central-compressor 330, which then lowers the compression energy required to generate said high-boost-air; wherein said high-boost-air is generated at a temperature about 10-50 degree Celsius.

The subzero-buffer 350 will receive a portion of said high-boost-air and further cools the high-boost-air therein to negative 5-30 degree Celsius by the refrigerant-evaporation-process of the subzero-cooler 352.

The subzero-cooler 352 and the compressor-cooler 332 will both absorb heat by the refrigerant-evaporation-process; the refrigerant-condenser 316 dissipates heat out to the atmospheric air; the refrigerant-circuit 315 consists of a refrigerant-compressor and the necessary pressure regulating means to perform a refrigerant-condensation-process in the refrigerant-condenser 316 and said two refrigerant-evaporation-processes in the subzero-cooler 352 and the compressor-cooler 332.

The flow-distributor 339 will control the airflow ratio between the high-boost-air directed into the subzero-buffer and the high-boost-air directed into the reenergize-buffer.

Each cold-expansion-chamber 320 will perform in a Mackay Cold-Expansion Cycle, and said cycle consists of a first-intake-process, a hot-combustion-process, a fuel-cooling-process, a second-intake-process, a cold-expansion-process, and an exhaust-process.

The first-intake-process is performed by taking in a controlled flow of the cooled high-boost-air with the cold-air-injectors 372 and a controlled fuel with the fuel-injectors 370 before the top-dead-centre (0 degree of crankshaft reference angle), thereby forming an low-temperature air-fuel-mixture (at a temperature lower than 0 degree Celsius) prior to the spark-ignition; wherein it is preferable to maintain a low mixture temperature, so the first-intake-process of this particular MCES should be as short as possible, the process duration of the first-intake-process should also be as close to 0 degree of crankshaft reference angel as possible to prevent said air-fuel-mixture to expand prior to the spark-ignition; an exemplary duration of the first-intake-process can be set from 340 degree to 350 degree of crankshaft reference angle.

The hot-combustion-process is performed by igniting said low-temperature air-fuel-mixture as a hot-combustion-medium, which will have a temperature about 1200 degree Celsius or lower.

The fuel-cooling-process is performed by injecting a second controlled fuel into said hot-combustion-medium after most of the oxygen content of said low-temperature air-fuel-mixture has combusted into a carbon-monoxide-gas, so that said second controlled fuel will absorb the heat of the carbon-monoxide-gas and vaporize as a fuel-gas; as a supplementary note, the large power generator has a very low revolution rate (such as 10 rpm), the fuel-cooling-process may take as short as 1 degree of crankshaft rotation or less to complete.

The second-intake-process is performed by injecting a controlled flow of the heated high-boost-air of the reenergize-buffer 355 into the cold-expansion-chamber 320 within a duration range of 30 degree to 105 degree of crankshaft reference angle; wherein the power-management-unit will compute the correct actuation-time of the reenergize-air-injector 372, such that the injection of said heated high-boost-air is initiated at a time that the average pressure of said hot-combustion-medium has decreased to lower than the operation pressure of the reenergize-buffer, and said reenergize-air-injector will be shut after a computed amount of the heated high-boost-air is injected to mix with said hot-combustion-medium, wherein said computed amount of the heated high-boost-air will reduce the temperature of the hot-combustion-medium by 30%-80%; wherein the injected air mass of the second-intake-process may range from 150% to 350% of the injected air mass of the first-intake-process, thereby producing a cold-expansion-medium at a low-temperature and oxygen-rich condition.

The cold-expansion-process is to produce power with said cold-expansion-medium after the second-intake-process has completed; wherein said cold-expansion-medium will expand with almost no heat loss due to the low medium temperature, and the average temperature of said cold-expansion-medium may be as low as 150 degree by the end of the cold-expansion-process (which in terms will require other type of catalytic conversion means that is capable of operation at low temperature range).

The exhaust-process is to expel said cold-expansion-medium out of the cold-expansion-chamber with the chamber-wall-port.

As it can be seen that the subzero-intake type MCES is for the large power generation applications or the large engine applications, the crankshaft revolution speed may range from about 200 rpm to 10 rpm or lower, so the fuel-cooling-process and the second-intake-process can be easily shorten to less than 1 degree of crankshaft rotation with multiple injection means, thereby extending the process duration of the cold-expansion-process to optimize the energy efficiency of MCES.

The first-intake-process should be finished before 0 degree (TDC) of crankshaft reference angle, and the hot-combustion-process is preferably to be initiated before TDC, such that the cold-expansion-process is to perform with relatively longer process duration.

The central-compressor 330 may be driven by a variable-speed electrical motor instead of a compressor-transmission coupled to the crankshaft 300 in the large power generation applications; wherein, regardless of the different operation speed control methods, the power-management-unit must control the operation speed of the air-compression-means to keep the subzero-buffer 350 and the reenergize-buffer 355 at their respective operation pressures.

Figure 12:
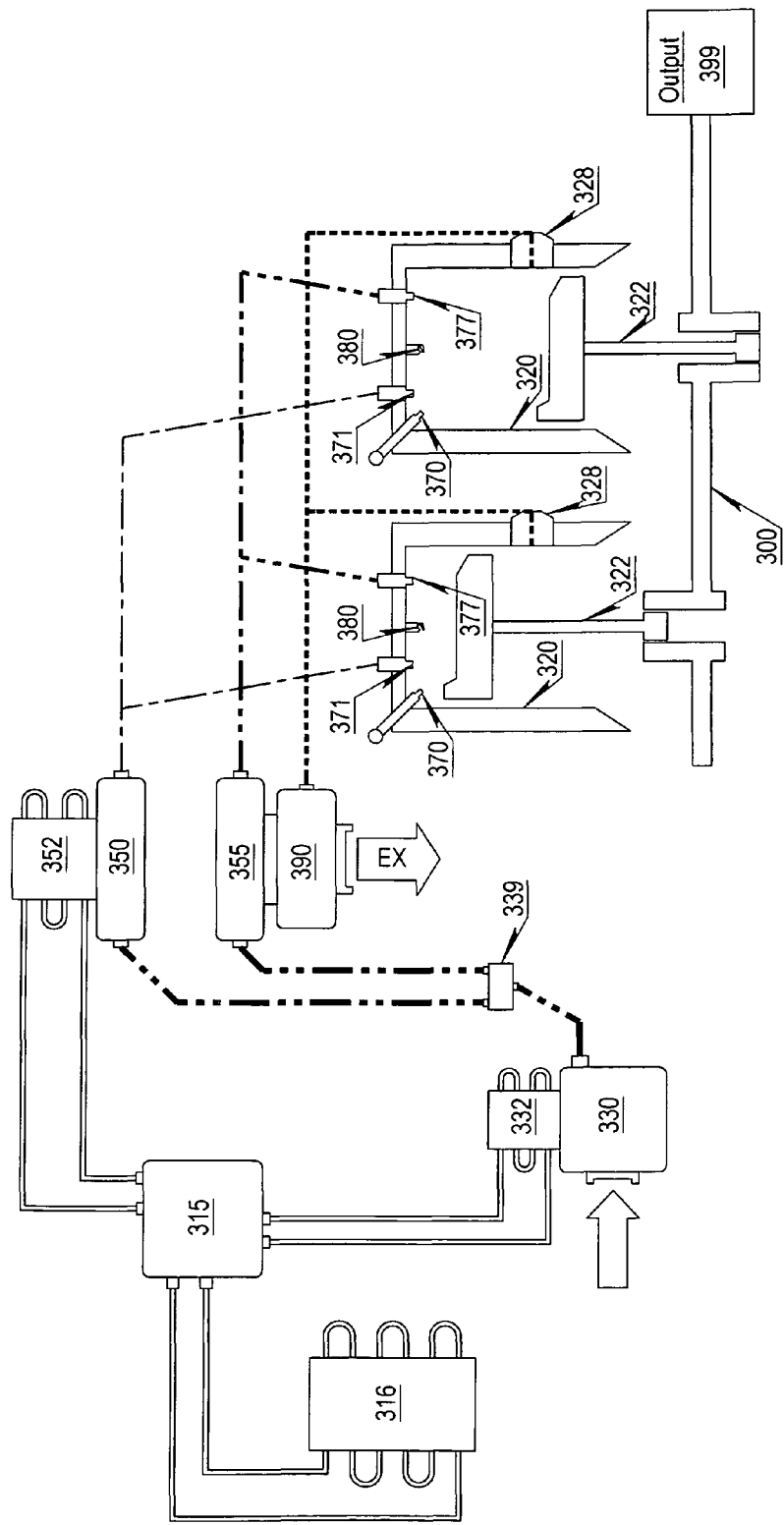
FIG. 12 is another subzero-buffer type MCES configuration including a heat-transfer-catalytic-converter.

FIG. 12 is an alternative form of the subzero-intake type MCSE shown in FIG. 11, wherein a heat-transfer-catalytic-converter 390 is included to perform the reenergize-process.

Figure 13:
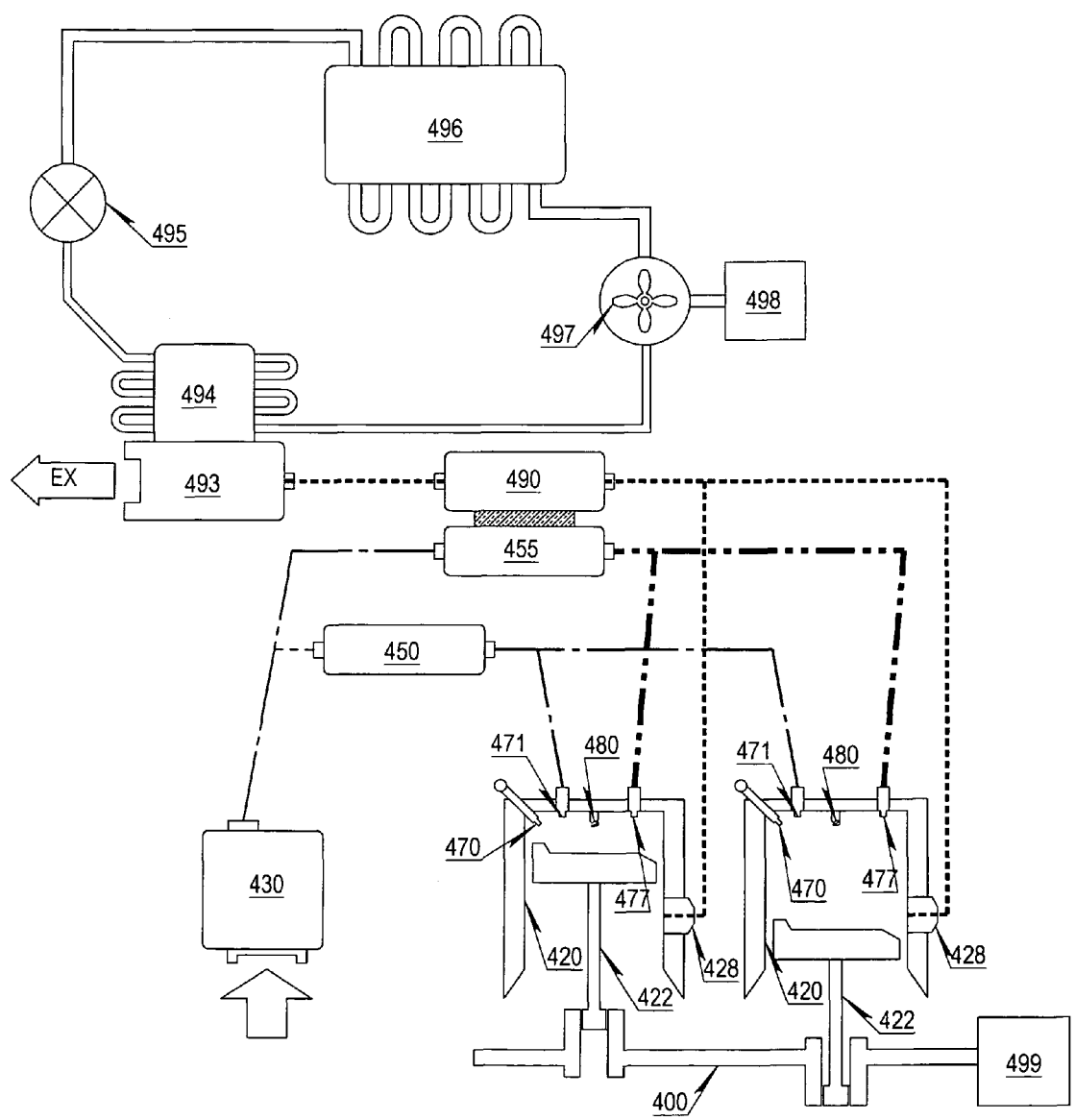
FIG. 13 is an illustrative view of the fourth embodiment of Mackay Cold-Expansion Engine System, which is a MCES configuration with refrigerant-regenerator for the power generation applications, wherein the refrigerant-regenerator utilizes the low temperature exhaust gas of MCES to generate additional electricity at low cost.

Now referring to FIG. 13 for the fourth embodiment:

FIG. 13 shows the fourth embodiment of the present invention, which is a MCES with a refrigerant-regeneration means; this embodiment is particularly for the MCES configured for power generation applications because the Mackay Cold-Expansion Cycle expelled a flow of cold-expansion-medium at a temperature much lower than the conventional combustion cycle; and the MCES will perform with a best energy efficiency when the temperature of the expelled cold-expansion-medium is in the range of 400-200 degree Celsius, which causes the regular heat-energy-recovery economically inefficient due to the limited operable temperature range of the multi-stage steam type heat-energy-recovery-system; therefore, a basic refrigerant-regeneration system for the MCES is provided as follows.

The components of FIG. 13 are labeled as the central-compressor 430, the cold-buffer 450, the reenergize-buffer 455, the heat-transfer-catalytic-converter 490, the cold-expansion-chambers 420, the fuel-injectors 470, the cold-air-injectors 472, the reenergize-air-injectors 477, the chamber-wall-port 428, the spark-plugs 480, the pistons 422, the heat-recover-circulator 493, the refrigerant-evaporator 494, the refrigerant-condenser 496, the refrigerant-pump 495, the refrigerant-turbine 497, the turbine-generator 498, the crankshaft 400, the output shaft 499.

Each cold-expansion-chamber 420 will operate in a Mackay Cold-Expansion Cycle, which consists of a first-intake-process, a hot-combustion-process, a fuel-cooling-process, a second-intake-process, a cold-expansion-process, and an exhaust-process; wherein the fuel-cooling-process may be disabled in a light load operation or an engine idling operation.

The power-management-unit will control the central-compressor 430 to operate at a controlled speed to maintain the preset operation pressures in both the cold-buffer 450 and the reenergize-buffer 455.

In the regular operation of MCES, a cold-expansion-medium is expelled out of each cold-expansion- chambers at a temperature about 600-200 degree Celsius, and this cold-expansion-medium is directed to the heat-transfer-catalytic-converter 490 to perform a reenergize-process, next this cold-expansion-medium is directed to the heat-recover-circulator 493, and finally this cold-expansion-medium is expelled out to the atmospheric air.

The reenergize-buffer 455 will absorb the heat energy of the expelled cold-expansion-medium flown through the heat-transfer-catalytic-converter 490, thereby heating up the high-boost-air in the reenergize-buffer 455.

The heat-recover-circulator 493 will transfer a heat energy to the refrigerant-evaporator 494, which then evaporators the liquefied refrigerant therein with said heat energy, and the gaseous pressure of the evaporated refrigerant will drive the refrigerant-turbine 497, thereby the refrigerant-turbine 497 drives the turbine-generator 498 for generating electricity.

In FIG. 13, the refrigerant is circulating from the refrigerant-evaporator 494 to the refrigerant-turbine 497, and then to the refrigerant-condenser 496, and then to the refrigerant-pump 495, and then to the refrigerant-evaporator 494; wherein about an additional 5% to 20% of the remaining thermal energy in the expelled cold-expansion-medium can be recovered by the turbine-generator 498.

The evaporator-condenser 496 will cool down the evaporated refrigerant that has flown through the refrigerant-turbine 497, and then supply a flow of liquefied refrigerant to the refrigerant-pump 495 which delivers the liquefied refrigerant into the refrigerant-evaporator 494.

Said refrigerant can be a regular refrigerant used by air-conditioning systems, such as R410A or R-134A; in the cold region, it is also possible to use carbon-dioxide as a type of refrigerant to circulate in the refrigerant-regeneration system to prevent pollution, wherein the refrigerant-condenser 496 use a cold ambient air flow (within a temperature range of 240-280 degree Kelvin is ideal) to condense the carbon-dioxide-gas into liquid form, and then the heat conducted from the heat-recover-circulator 493 will generate pressure in the refrigerant-evaporator 494 by the evaporation of carbon-dioxide, thereby driving the refrigerant-turbine 497 to generate additional electricity.

Figure 14:
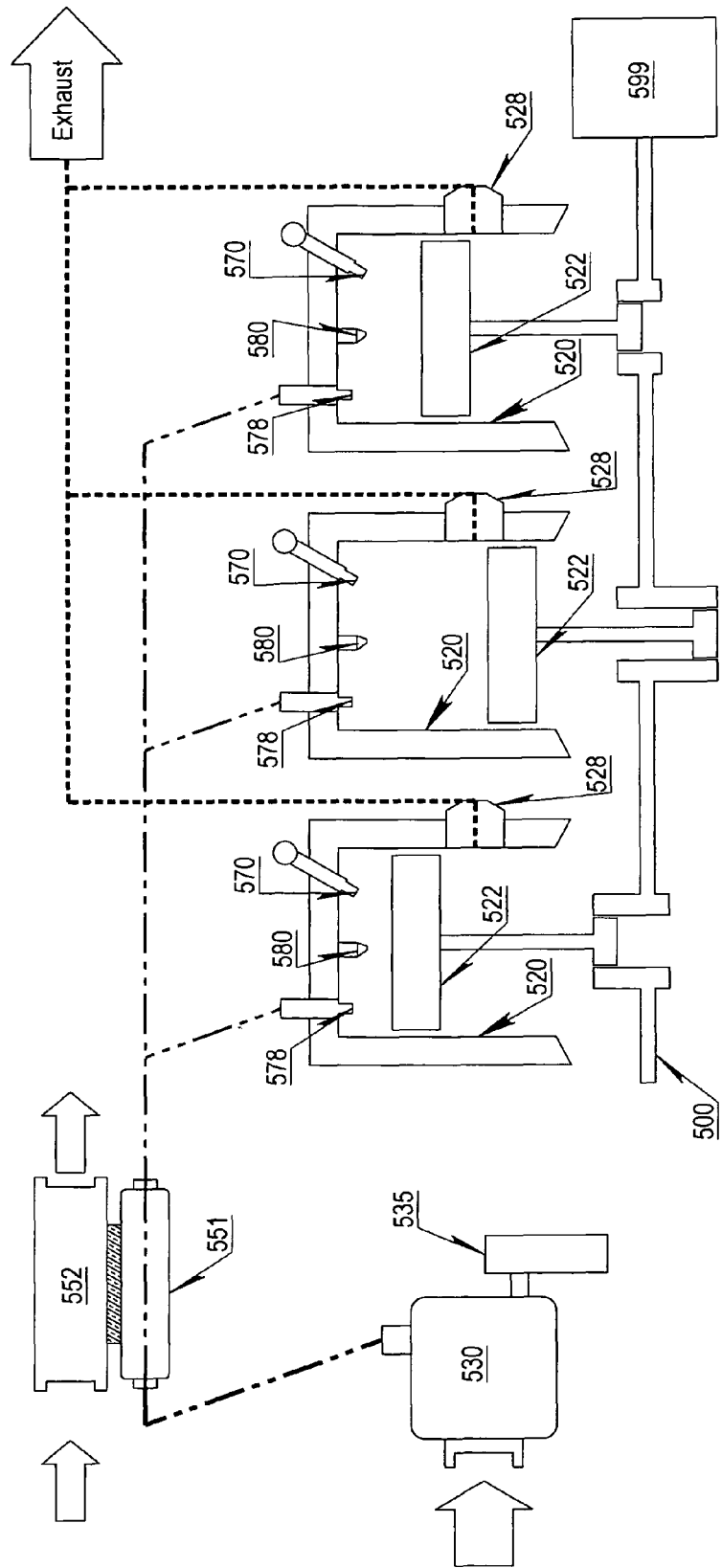
FIG. 14 is an illustrative view of the fifth embodiment of Mackay Cold-Expansion Engine System, which is an air-cool type MCES configuration for the light duty vehicles such as a bike or a small boat or a small passenger car, wherein the cold-air-injection means and the reenergize-air-injection means are combined into a double-actuation-injector.

Now referring to FIG. 14 for the fifth embodiment:

FIG. 14 is an air-cool type MCES configuration with specialized air-injection means, which can be used in small passenger vehicle application or motorcycle applications, wherein the manufacture cost and the weight are the major user concerns instead of an extremely high energy efficiency.

The components of FIG. 14 are labeled as the central-compressor 530, the central-buffer 551, the central-buffer-cooler 552, the compressor-transmission 535, the cold-expansion-chambers 520, the fuel-injectors 570, the double-actuation-injectors 578, the spark-plugs 580, the crankshaft 500, the chamber-wall-port 528 and the output shaft 599.

The power-management-unit of MCES will control the central-compressor 530 to operate at a controlled speed to maintain a constant operation pressure in the central-buffer 551; wherein the central-buffer 551 will supply a cooled high-boost-air to the double-actuation-injectors 578.

The central-buffer-cooler will cool the high-boost-air in the central-buffer 551 by dissipating the heat with a flow of ambient air.

Each double-actuation-injector 578 will inject the cooled high-boost-air of the central-buffer twice for every revolution of the crankshaft 500, wherein each double-actuation-injector will perform a first injection before the top-dead-centre of the associated piston, and a second injection in the range of 30 degree to 105 degree of crankshaft reference angle.

The first injection of the cooled high-boost-air will be complement with a fuel-injection by the associated fuel-injector 570, so that an air-fuel-mixture is formed in the associated cold-expansion-chamber 520 before 0 degree of crankshaft reference angle.

The second injection of the cooled high-boost-air will be performed only after the average pressure of the hot-combustion-medium in the cold-expansion-chamber has decreased to lower than the operation pressure of the central-buffer 551; wherein the second injection of the cooled high-boost-air will reduce the temperature of the hot-combustion-medium by 30%-80%, so that a cold-expansion-medium will expand within a regulated temperature range of 400-1100 degree Celsius.

Each cold-expansion-chamber 520 will perform in a Mackay Cold-Expansion Cycle, which consists of a first-intake-process, a hot-combustion-process, a fuel-cooling-process, a second-intake-process, a cold-expansion-process, and an exhaust-process; wherein the fuel-cooling-process may be disabled in a light load operation or an engine idling operation.

For the maintenance cost consideration and a longer service-life of the fuel-injector 570, the fuel-cooling-process may also be disabled in a the red-line rpm operation (such as 6000 rpm), however it reduces the maximum power output; one solution is to implement two fuel-injectors, in such a way that a first fuel-injector will perform the fuel-injection in the first-intake-process, while a second fuel-injector will perform the fuel-injection in the second-intake-process.

Figure 15:
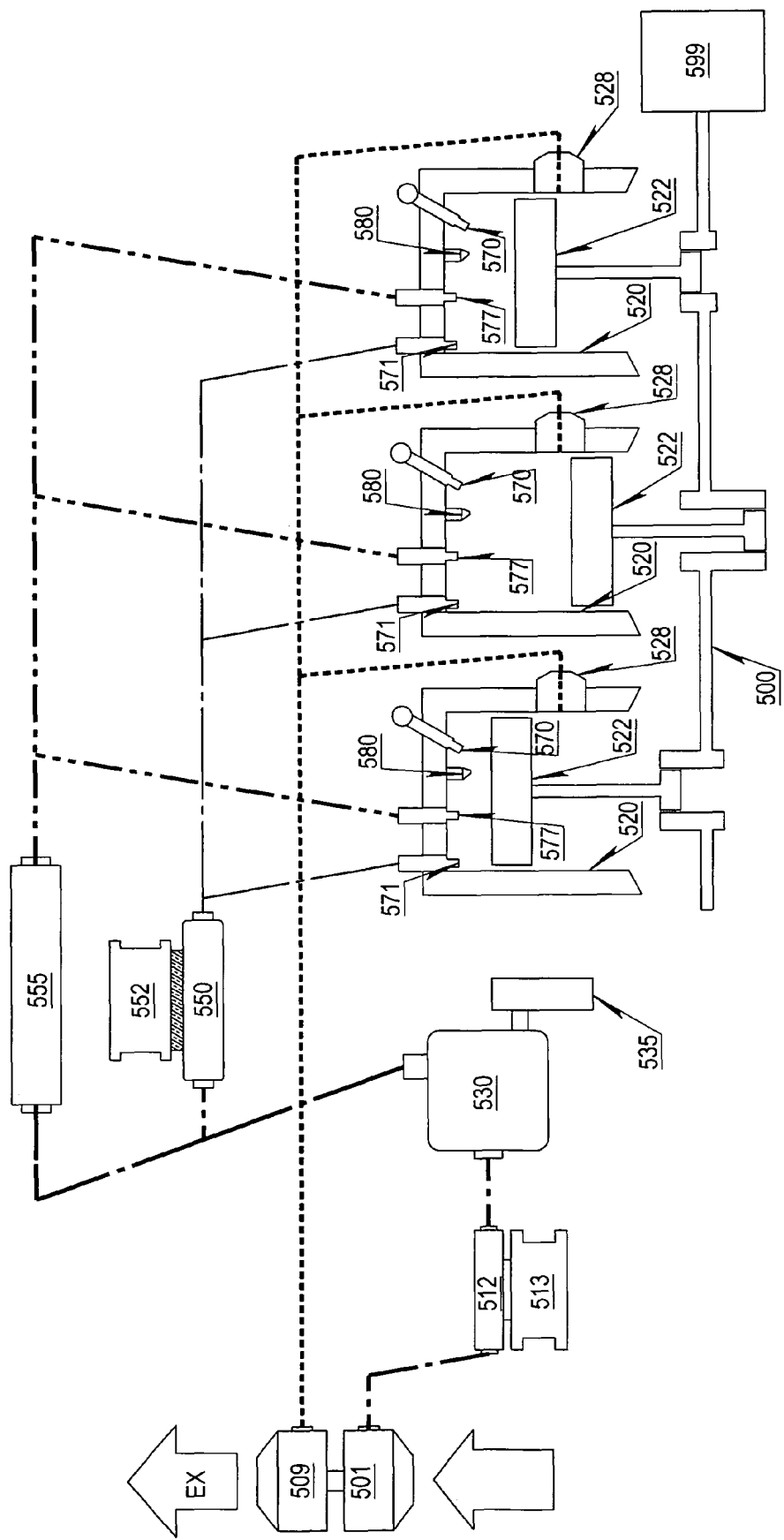
FIG. 15 is another air-cool type MCES configuration including a turbocharger system, a pre-buffer, and a pre-cooler.
Figure 16:
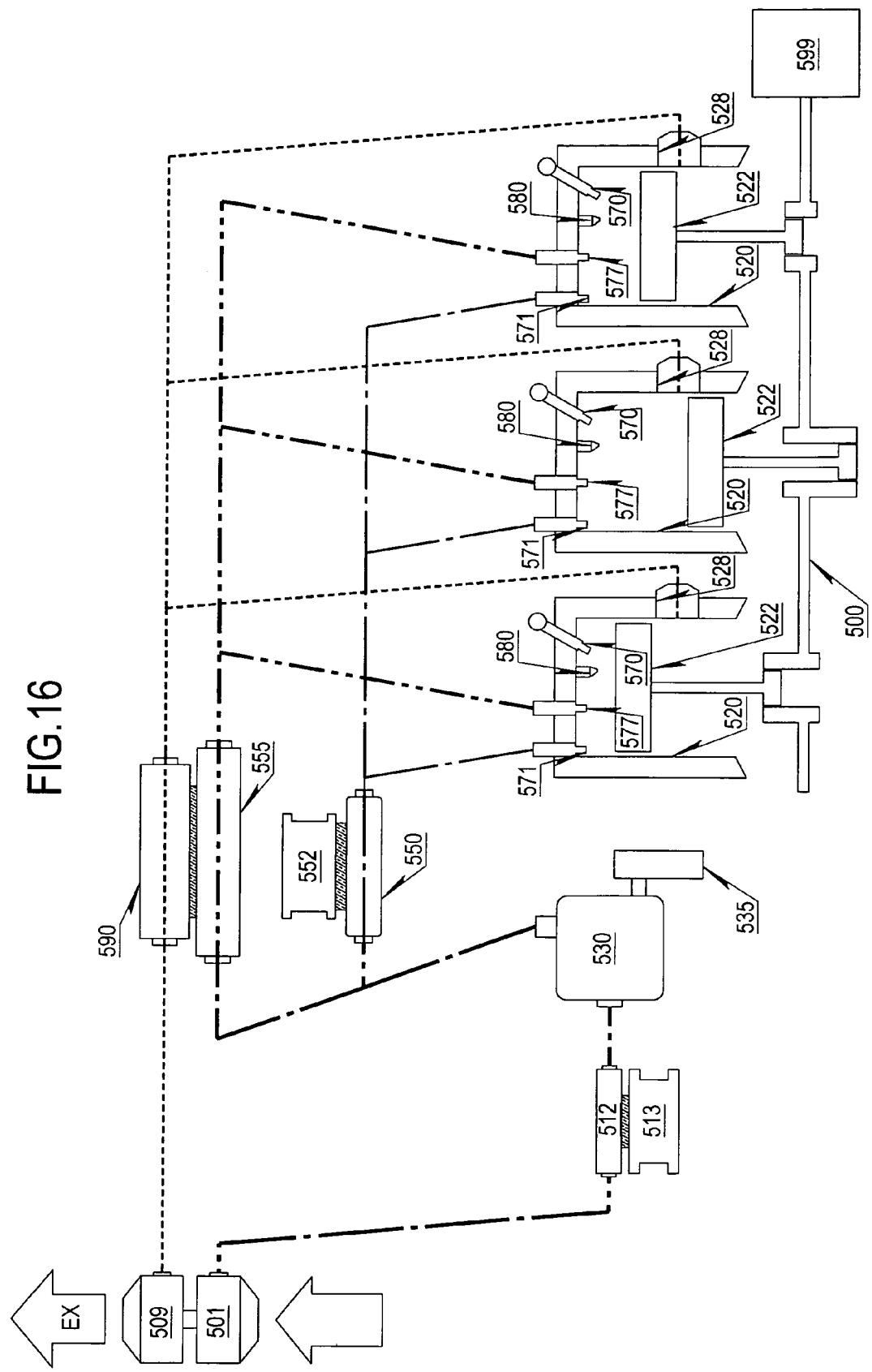
FIG. 16 is an alternative configuration of FIG. 15, wherein a heat-transfer-catalytic-converter is included.
Figure 39:
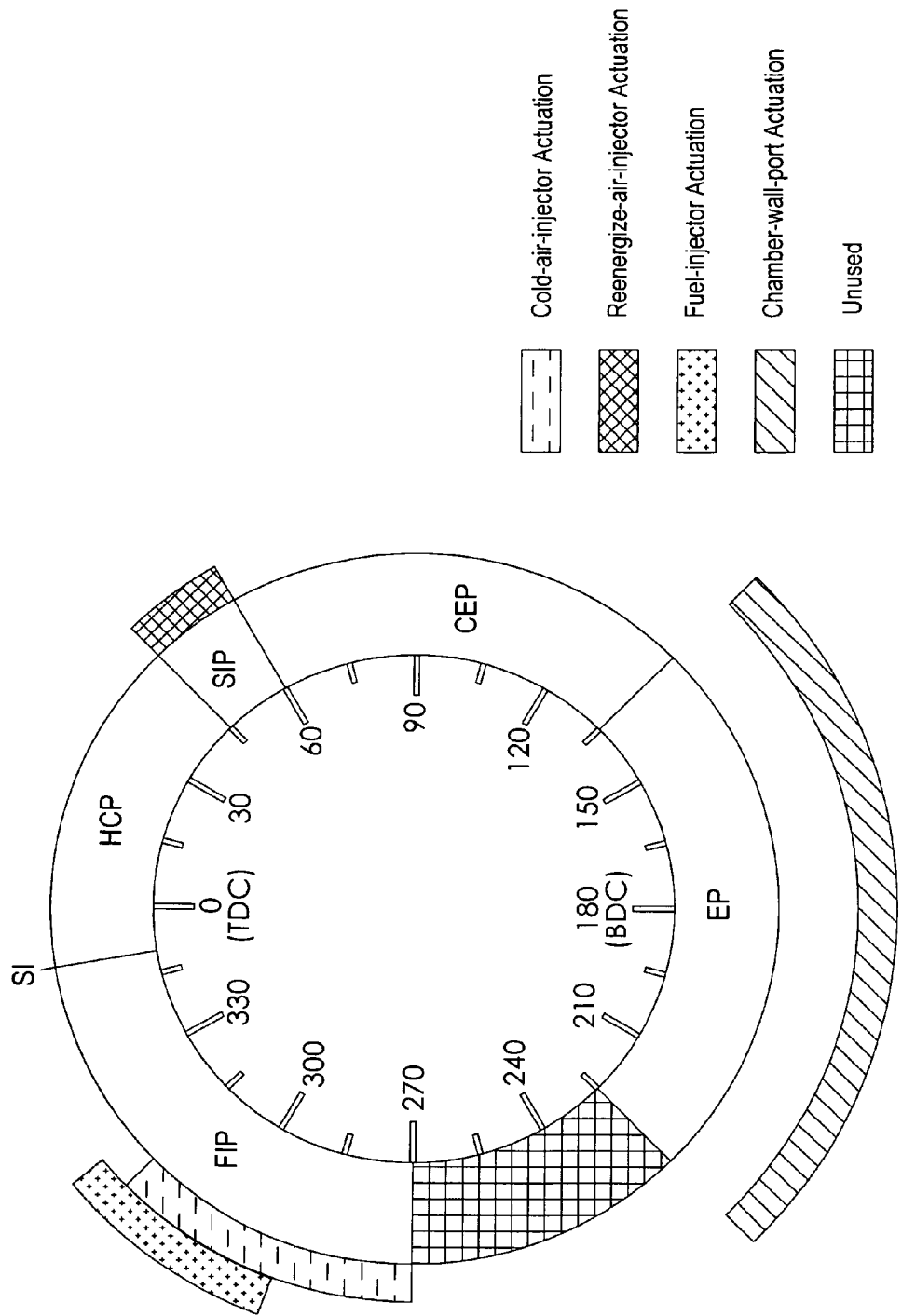
FIG. 39 (Process Chart.4) demonstrates a light load operation of Mackay Cold-Expansion Cycle with chamber-wall-port, wherein the fuel-cooling-process is disabled and the exhaust-process is performed with a chamber-wall-port.
Figure 40:
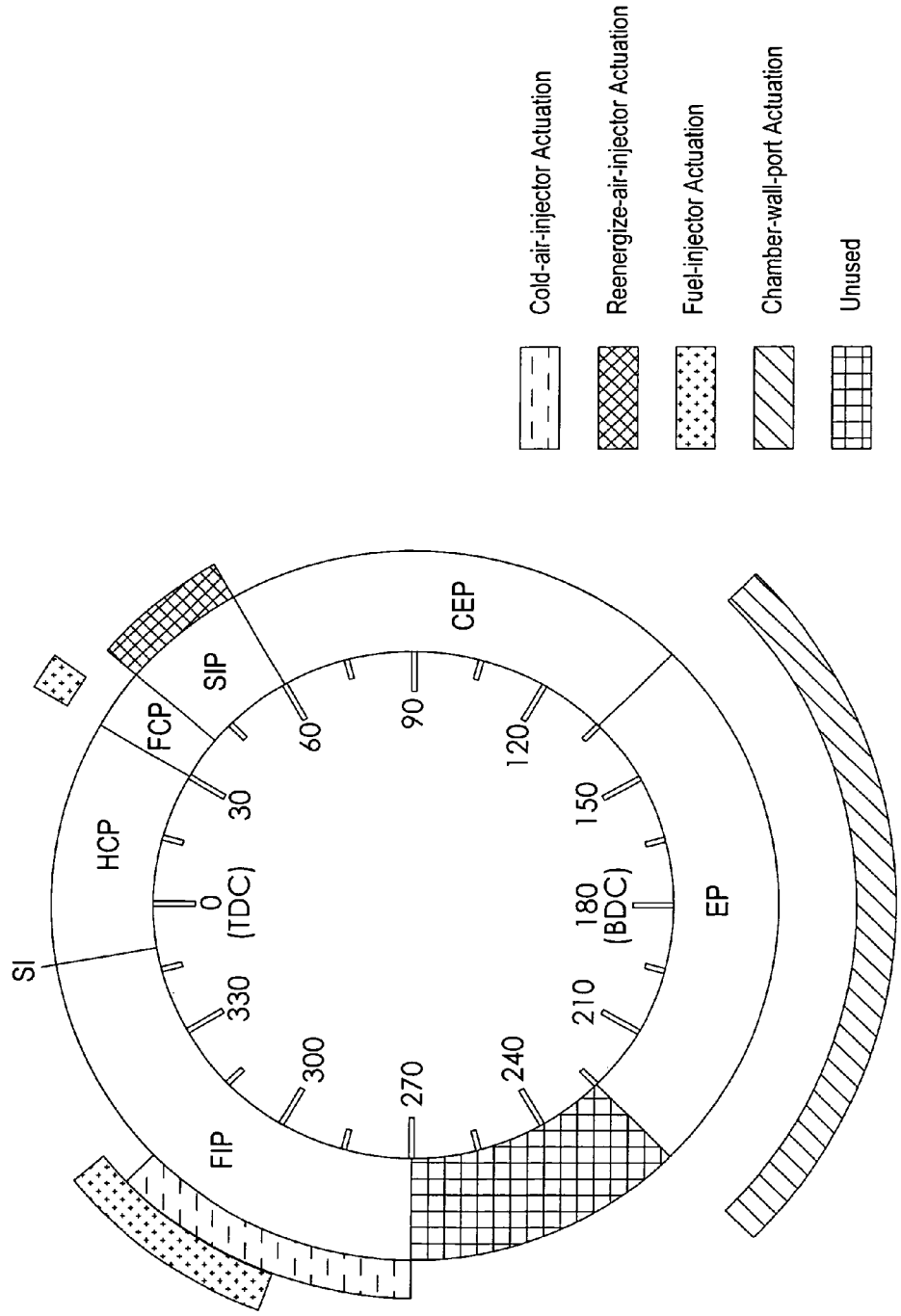
FIG. 40 (Process Chart.5) demonstrates a regular operation of Mackay Cold-Expansion Cycle with chamber-wall-port, wherein the exhaust-process is performed with a chamber-wall-port FIG. 41 (Process Chart.6) demonstrates a light load operation of Mackay Cold-Expansion Cycle for low-rpm heavy-duty engine applications, wherein the first-intake-process is generally commencing near the TDC position due to the low revolution speed.

FIG. 39 (Process Chart.4) and FIG. 40 (Process Chart.5) are two of typical process durations of the Mackay Cold-Expansion Cycle that corresponds to this fifth embodiment shown in FIG. 14 (as well as the alternative form, FIG. 15 and FIG. 16).

For a regular operation that enables the fuel-cooling-process of Mackay Cold-Expansion Cycle, MCES shown in FIG. 14 operates in the following order: the first-intake-process is commenced from about 270 degree to 350 degree of crankshaft reference angle, the hot-combustion-process is commenced from about 350 degree (10 degree BTDC) to 30 degree (30 degree ATDC) of crankshaft reference angle, the fuel-cooling-process is commenced from about 30 degree to 40 degree of crankshaft reference angle, the second-intake-process is commenced from about 40 degree to 60 degree of crankshaft reference angle, the cold-expansion-process is commenced from about 60 degree to 135 degree of crankshaft reference angle, the exhaust-process is from about 135 degree to 225 degree of crankshaft reference angle.

The first-intake-process is the process to supply an air-fuel-mixture in the cold-expansion-chamber 520, wherein the associated double-actuation-injector 578 perform a first injection of cooled high-boost-air (270-315 degree of crankshaft reference), and the associated fuel-injector 570 perform a first injection of fuel (290-320 degree of crankshaft reference).

The hot-combustion-process is the process to combust said air-fuel-mixture with the spark-plugs 580 as a hot-combustion-medium, which expands in the cold-expansion-chamber (350-30 degree of crankshaft reference angle) until most of the oxygen-gas content is combusted to form a carbon-monoxide-gas.

The fuel-cooling-process is the process to cool said hot-combustion-medium with a second injection of fuel (30-35 degree of crankshaft reference angle) after most of the oxygen-gas content in said air-fuel-mixture is combusted, so that the fuel injected in this process is vaporized as a fuel-gas.

The second-intake-process is the process to perform a second injection of the cooled high-boost-air with the double-actuation-injector 578 (40-60 degree of crankshaft reference angle) after the average pressure of the hot-combustion-medium has decreased to lower than the operation pressure of the central-buffer 551; wherein the temperature of the hot-combustion-medium will reduce by 30%-80% by the end of the second-intake-process, thereby forming a cold-expansion-medium in the cold-expansion-chamber 520.

The cold-expansion-process is the process to produce power with said cold-expansion-medium in the cold-expansion-chamber 520; wherein said cold-expansion-medium is expanding in a controlled condition, such that the expansion temperature is regulated in the range of 400-1100 degree Celsius, and the oxygen-gas concentration in the cold-expansion-medium is high enough to spontaneously convert carbon-monoxide-gas into carbon-dioxide-gas, thereby fully releasing the reaction energy of the injected fuel in the cold-expansion-process.

The exhaust-process is the process to expel said cold-expansion-medium out through the chamber-wall-port 528, the cold-expansion-medium in the cold-expansion-chamber 520 will be expelled in this process (135-225 degree of crankshaft reference angle); as a supplementary note, when the piston 522 reciprocates over the chamber-wall-port 528 in lower portion of the cold-expansion-chamber 520, the cold-expansion-medium will still be generating power to crankshaft 500 since there is an adequate pressure for pushing the piston 522 downward, and the inertia of the cold-expansion-medium is actually toward the bottom of the cold-expansion-chamber 520, as a result, the cold-expansion-medium will require less energy to change direction of the airflow, which means the pumping loss is relatively lower than those exhaust the cold-expansion-medium only from the engine head.

In this fifth embodiment as shown in FIG. 14, since this type of MCES configuration is generally for use in a light duty application that operate in high-rpm, the spark-ignition timing is preferred to be set in the range between 325 degree and 0 degree (TDC) of crankshaft reference angle; unlike the other MCES configured for the large engine application that prefers a spark-ignition commenced just at about the top-dead-centre for the best efficiency.

In a high-rpm operation or a light load operation that requires the fuel-cooling-process to be disabled, a simplified Mackay Cold-Expansion Cycle will operate in an order as shown in FIG. 39 (Process Chart.4), wherein the first-intake-process is from about 270 degree to 350 degree of crankshaft reference angle, the hot-combustion-process is from about 350 degree (10 degree BTDC) to 45 degree (45 degree ATDC), the second-intake-process is from about 45 degree to 60 degree of crankshaft reference angle, the cold-expansion-process is from 60 degree to 135 degree of crankshaft reference angle, the exhaust-process is from 135 degree to 225 degree of crankshaft reference angle.

After the first-intake-process has taken in an air-fuel-mixture before TDC, the hot-combustion-process will generate with a hot-combustion-medium until the average medium pressure of the hot-combustion-medium has decreased to lower than the operation pressure of the central-buffer 551; next, the double-actuation-injector 578 will perform a second injection of the cooled high-boost-air into the cold-expansion-chamber 520, thereby reducing the temperature of the hot-combustion-medium by 30%-80% and increasing the oxygen-gas concentration; thereafter forming a cold-expansion-medium in the cold-expansion-chamber 520 by the end of the second-intake-process.

In this simplified Mackay Cold-Expansion Cycle, the first-intake-process will supply an air-fuel-mixture that is fuel-rich in terms of the oxygen-fuel ratio, such that said air-fuel-mixture will combust as a hot-combustion-medium consisting of excessive vaporized fuel-gas; however, there is an air-fuel ratio limit for the spark-ignition (more specifically speaking, the oxygen-to-fuel ratio), as the air-fuel-ratio is 50% lower than the stoichiometric ratio (for example with fresh air and gasoline, which will be about 7 to 1), the spark-ignition becomes difficult and may result in ignition-failure; therefore this simplified Mackay Cold-Expansion Cycle will have a relatively lower power-to-weight ratio than that of the regular Mackay Cold-Expansion Cycle due to this limitation.

Now referring to FIG. 15 for a more complex air-cool type MCES configuration preferable for use in the high performance passenger vehicle applications or the commercial truck applications, wherein this configuration is an alternative form of the fifth embodiment.

The components of FIG. 15 are labeled as the turbo-compressor 501, the turbo-turbine 509, the low-pressure-buffer 513, the low-pressure-cooler 512, the central-compressor 530, the cold-buffer-cooler 552, the cold-buffer 550, the reenergize-buffer 555, the compressor-transmission 535, the cold-expansion-chambers 520, the fuel-injectors 570, the cold-air-injectors 572, the reenergize-air-injectors 577, the pistons 522, the chamber-wall-port 528, the crankshaft 500 and the output shaft 599.

The turbo-compressor is driven by the turbo-turbine to generate a low-boost-air into the low-pressure-buffer 513; the low-pressure-buffer 513 then directs a cooled low-boost-air into the central-compressor 530.

The low-pressure-cooler 512 will cool the low-boost-air of the low-pressure-buffer with a flow of ambient air; wherein a variable-speed fan may be installed to enhance the cooling effect.

The central-compressor 530 receives the cooled low-boost-air and generates a high-boost-air to the cold-buffer 550 and the reenergize-buffer 555.

The power-management-unit of MCES will control the central-compressor 530 to operate at a controlled speed, such that the cold-buffer 550 will have a constant operation pressure in the range of 4-25 bar to ensure the performance of the cold-air-injectors 572, the reenergize-buffer 555 will have a constant operation pressure in the range of 4-30 bar to ensure the performance of the reenergize-air-injectors 577.

The cold-buffer-cooler 552 will cool the high-boost-air of the cold-buffer by with a flow of ambient air; wherein a variable-speed fan may be installed to enhance the cooling effect.

Each cold-expansion-chamber 520 will perform in a Mackay Cold-Expansion Cycle, which consists of a first-intake-process, a hot-combustion-process, a fuel-cooling-process, a second-intake-process, a cold-expansion-process, and an exhaust-process; wherein the fuel-cooling-process may be disabled in a light load operation or an engine idling operation.

In this alternative form of the fifth embodiment shown in FIG. 15, since the turbo-compressor 501 cannot provide a constant compression capacity because its compression capacity depends on the pressure of the expelled cold-expansion-medium flown through the turbo-turbine 509, sensor means will be installed in said three buffers to detect the airflow data (pressure/temperature/flow mass), thereby informing the power-management-unit to correct the operation speed of the central- compressor 530 by the compressor-transmission 535.

Now referring to FIG. 16 for a more completed air-cool type MCES configuration, which is another alternative form of the fifth embodiment, wherein a heat-transfer-catalytic-converter 590 is included to perform the reenergize-process, which will reduce the compression energy required to sustain the operation pressure of the reenergize-buffer 555.

In the embodiment of FIG. 16, it is possible to set the operation pressure of the reenergize-buffer 555 to as high as 30 bar in the heavy load operation due to the reenergize-process, so that the second-intake-process will perform in a relatively earlier crankshaft reference angle; this is more energy-efficient because this results in a longer cold-expansion-process (the second-intake-process is to be initiated only after the average pressure of the hot-combustion-medium has decreased to lower than the operation pressure of the reenergize-buffer).

Figure 17:
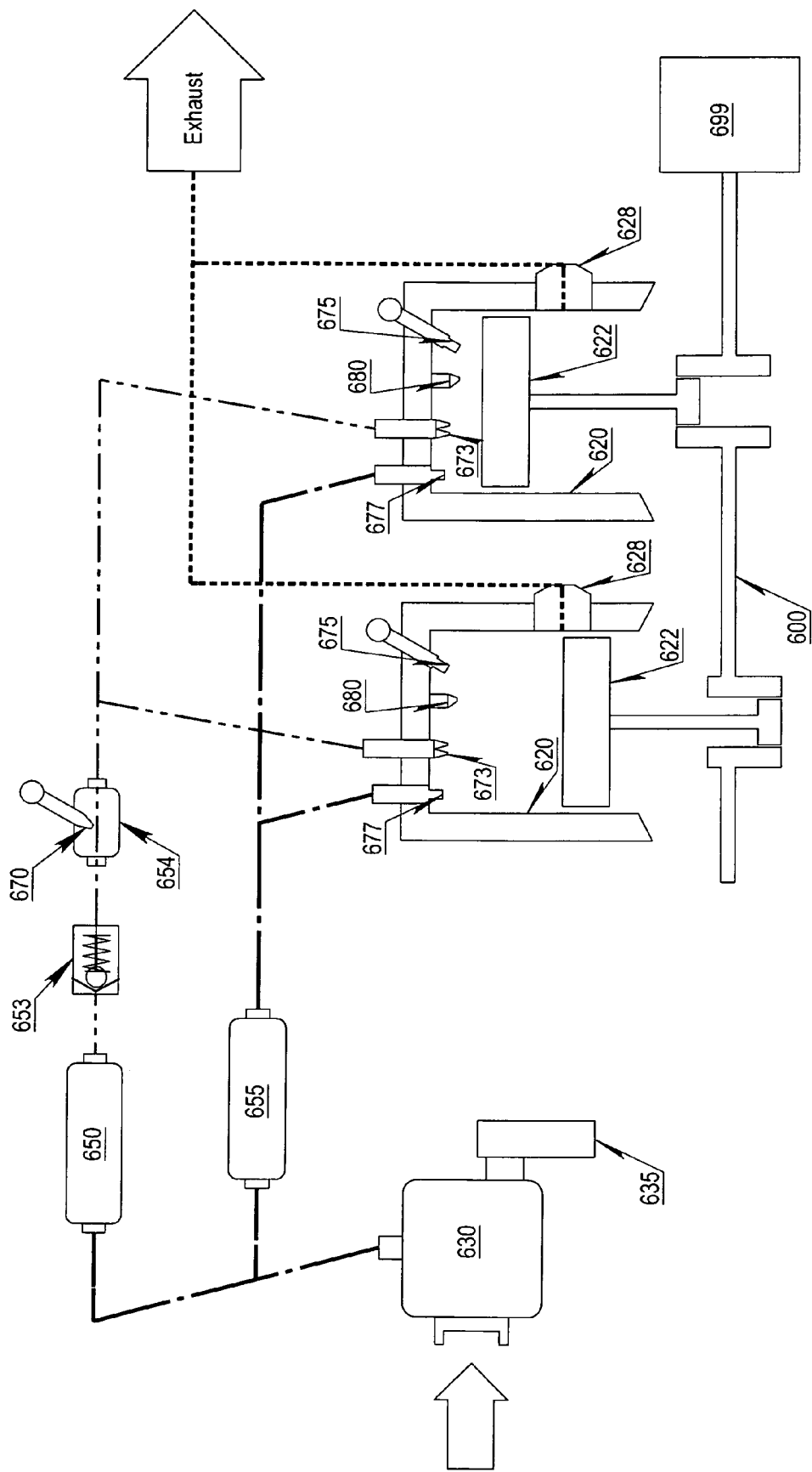
FIG. 17 is an illustrative view of the sixth embodiment of Mackay Cold-Expansion Engine System, which is a premix-intake type MCES configuration, which includes a premix-buffer and a mixture-injector to perform the first-intake-process in the high rpm applications at a relatively lower equipment cost.

Now referring to FIG. 17 for the sixth embodiment:

The sixth embodiment is a premix-intake type configuration of MCES, wherein the fuel-supplying means of the first-intake-process and the fuel-supplying means of the fuel-cooling-process are operated independently from each others, so that the injected fuel mass of the fuel-cooling-process and the air-fuel-ratio of the air-fuel-mixture of the first-intake-process is controlled with high precision to raise the overall energy efficiency; wherein this also enables the MCES to perform in a high-rpm operation with better performance at low cost.

The components of FIG. 17 are labeled as the central-compressor 630, the cold-buffer 650, the reenergize-buffer 655, the non-return-regulator 653, the premix-buffer 654, the buffer-fuel-injector 670, the cold-expansion-chambers 620, the mixture-injectors 673, the cooling-fuel-injectors 675, the pistons 622, the spark-plugs 680, the chamber-wall-ports 628, the crankshaft 600 and the output shaft 699.

The power-management-unit of MCES will control the central-compressor 630 to operate at a controlled speed, such that the cold-buffer 650 will have a constant operation pressure in the range of 4-25 bar, the reenergize-buffer 655 will have a constant operation pressure in the range of 4-30 bar; wherein the power-management-unit control the operation speed of the central-compressor 630 by the compressor-transmission 635.

The compressor-transmission 635 can be a mechanical transmission, a hydraulic transmission, a continuous-variable-transmission or a planetary-gear-transmission; if an inverter system is included in the MCES, the compressor transmission 635 may be replaced by a variable-speed electrical-motor.

The cold-buffer 650 will supply a cooled high-boost-air into the premix-buffer 654 via the non-return-regulator 653.

The cooled high-boost-air in the premix-buffer 654 is then mixed with the fuel injected by the buffer-fuel-injector 670, thereby forming an air-fuel-mixture in the premix-buffer 654.

The non-return-regulator 653 will prevent the air-fuel-mixture buffered in the premix-buffer 654 from flowing back into the cold-buffer 650; this component is crucial in this embodiment because a malfunctioned non-return-regulator 653 may cause explosion or fire hazard in the cold-buffer 650.

The reenergize-buffer 655 will supply a heated high-boost-air into each reenergize-air-injector 677, which will inject a controlled amount of said heated high-boost-air into the associated cold-expansion-chamber 620 during the second-intake-process.

Each cooling-fuel-injector 675 will supply a fuel to mix with the hot-combustion-medium in the associated cold-expansion-chamber 620 during the fuel-cooling-process.

Each cold-expansion-chamber 620 will perform in a Mackay Cold-Expansion Cycle, which consists of a first-intake-process, a hot-combustion-process, a fuel-cooling-process, a second-intake-process, a cold-expansion-process, and an exhaust-process; wherein the fuel-cooling-process may be disabled in a light load operation or an engine idling operation.

In the sixth embodiment shown in FIG. 6A, the first-intake-process is performed by injecting an air-fuel-mixture (of the premix-buffer 654) with the mixture-injector 673, while the fuel-cooling-process is performed by injecting a fuel with the cooling-fuel-injector 675; therefore the power-management-unit will be able to regulate the amount of the injected fuel more precisely in the fuel-cooling-process by adjusting only the actuation time of the cooling-fuel-injector 675, whereas the air-fuel-ratio in the premix-buffer 654 is regulated only by the buffer-fuel-injector 670, thus providing a better and more constant power output in the high-rpm operation of MCES.

Figure 18:
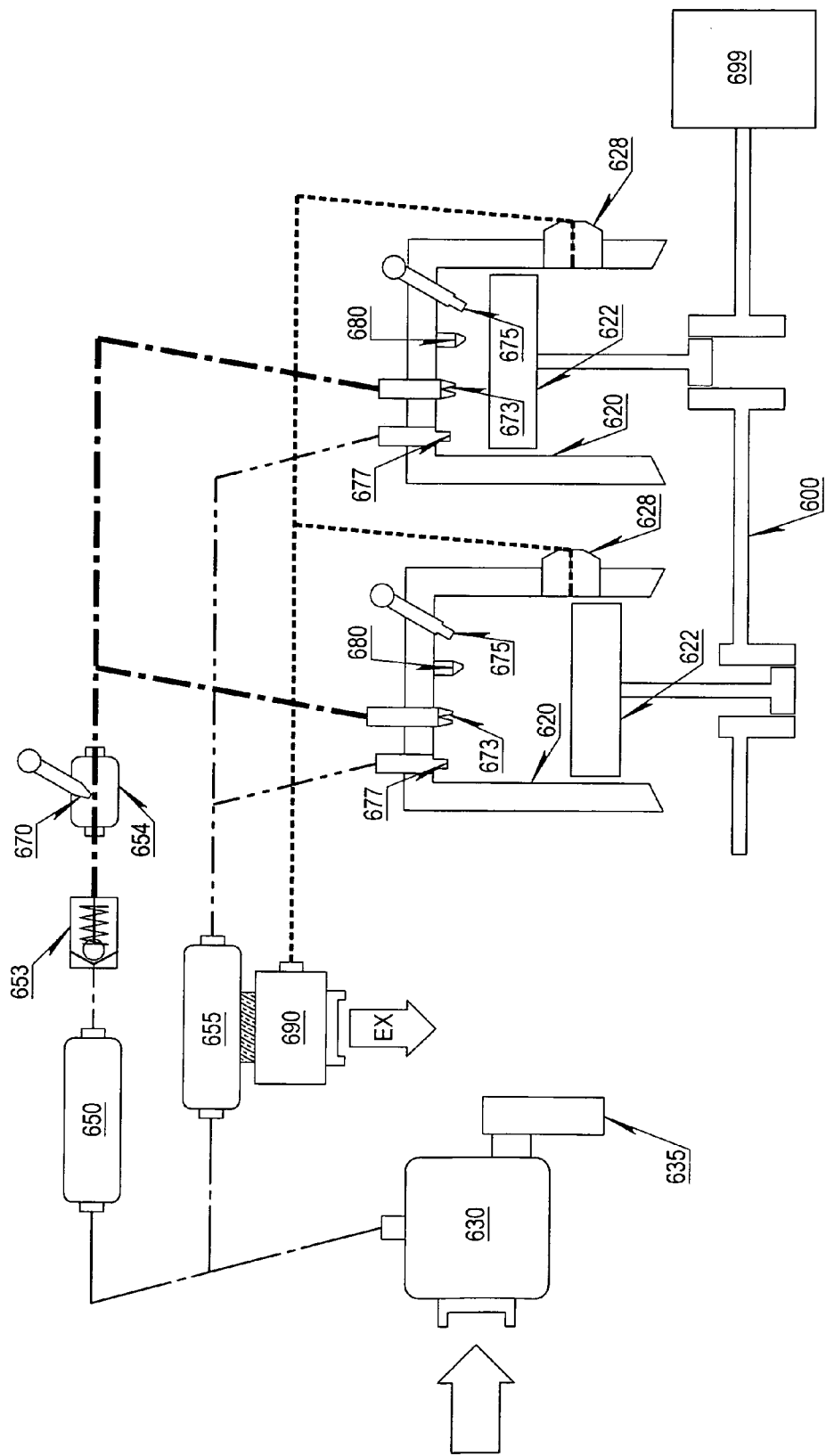
FIG. 18 is an alternative configuration of FIG. 17, wherein a heat-transfer-catalytic-converter is included.

FIG. 18 is a more completed configuration of the premix-intake type MCES, wherein the heat-transfer-catalytic-converter 690 is provided to enhance overall energy efficiency by the reenergize-process.

In addition the fuel-injectors of FIG. 17 and FIG. 18 can also be used to supply the fuel of a lower octane, in other words, the fuel supplied during the fuel-cooling-process can be of a different type of fuel other than the fuel supplied in the premix-buffer 654; for example, the premix-fuel-injector 670 is injecting gasoline to form an air-fuel-mixture in the premix-buffer 654, while the cooling-fuel-injector 675 injects diesel, ethanol, natural gas, or other fuel to mix with the hot-combustion-medium in the fuel-cooling-process.

Figure 19:
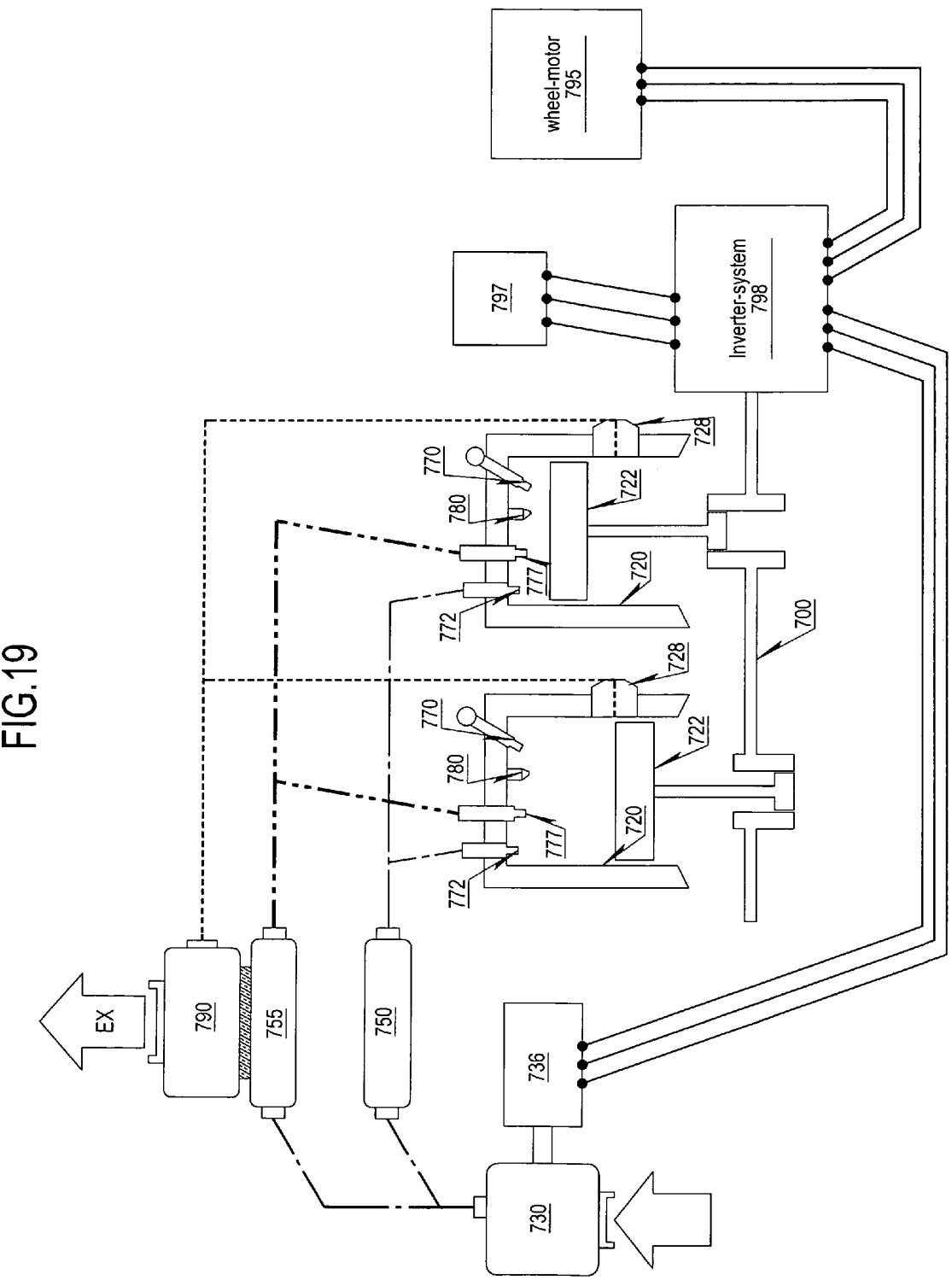
FIG. 19 is an illustrative view of the seventh embodiment of Mackay Cold-Expansion Engine System, which is a series-hybrid type MCES configuration, wherein an integrated inverter-system is used to control the wheel-motor and the compressor-motor.
Figure 20:
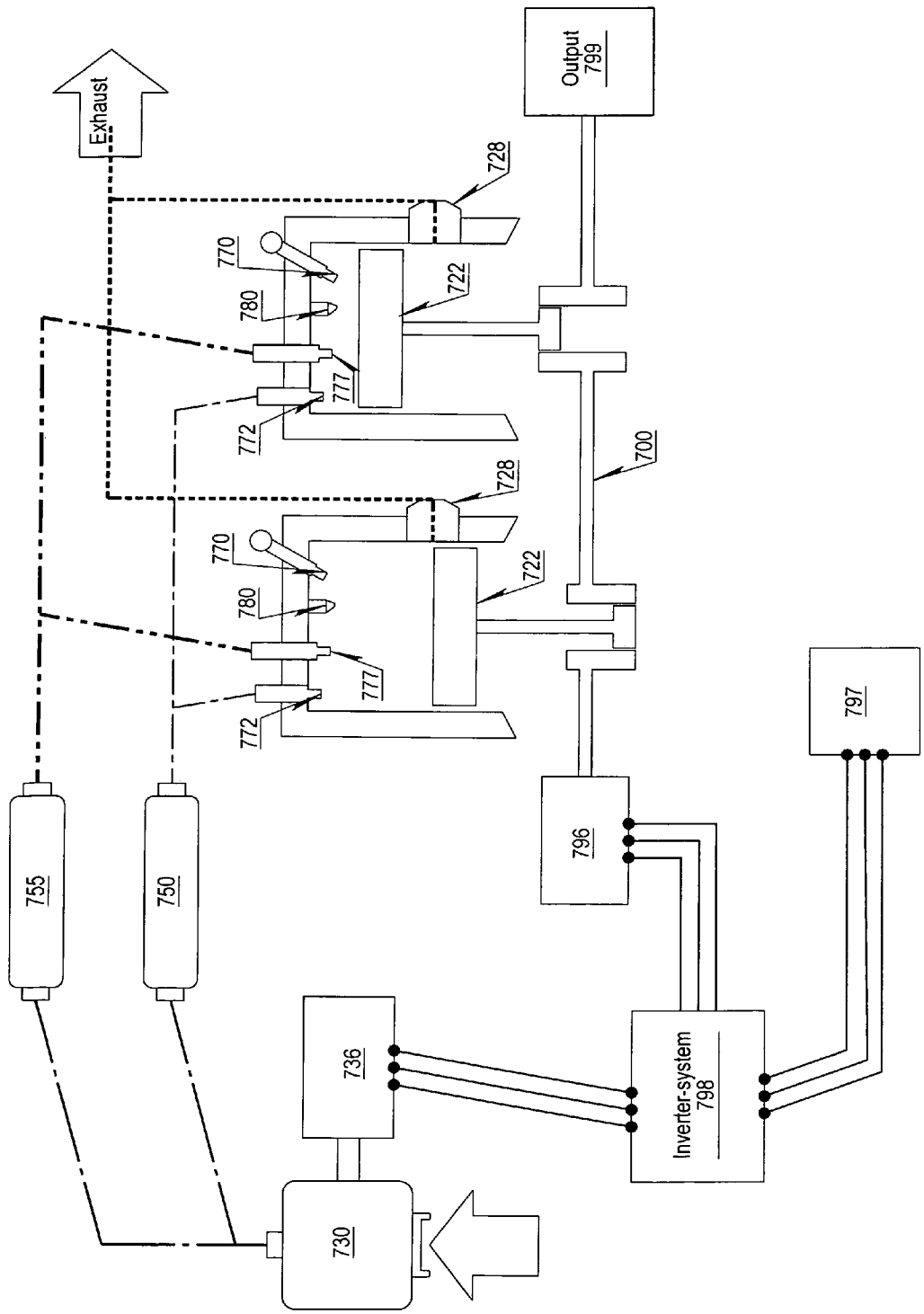
FIG. 20 is an alternative form of the seventh embodiment of Mackay Cold-Expansion Engine System, which is an integrated-hybrid type configuration of MCES, wherein an integrated inverter-system controls the operation speed of the compressor-motor and recovers brake-force as electricity.

Now referring to FIG. 19 and FIG. 20 for the seventh embodiment, wherein FIG. 19 provides a series-hybrid type MCES configuration, FIG. 20 provides an integrated-hybrid type MCES configuration; both configurations are preferable for the automobile applications due to the current highly-efficient power transistor technology.

The components of FIG. 19 are labeled as the central-compressor 730, the compressor-motor 736, the cold-buffer 750, the reenergize-buffer 755, the cold-expansion-chambers 720, the cold-air-injectors 772, the reenergize-air-injectors 777, the fuel-injectors 770, the pistons 722, the spark-plugs 780, the crankshaft 700, the inverter-system 798, the wheel-motor 795 and the battery 797.

Each cold-expansion-chamber 720 will perform in a Mackay Cold-Expansion Cycle, which consists of a first-intake-process, a hot-combustion-process, a fuel-cooling-process, a second-intake-process, a cold-expansion-process, and an exhaust-process; wherein the fuel-cooling-process may be disabled in a light load operation or an engine idling operation.

The inverter-system 798 will harvest the mechanical power from the crankshaft as electricity, which is distributed to the wheel-motor 795 and the compressor-motor 736; wherein the battery may store excessive electricity from the power output by the Mackay Cold-Expansion Cycle, or the power regenerated from the wheel-motor 795 in a braking operation of the vehicle.

The compressor-motor 736 will be supplied with said electricity to operate at a controlled speed requested by the power-management-unit of the MCES, thereby sustaining the cold-buffer 750 and the reenergize-buffer 755 at their respective operation pressures; wherein the operation pressure of the cold-buffer 750 is set in a range of 4-25 bar, the operation pressure of the reenergize-buffer 755 is set in a range of 4-30 bar.

The wheel-motor 795 will be supplied with said electricity from the inverter-system 798 to provide power to the vehicle wheel at the speed demanded by the user.

During a brake operation of this series-hybrid type MCES, the compressor-motor 736 may stop its operation to preserve energy, and the wheel-motor 795 will recover the brake-power as an electricity to charge the battery 797 through the inverter-system 798.

The components of FIG. 20 are labeled as the central-compressor 730, the compressor-motor 736, the cold-buffer 750, the reenergize-buffer 755, the cold-expansion-chambers 720, the cold-air-injectors 772, the reenergize-air-injectors 777, the fuel-injectors 770, the spark-plugs 780, the pistons 722, the crankshaft 700, the regeneration-motor 796, the output shaft 799, the inverter-system 798 and the battery 797.

The regeneration-motor 796 and the inverter-system 798 together will harvest a portion of the mechanical power from the crankshaft 700 during a regular operation of Mackay Cold-Expansion Cycle that powers the vehicle to move; wherein the inverter-system 798 will output a controlled amount electricity to the compressor-motor 736, so that the compressor-motor 736 will operate at a controlled speed requested by the power-management-unit of the MCES, thereby sustaining the cold-buffer 750 and the reenergize-buffer 755 at their respective operation pressures; wherein the operation pressure of the cold-buffer 750 is set in a range of 4-25 bar, the operation pressure of the reenergize-buffer 755 is set in a range of 4-30 bar.

During the brake-operation of MCES, the compressor-motor may stop its operation, and the regeneration-motor 798 will recover the brake power directly from the crankshaft 700, thereby charging the battery 797 through the inverter-system 798.

The seventh embodiment shown in FIG. 19 (or FIG. 20) operates on the same principles as the other previously mentioned embodiments of MCES; wherein the Mackay Cold-Expansion Cycle operated in each cold-expansion-chamber 720 is basically explained by FIG. 39 and FIG. 40, while FIG. 41-46 are also applicable if this embodiment is used in a more particular field; whereas if an active-exhaust-valve is used as the exhaust-means in this ninth embodiment for performing an active-exhaust-process (instead of the exhaust-process), FIG. 36-38 are adequate to demonstrate the possible process variations of the Mackay Cold-Expansion Cycle.

Figure 21:
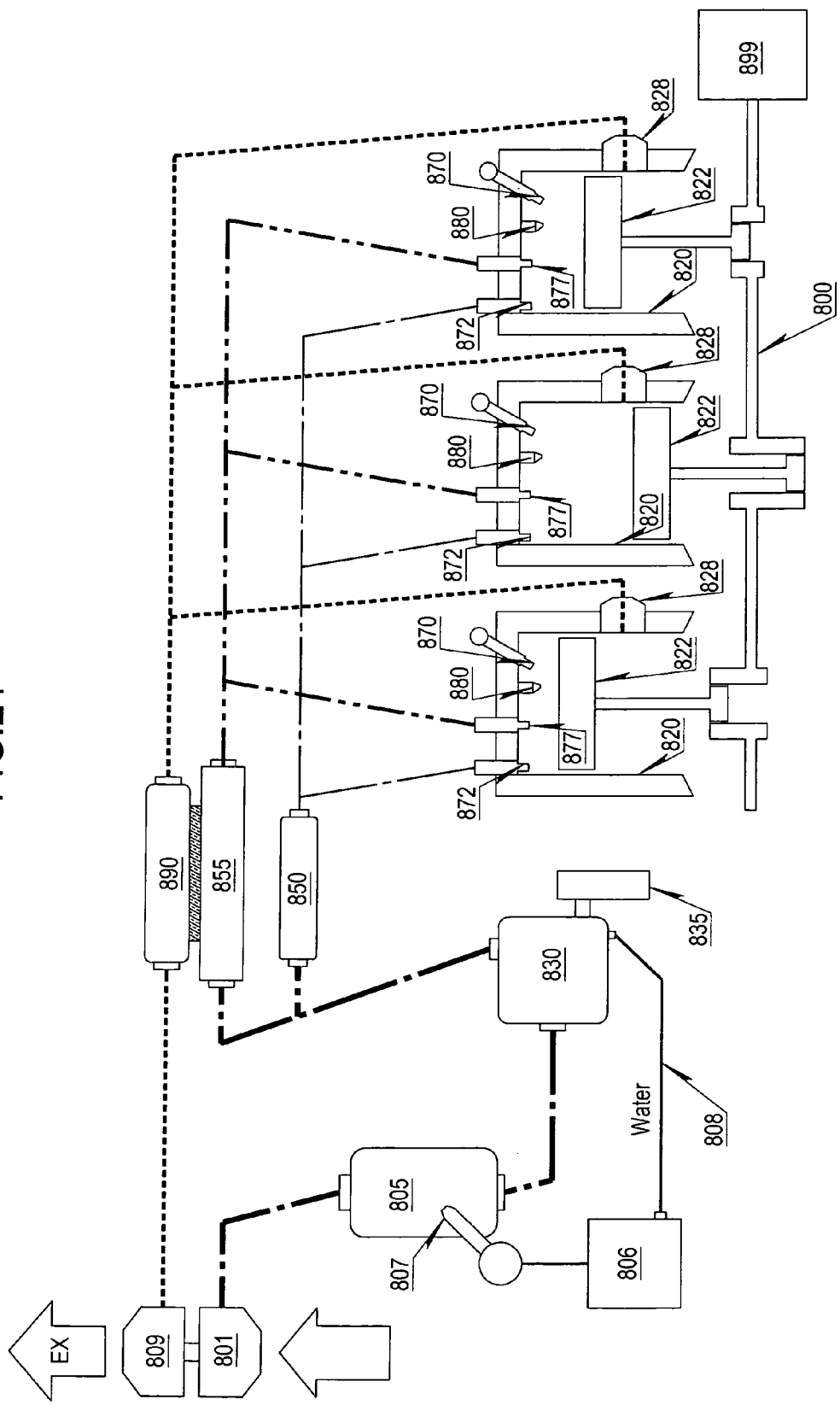
FIG. 21 is an illustrative view of the eighth embodiment of Mackay Cold-Expansion Engine System, which is a vaporization-cooling type configuration of MCES, wherein a water-injector is included to lower the compression energy required for the operation of Mackay Cold-Expansion Cycle.

Now referring to FIG. 21 for the eighth embodiment, which is a vaporization-cooling type MCES configuration that includes a water-injection means for minimizing the compression energy required to produce the high-boost-air.

The components of FIG. 21 are labeled as the turbo-compressor 801, the turbo-turbine 809, the central-compressor 830, the water-injector 807, the low-pressure-buffer 805, the cold-buffer 850, the collecting-passage 808, the water-reservoir 806, the cold-expansion-chambers 820, the pistons 822, the cold-air-injectors 872, the reenergize-air-injectors 877, the fuel-injectors 870, the spark-plugs 880, the crankshaft 800, the heat-transfer-catalytic-converter, the chamber-wall-ports 828 and the output shaft 899.

Each cold-expansion-chamber 820 will perform in a Mackay Cold-Expansion Cycle, which consists of a first-intake-process, a hot-combustion-process, a fuel-cooling-process, a second-intake-process, a cold-expansion-process, and an exhaust-process; wherein the fuel-cooling-process may be disabled in a light load operation or an engine idling operation.

The turbo-compressor 801 is driven by the turbo-turbine 809 to produce a low-boost-air into the low-pressure-buffer 805; the water-injector 807 injects water in a spray pattern that cools the low-boost-air, so that the low-boost-air will have a high humidity before charging into the central-compressor 830.

As the low-boost-air is being compressed in the central-compressor 830, some of the water vapor condenses in the low-boost-air, and the condensed water is drained to the collecting-passage 808, which then delivers the condensed water to the water-reservoir 806; wherein the amount of the water stored in the water reservoir 805 may decrease in time, so a water level sensor is also required in the water-reservoir 806 to provide an indication to the user.

The central-compressor 830 will produce a flow of high-boost-air to the cold-buffer and the reenergize-buffer at a controlled operation speed set by the power-management-unit, in order to sustain a constant operation in each of said two buffers.

Figure 22:
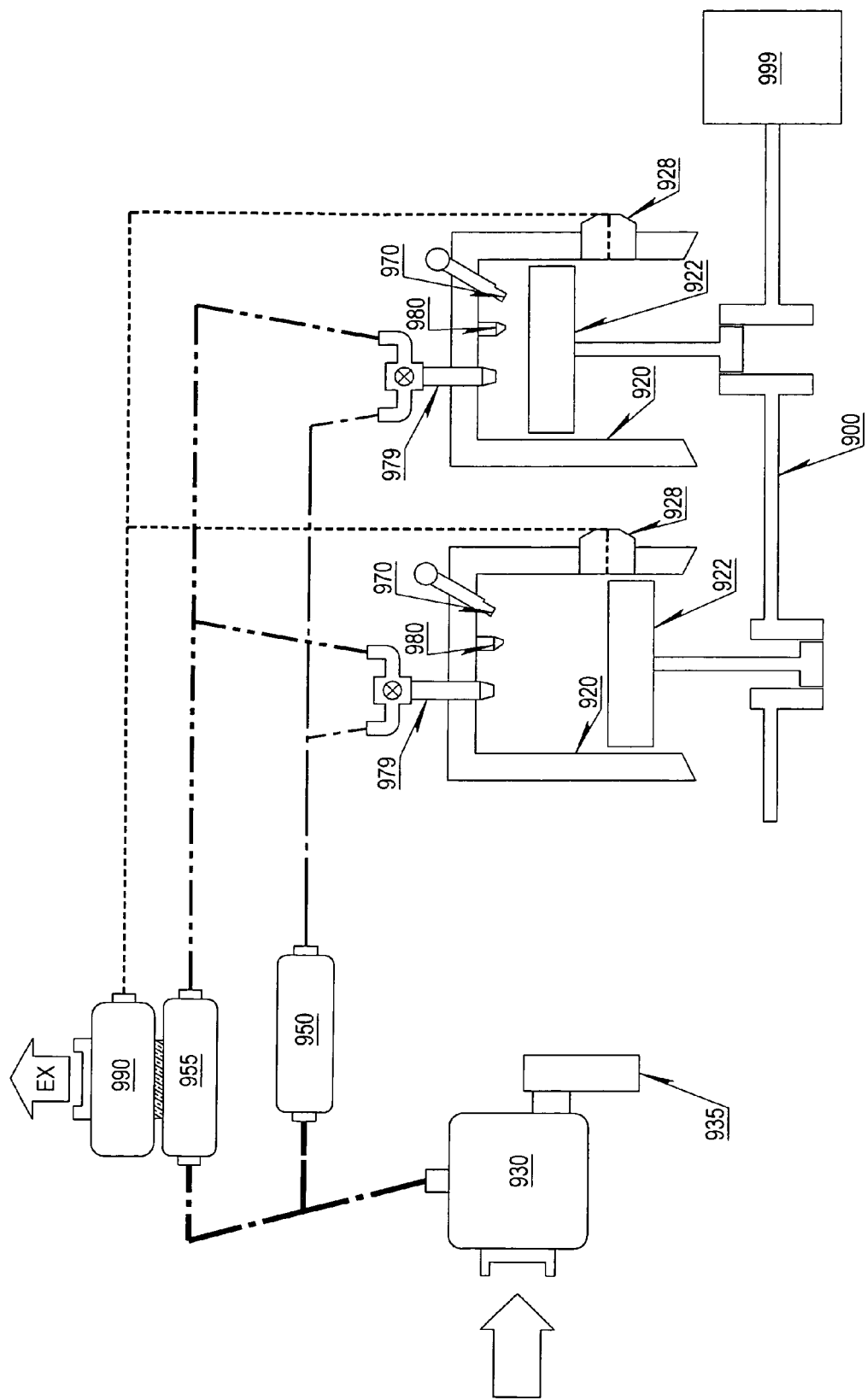
FIG. 22 is an illustrative view of the ninth embodiment of Mackay Cold-Expansion Engine System, which is a MCES configuration including switching-air-injectors; wherein the switching-air-injector charges a flow of cooled high-boost-air from the cold-buffer in the first-intake-process, and charges a flow of heated high-boost-air from the reenergize-buffer in the second-intake-process.

The ninth embodiment shown in FIG. 22 operates on the same principles as the other previously mentioned embodiments of MCES; wherein the Mackay Cold-Expansion Cycle operated in each cold-expansion-chamber 820 is basically explained by FIG. 39 and FIG. 40, while FIG. 41-46 are also applicable if this embodiment is used in a more particular field; whereas if an active-exhaust-valve is used as the exhaust-means in this ninth embodiment for performing an active-exhaust-process (instead of the exhaust-process), FIG. 36-38 are adequate to demonstrate the possible process variations of the Mackay Cold-Expansion Cycle.

The purpose of cooling said low-boost-air by an addition of water-vapor is that, the compression energy consumed by the central-compressor 830 can greatly reduced without installing an air-type intercooler that uses a flow of ambient air to carry out the heat; as there are many drawbacks for an air-type intercooler, such as the size and the inconstant cooling capability.

Now referring to FIG. 22 for the ninth embodiment, which is a MCES consisting of the specialized air-injectors for the operation of Mackay Cold-Expansion Cycle.

The components of FIG. 22 are labeled as the central-compressor 930, the cold-buffer 950, the reenergize-buffer 955, the heat-transfer-catalytic-converter 990, the cold-expansion-chamber 920, the spark-plugs 980, the switching-air-injectors 979, the fuel-injectors 970, the pistons 922, the chamber-wall-ports 928, the crankshaft 900 and the output shaft 999.

The power-management-unit of MCES will control the central-compressor 930 to operate at a controlled speed, such that the cold-buffer 950 will have a constant operation pressure in the range of 4-25 bar, the reenergize-buffer 955 will have a constant operation pressure in the range of 4-30bar; wherein the power-management-unit control the operation speed of the central-compressor 930-by the compressor-transmission 935.

Each cold-expansion-chamber 920 will perform in a Mackay Cold-Expansion Cycle, which consists of a first-intake-process, a hot-combustion-process, a fuel-cooling-process, a second-intake-process, a cold-expansion-process, and an exhaust-process; wherein the fuel-cooling-process may be disabled in a light load operation or an engine idling operation.

The cold-buffer 950 will buffer a cooled high-boost-air to the cold-inlet of the switching-air-injectors 979; the reenergize-buffer will buffer a heated high-boost-air to the hot-inlet of the switching-air-injectors 979.

Each switching-air-injector 979 will switch its air-source to the cold-inlet during the first-intake-process of the associated cold-expansion-chamber 920; wherein the switching-air-injector will inject a flow of cooled high-boost-air (from the cold-buffer 950) into the associated cold-expansion-chamber, thereby forming an air-fuel-mixture with a fuel injected by the associated fuel-injector 970.

Each switching-air-injector 979 will switch its air-source to the hot-inlet during the second-intake-process of the associated cold-expansion-chamber 920; wherein the switching-air-injector will inject a flow of heated high-boost-air (from the reenergize-buffer 955) into the associated cold-expansion-chamber 920, thereby mixing a heated high-boost-air and a hot-combustion-medium to form a cold-expansion-medium.

The ninth embodiment shown in FIG. 22 operates on the same principles as the other previously mentioned embodiments of MCES; wherein the Mackay Cold-Expansion Cycle operated in each cold-expansion-chamber 920 is basically explained by FIG. 39 and FIG. 40, while FIG. 41-46 are also applicable if this embodiment is used in a more particular field; whereas if an active-exhaust-valve is used as the exhaust-means in this ninth embodiment for performing an active-exhaust-process (instead of the exhaust-process), FIG. 36-38 are adequate to demonstrate the possible process variations of the Mackay Cold-Expansion Cycle.

Figure 23:
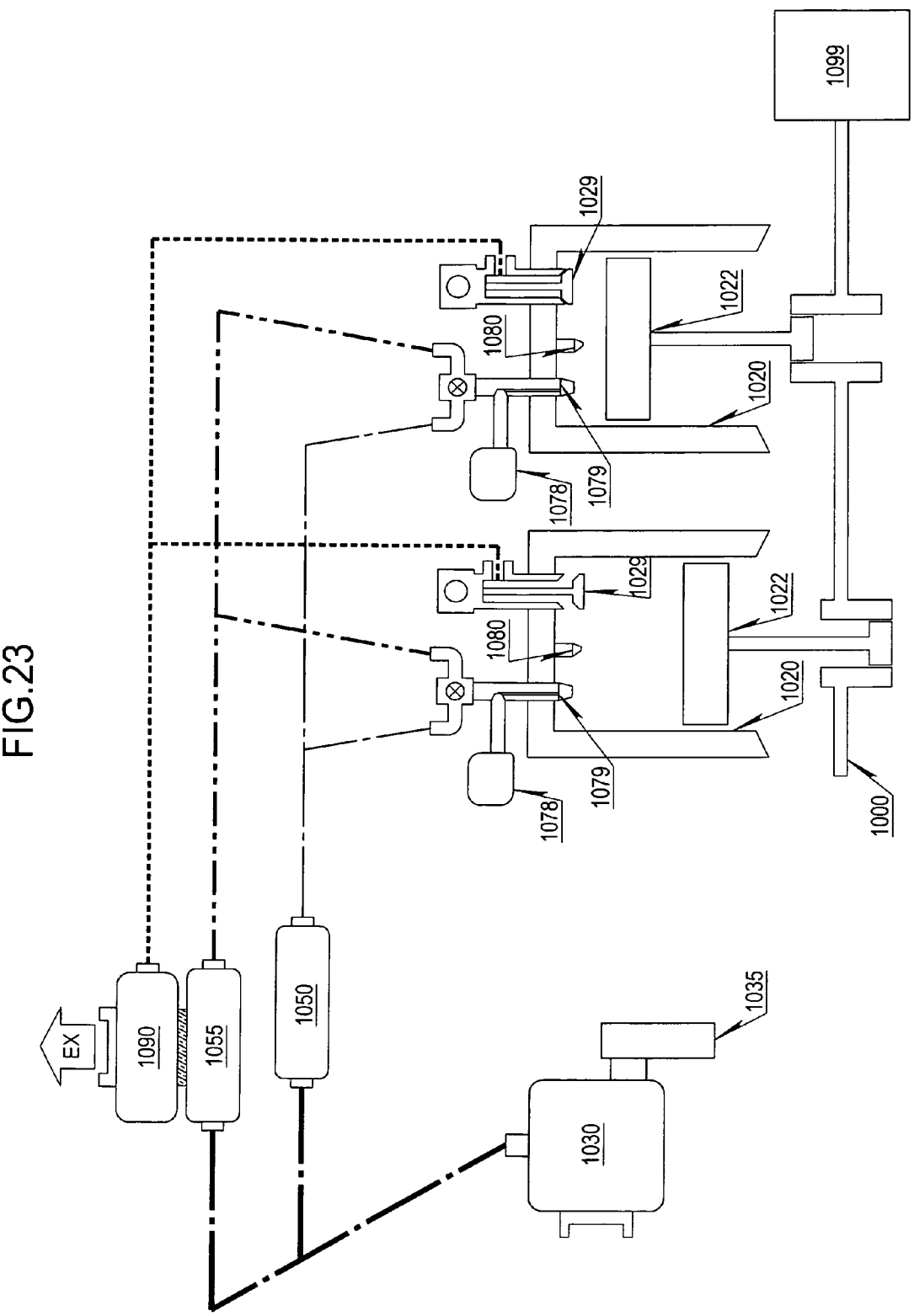
FIG. 23 is an illustrative view of the tenth embodiment of Mackay Cold-Expansion Engine System, which is a MCES configuration including triple-mode-injectors; wherein the triple-mode-injector operate in three modes, the first mode is a spray-injection-mode for supplying an air-fuel-mixture in the first-intake-process, the second mode is a fuel-only-mode for supplying a fuel in the fuel-cooling-process, the third mode is an air-only-mode for supplying a heated high-boost-air in the second-intake-process.

Now referring to FIG. 23 for the tenth embodiment, which is a MCES consisting of another specialized injectors (triple-mode-injectors 1079) for the operation of Mackay Cold-Expansion Cycle.

The components of FIG. 23 are labeled as the central-compressor 1030, the compressor-transmission 1035, the cold-buffer 1050, the reenergize-buffer 1055, the heat-transfer-catalytic-converter 1090, the cold-expansion-chambers 1020, the pistons 1022, the fuel-reservoir 1078, the triple-mode-injectors 1079, the spark-plugs 1080, the active-exhaust-valves 1029, the crankshaft 1000 and the output shaft 1099.

Each cold-expansion-chamber 1020 will perform in a Mackay Cold-Expansion Cycle, which consists of a first-intake-process, a hot-combustion-process, a fuel-cooling-process, a second-intake-process, a cold-expansion-process, and an active-exhaust-process; wherein the fuel-cooling-process may be disabled in a light load operation or an engine idling operation.

The power-management-unit of MCES will control the central-compressor 1030 to operate at a controlled speed, such that the cold-buffer 1050 will have a constant operation pressure in the range of 4-25 bar, the reenergize-buffer 1055 will have a constant operation pressure in the range of 4-30 bar; wherein the power-management-unit control the operation speed of the central-compressor 1030 by the compressor-transmission 1035.

Each triple-mode-injector 1079 will shift in three injection modes according to the operation of Mackay Cold-Expansion Cycle, wherein said three injection modes are the spray-injection-mode, the fuel-only-mode and the air-only-mode.

The triple-mode-injector 1079 will operate in the spray-injection-mode during the first-intake-process, wherein a fuel (from the associated fuel-reservoir) and a cooled high-boost-air (from the cold-buffer) are mixed and sprayed at a high pressure into the associated cold-expansion-chamber, thereby forming an air-fuel-mixture before the top-dead-centre position of the associated piston 1022.

The triple-mode-injector 1079 will operate in the fuel-only-mode during the fuel-cooling-process, wherein a fuel (from the associated fuel-reservoir) is injected into a hot-combustion-medium in the associated cold-expansion-chamber, thereby absorbing heat energy by the vaporization of said fuel.

The tripe-mode-injector 1079 will operate in the air-only-mode during the second-intake-process, wherein a heated high-boost-air (from the reenergize-buffer 1055) is injected into the associated cold-expansion-chamber, thereby mixing said heated high-boost-air with the hot-combustion-medium to form a cold-expansion-medium.

The advantage of implementing the triple-mode-injector is that, the MCES can be applied in a smaller engine configuration and the regular maintenance procedure of the cold-expansion-chamber is made simpler.

Figure 24:
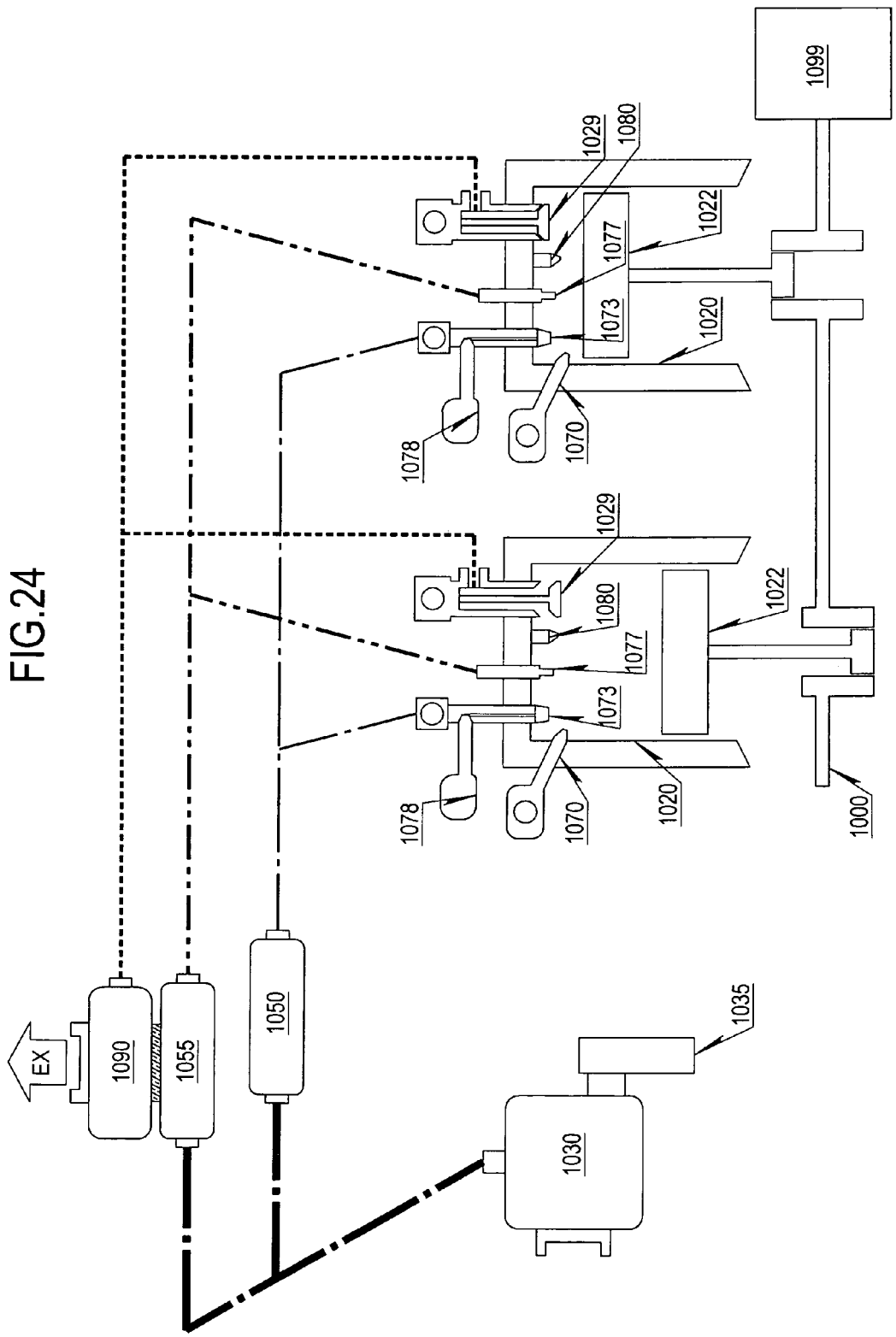
FIG. 24 is an alternative form of the tenth embodiment of Mackay Cold-Expansion Engine System, which is a MCES configuration including a spray-injector, a fuel-injector and a reenergize-air-injector for each cold-combustion-chamber; wherein the spray-injector sprays an air-fuel-mixture containing the fuel from the fuel-reservoir and the cooled high-boost-air from the cold-buffer in the first-intake-process, the fuel-injector injects a fuel to mix with the hot-combustion-medium in the fuel-cooling-process, the reenergize-air-injector injects a heated high-boost-air from the reenergize-buffer in the second-intake-process.

Now referring to FIG. 24 for an alternative form of the tenth embodiment, which is a MCES consisting of another specialized injectors (spray-injectors 1073) for the operation of Mackay Cold-Expansion Cycle.

The components of FIG. 24 are labeled as the central-compressor 1030, the compressor-transmission 1035, the cold-buffer 1050, the reenergize-buffer 1055, the heat-transfer-catalytic-converter 1090, the cold-expansion-chambers 1020, the pistons 1022, the fuel-reservoir 1078, the spray-injectors 1079, the fuel-injectors 1070, the reenergize-air-injectors 1077, the spark-plugs 1080, the active-exhaust-valves 1029, the crankshaft 1000 and the output shaft 1099.

Each spray-injector 1079 will be actuated during the first-intake-process of the associated cold-expansion-chamber 1020, wherein a fuel (from the fuel-reservoir 1078) and a cooled high-boost-air (from the cold-buffer 1050) is mixed and injected into the cold-expansion-chamber at high-pressure, thereby forming an air-fuel-mixture before the top-dead-centre position of the associated piston 1022.

Each fuel-injector 1070 will be actuated during the fuel-cooling-process of the associated cold-expansion-chamber 1020, wherein a fuel is injected into a hot-combustion-medium in the associated cold-expansion-chamber, thereby absorbing heat energy by the vaporization of said fuel.

Each reenergize-air-injector 1077 will be actuated during the second-intake-process of the associated cold-expansion-chamber 1020, wherein a heated high-boost-air (from the reenergize-buffer 1055) is injected into the associated cold-expansion-chamber 1020, thereby mixing said heated high-boost-air with the hot-combustion-medium to form a cold-expansion-medium.

The tenth embodiment shown in FIG. 23 (or FIG. 24) operates on the same principles as the other previously mentioned embodiments of MCES; wherein the Mackay Cold-Expansion Cycle operated in each cold-expansion-chamber 1020 is basically explained by FIG. 36-38, and FIG. 41-46; whereas if a chamber-wall-port is used as the exhaust-means in this tenth embodiment for performing an exhaust-process (instead of the active-exhaust-process), FIG. 39 and FIG. 40 are adequate to demonstrate the possible process variations of the Mackay Cold-Expansion Cycle.

Figure 25:
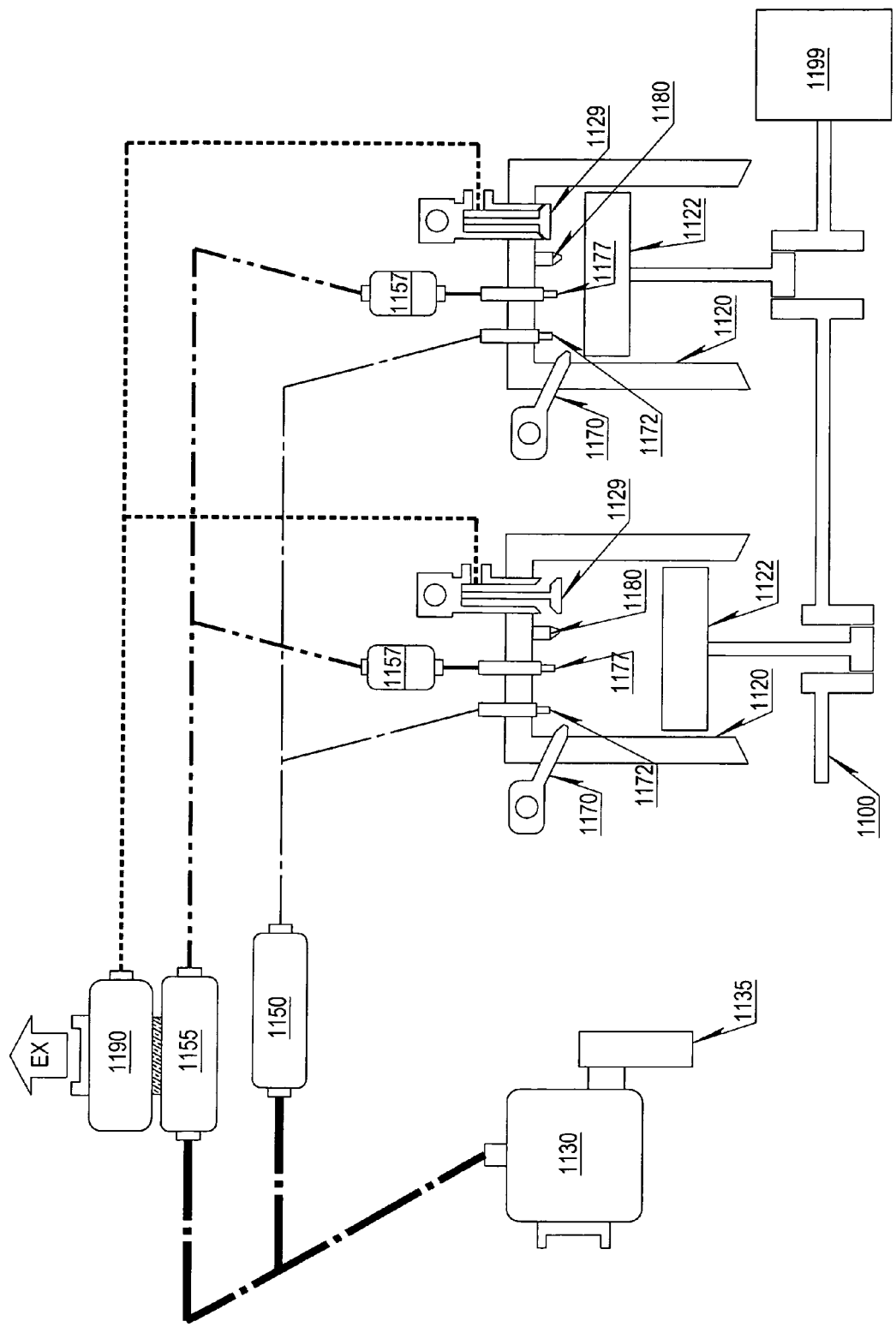
FIG. 25 is the eleventh embodiment, which is a MCES consisting of a specialized injection means for the operation of Mackay Cold-Expansion Cycle; wherein a mini-buffer is used to assist and monitor the performance of each reenergize-air-injector, such that the power-management-unit can adjust the actuation time of each reenergize-air-injector by monitoring the pressure/airflow data detected by a sensor means in the associated mini-buffer, thereby ensuring a desired amount of heated high-boost-air is injected into each cold-expansion-chamber during the second-intake-process.

Now referring to FIG. 25 for the eleventh embodiment, which is a MCES consisting of another specialized injection means (mini-buffer) for the operation of Mackay Cold-Expansion Cycle.

The components of FIG. 25 are labeled as the central-compressor 1130, the compressor-transmission 1135, the cold-buffer 1150, the reenergize-buffer 1155, the heat-transfer-catalytic-converter 1190, the cold-expansion-chambers 1120, the pistons 1122, the cold-air-injectors 1172, the fuel-injector 1170, the reenergize-air-injectors 1177, the spark-plugs 1180, the mini-buffers 1057, the active-exhaust-valve 1129, the crankshaft 1100 and the output shaft 1199.

Each cold-expansion-chamber 1120 will perform in a Mackay Cold-Expansion Cycle, which consists of a first-intake-process, a hot-combustion-process, a fuel-cooling-process, a second-intake-process, a cold-expansion-process, and an active-exhaust-process; wherein the fuel-cooling-process may be disabled in a light load operation or an engine idling operation.

The power-management-unit of MCES will control the central-compressor 1130 to operate at a controlled speed, such that the cold-buffer 1150 will have a constant operation pressure in the range of 4-25 bar, the reenergize-buffer 1155 will have a constant operation pressure in the range of 4-30 bar; wherein the power-management-unit control the operation speed of the central-compressor 1130 by the compressor-transmission 1135.

Each mini-buffer 1157 is installed near the associated reenergize-air-injector 1177 for buffering an adequate amount of heated high-boost-air, thereby preventing an inconstant airflow during the actuation time of the associated reenergize-air-injector 1177; and each mini-buffer 1157 has a built-in buffer-sensor for reporting the airflow data (pressure/airflow mass) therein to the power-management-unit of MCES, so the power-management-unit takes in this airflow data for calculating a corrected actuation time of the reenergize-air-injectors 1177, in order to inject a designated amount of heated high-boost-air during the second-intake-process to form a cold-expansion-medium at a precisely regulated temperature for the best expansion efficiency.

The advantage of this mini-buffer is that, the MCES will have a better control on the injected air-mass of the second-intake-process, in addition, the flow resistance of the air-passages from the reenergize-buffer to each reenergize-air-injector can be almost neglected from the computation in the power-management-unit, and this also ensures the second-intake-process to be completed in the shortest time possible with the an air-injection of the designated air-mass.

Figure 26:
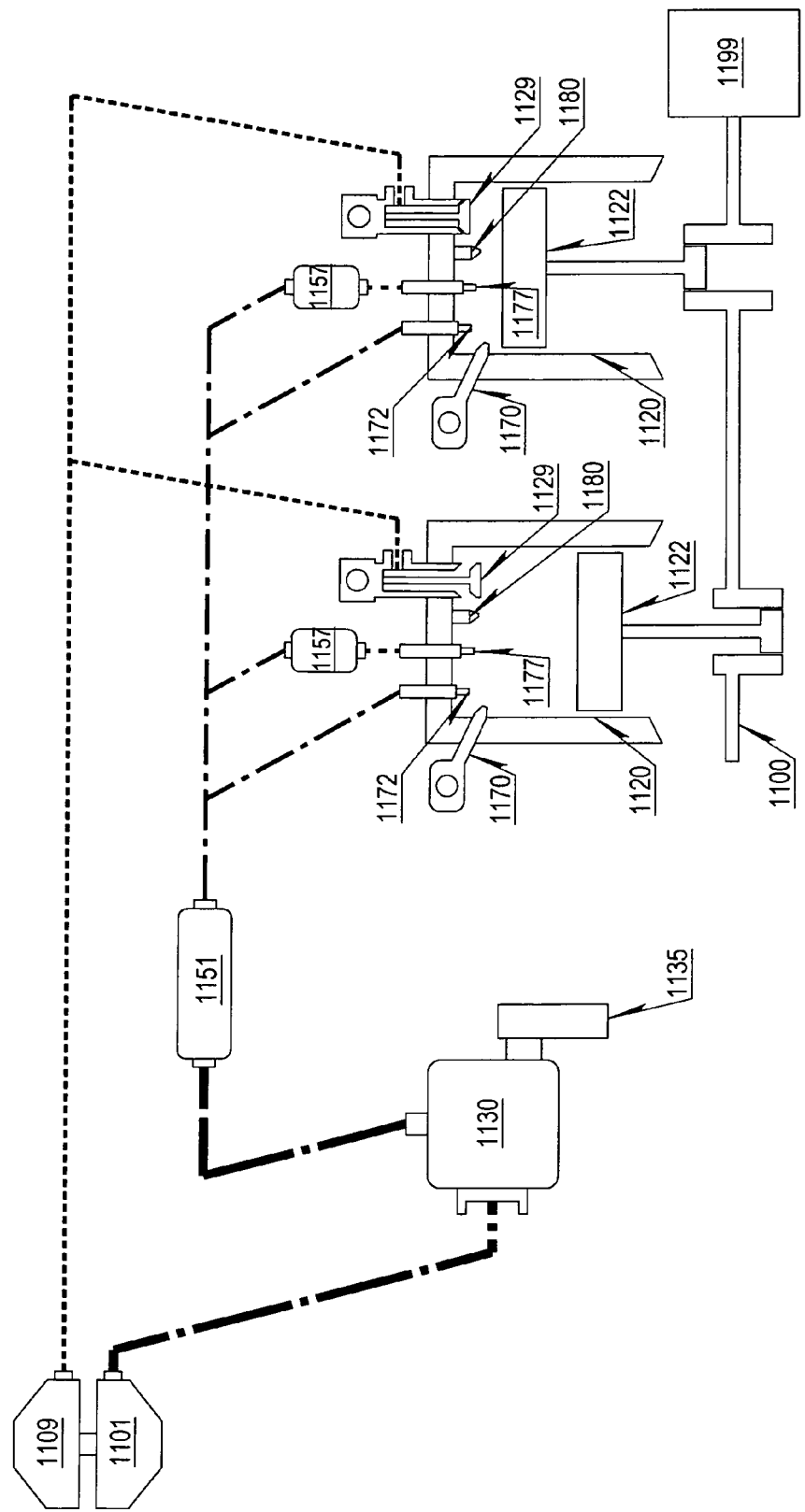
FIG. 26 is an alternative form of FIG. 25, wherein a central-buffer is used to buffer the high-boost-air for the cold-air-injector and the reenergize-air-injector; and each reenergize-air-injector is equipped with a mini-buffer and a sensor means.

Now referring to FIG. 26 for an alternative form of the eleventh embodiment, which is another MCES consisting of the mini-buffers for the operation of Mackay Cold-Expansion Cycle.

The components of FIG. 26 are labeled as the turbo-compressor 1101, the turbo-turbine 1109, the central-compressor 1130, the compressor-transmission 1135, the central-buffer 1151, the mini-buffers 1157, the cold-expansion-chambers 1120, the pistons 1122, the cold-air-injectors 1172, the fuel-injectors 1170, the reenergize-air-injectors 1177, the spark-plugs 1180, the active-exhaust-valve 1129, the crankshaft 1100 and the output shaft 1199.

The power-management-unit of MCES will control the central-compressor 1130 to operate at a controlled speed, such that the central-buffer 1151 will have a constant operation pressure in the range of 4-25 bar, wherein the power-management-unit control the operation speed of the central-compressor 1130 by adjusting the gear ratio setting of the compressor-transmission 1135.

Each cold-expansion-chamber 1120 will perform in a Mackay Cold-Expansion Cycle, which consists of a first-intake-process, a hot-combustion-process, a fuel-cooling-process, a second-intake-process, a cold-expansion-process and an active-exhaust-process; wherein the fuel-cooling-process may be disabled in a light load operation or an engine idling operation.

In FIG. 26, the central-buffer 1151 will buffer a high-boost-air, which is distributed to all the cold-air-injectors 1172 and the mini-buffers 1157.

Each mini-buffer 1157 is installed near the associated reenergize-air-injector 1177 for buffering an adequate amount of heated high-boost-air, thereby preventing an inconstant air-flow during the actuation time of the associated reenergize-air-injector 1177; and each mini-buffer 1157 has a built-in buffer-sensor for reporting the airflow data (pressure/airflow mass) therein to the power-management-unit of MCES, so the power-management-unit takes in this airflow data for calculating a corrected actuation time of the reenergize-air-injectors 1177, in order to input a designated amount of heated high-boost-air during the second-intake-process to form a cold-expansion-medium at a precisely regulated temperature for the best expansion efficiency.

The eleventh embodiment shown in FIG. 25 (or FIG. 26) operates on the same principles as the other previously mentioned embodiments of MCES; wherein the Mackay Cold-Expansion Cycle operated in each cold-expansion-chamber 1120 is basically explained by FIG. 36-38, and FIG. 41-46; whereas if a chamber-wall-port is used as the exhaust-means in this eleventh embodiment for performing an exhaust-process (instead of the active-exhaust-process), FIG. 39 and FIG. 40 are adequate to demonstrate the possible process variations of the Mackay Cold-Expansion Cycle.

Figure 27:
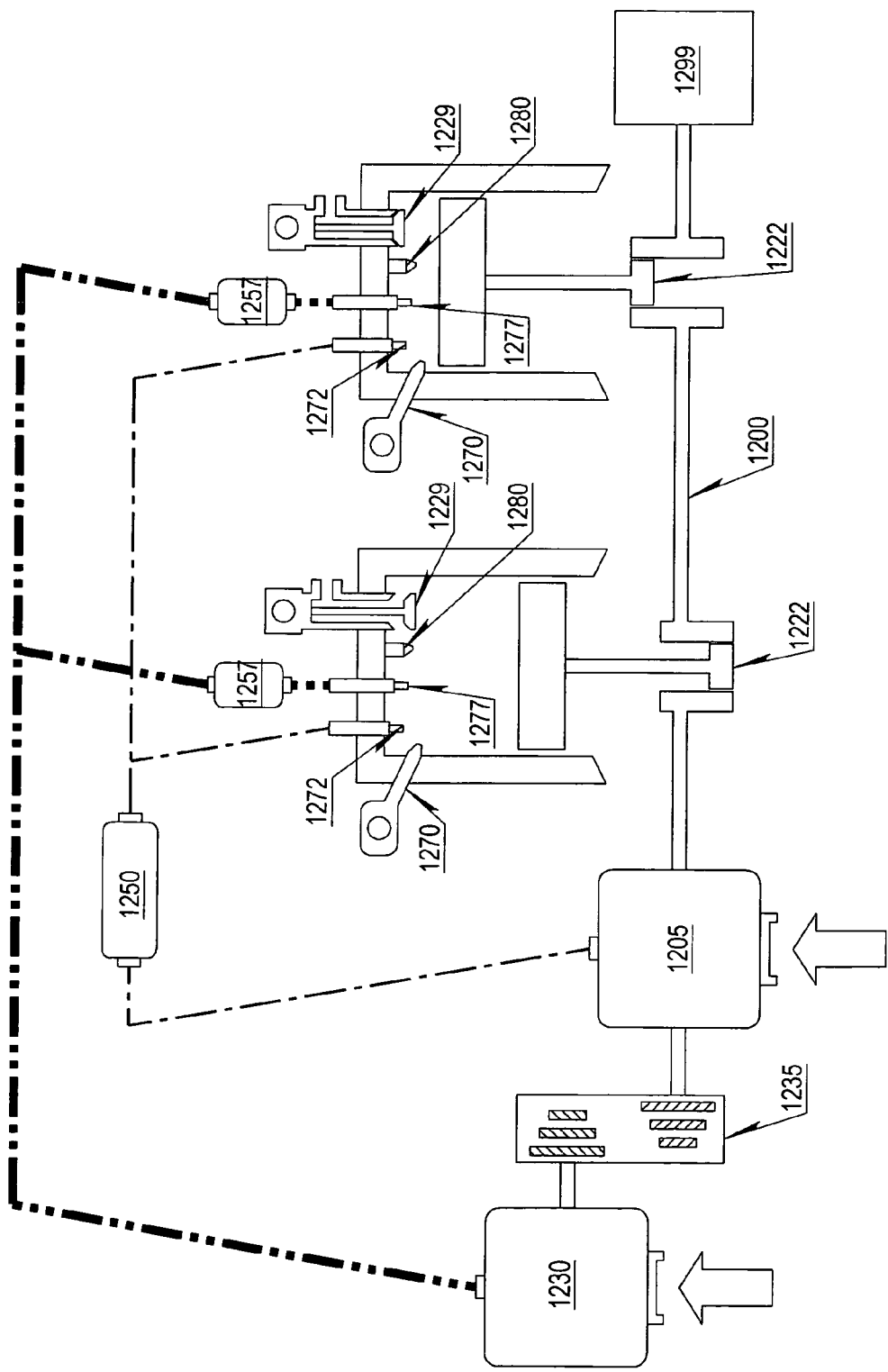
FIG. 27 demonstrates the twelfth embodiment of MCES including a specialized air-compression means for Mackay Cold-Expansion Cycle; wherein a primary-compressor supplies a high-boost-air to the cold-buffer, a secondary-compressor supplies a high-boost-air to a mini-buffer of each reenergize-air-injector.

Now referring to FIG. 27 for the twelfth embodiment, which is a MCES consisting of a primary-compressor and a secondary-compressor for the operation of Mackay Cold-Expansion Cycle.

The components of FIG. 27 are labeled as the primary-compressor 1205, the secondary-compressor 1230, the compressor-transmission 1235, the cold-buffer 1250, the mini-buffers 1257, the cold-expansion-chambers 1220, the pistons 1222, the cold-air-injectors 1272, the fuel-injectors 1270, the reenergize-air-injectors 1277, the spark-plugs 1280, the active-exhaust-valve 1229, the crankshaft 1200 and the output shaft 1299.

The primary-compressor 1205 is directly powered by the crankshaft 1200, and the primary-compressor generates a high-boost-air into the cold-buffer 1250.

The secondary-compressor 1230 is couple to the crankshaft 1200 by the compressor-transmission 1235; wherein the power-management-unit of MCES will control the operation speed of the secondary-compressor 1230 by adjusting the gear ratio setting of the compression-transmission 1235, such that each mini-buffer 1257 will have a constant operation pressure in the range of 4-30 bar.

Each mini-buffer 1257 is installed near the associated reenergize-air-injector 1277 for buffering an adequate amount of heated high-boost-air, which is injected into the associated cold-expansion-chamber 1220 via the associate reenergize-air-injector 1277 during the associated second-intake-process.

Each cold-expansion-chamber 1220 will perform in a Mackay Cold-Expansion Cycle, which consists of a first-intake-process, a hot-combustion-process, a fuel-cooling-process, a second-intake-process, a cold-expansion-process and an active-exhaust-process; wherein the fuel-cooling-process may be disabled in a light load operation or an engine idling operation.

The advantage of utilizing a primary-compressor and a secondary-compressor is the simplification of the computation in the power-management-unit of the MCES, this is because the first-intake-process has an airflow mass that is nearly proportional to the revolution of the crankshaft, while the second-intake-process has an airflow mass that depends on the amount of the air required to cool the hot-combustion-medium to 400-1100 degree Celsius for the best expansion efficiency; wherein the injected air-mass of the second-intake-process may range from 50% to 350% of the injected air-mass of the first-intake-process; therefore, by independently controlling a secondary-compressor to supply a source of high-boost-air to the reenergize-air-injector 1277, the power-management-unit of the MCES can compute with less variable for each injector's actuation time and the gear ratio setting of the compressor-transmission 1235.

Figure 28:
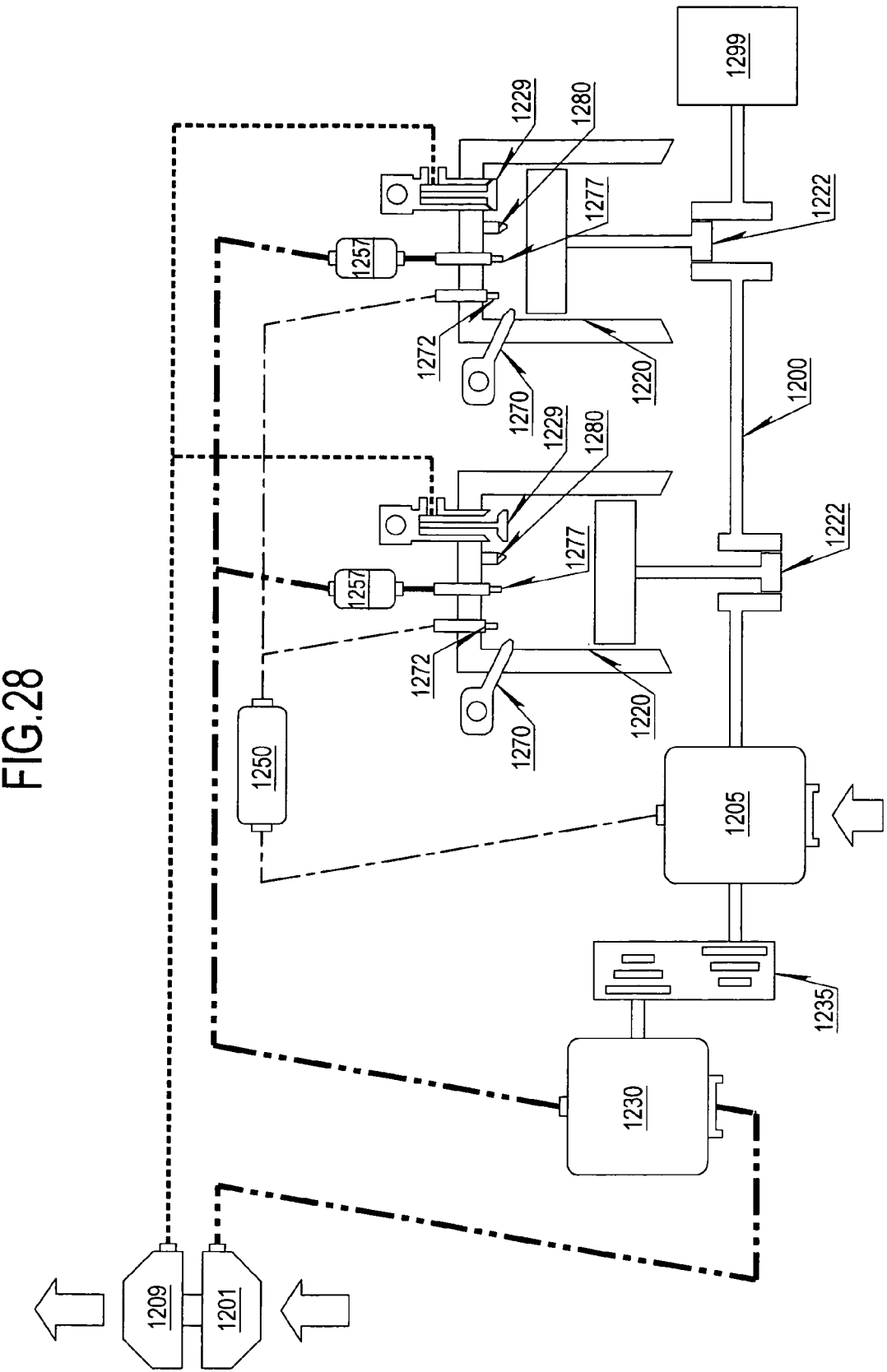
FIG. 28 is an alternative form of FIG. 27, wherein a turbocharger system is included to provide a low-boost-air to the secondary-compressor.

Now referring to FIG. 28 for an alternative form of the twelfth embodiment, which is a MCES consisting of a turbo-charger, a primary-compressor and a secondary-compressor.

The components of FIG. 28 are labeled as the turbo-compressor 1201, the turbo-turbine 1209, the primary-compressor 1205, the secondary-compressor 1230, the compressor-transmission 1235, the cold-buffer 1150, the mini-buffers 1257, the cold-expansion-chambers 1220, the pistons 1222, the cold-air-injectors 1272, the fuel-injectors 1270, the reenergize-air-injectors 1277, the spark-plugs 1280, the active-exhaust-valve 1229, the crankshaft 1200 and the output shaft 1299.

The turbo-compressor 1201 is driven the turbo-turbine 1209 to provide a low-boost-air into the secondary-compressor 1230; this configuration can greatly reduce the size of the secondary-compressor 1230 because the efficiency of the turbo-turbine 1209 is higher in a heavier load operation; in other words, the turbo-compressor 1201 is capable of efficiently providing a much higher airflow in the heavy load operation, which is ideal for operation of Mackay Cold-Expansion Cycle, since the injected air-mass required for the second-intake-process is generally higher in the heavy load operation; for example, in order to operation the MCES at high energy efficiency, the injected air-mass of the second-intake-process may be set to about 50% of the injected air-mass of the first-intake-process in a light load operation, whereas the injected air-mass of the second-intake-process may be set to as high as 350% of the injected air-mass of the first-intake-process in a heavy load operation; this is because the temperature of the hot-combustion-medium is much higher in a heavy load operation than a light load operation, which in terms requires a much greater amount of heated high-boost-air to cool the hot-combustion-medium.

Figure 29:
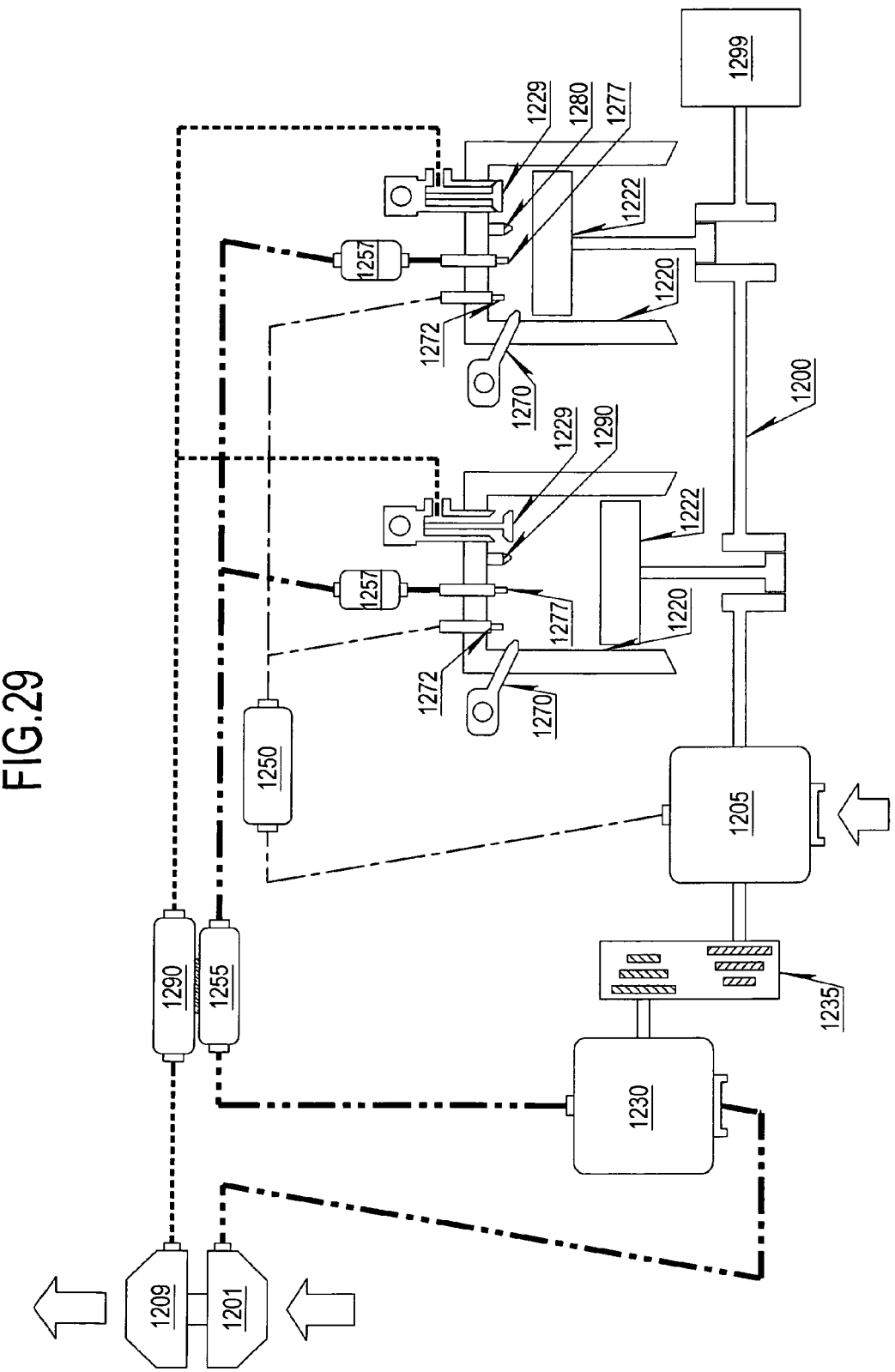
FIG. 29 is another alternative form of FIG. 27, wherein a turbocharger system and a heat-transfer-catalytic-converter are included to minimize the compression energy required for the operation of Mackay Cold-Expansion Cycle.

Now referring to FIG. 29 for another alternative form of the twelfth embodiment, which is a MCES further consisting of a turbo-compressor 1201, a turbo-turbine 1209, a reenergize-buffer 1255 and a heat-transfer-catalytic-converter 1290; wherein the heat-transfer-catalytic-converter 1290 further increases the overall energy efficiency of the MCES by the reenergize-process.

The twelfth embodiment shown in FIG. 27 (or FIG. 28 or FIG. 29) operates on the same principles as the other previously mentioned embodiments of MCES; wherein the Mackay Cold-Expansion Cycle operated in each cold-expansion-chamber 1220 is basically explained by Process Chart.1-3, and Process Chart.6-11; whereas if a chamber-wall-port is used as the exhaust-means in this tenth embodiment for performing an exhaust-process (instead of the active-exhaust-process), Process Chart.4-5 are adequate to demonstrate the possible process variations of the Mackay Cold-Expansion Cycle.

Now referring to FIG. 13 for the thirteenth embodiment, which is a MCES consisting of an axial-turbine-compressor and mini-buffers for the operation of Mackay Cold-Expansion Cycle; wherein since this type of MCES is generally used for power generation, a compressor-transmission is optional due to the narrow power output range if the injected air-mass of the first-intake-process and the injected air-mass of the second-intake-process are at a fixed ratio.

The components of FIG. 13 are labeled as the axial-turbine-compressor 1330, the reenergize-buffer 1355, the heat-transfer-catalytic-converter 1390, the hot-mini-buffers 1357, the cold-mini-buffers 1352, the cold-expansion-chambers 1320, the pistons 1322, the cold-air-injectors 1372, the fuel-injectors 1370, the reenergize-air-injectors 1377, the spark-plugs 1380, the chamber-wall-port 1328, the crankshaft 1300 and the output shaft 1399.

The axial-turbine-compressor 1330 is directly powered by the crankshaft 1300, and the axial-turbine-compressor 1330 generates high-boost-air into the reenergize-buffer 1355 and all the cold-mini-buffers; wherein each cold-mini-buffer may include an airflow regulator to keep the operation pressure therein in the range of 4-25 bar.

The reenergize-buffer 1355 will buffer a heated high-boost-air, which is supplied into all the hot-mini-buffers; wherein each hot-mini-buffer may include an airflow regulator to keep the operation pressure therein in the range of 4-30 bar.

The heat-transfer-catalytic-converter 1390 transfers the heat energy remained in the expelled cold-expansion-medium, thereby heating up the high-boost-air buffered in the reenergize-buffer 1355.

Each cold-expansion-chamber 1320 will perform in a Mackay Cold-Expansion Cycle, which consists of a first-intake-process, a hot-combustion-process, a fuel-cooling-process, a second-intake-process, a cold-expansion-process, and an exhaust-process; wherein the fuel-cooling-process may be disabled in a light load operation or an engine idling operation.

Figure 30:
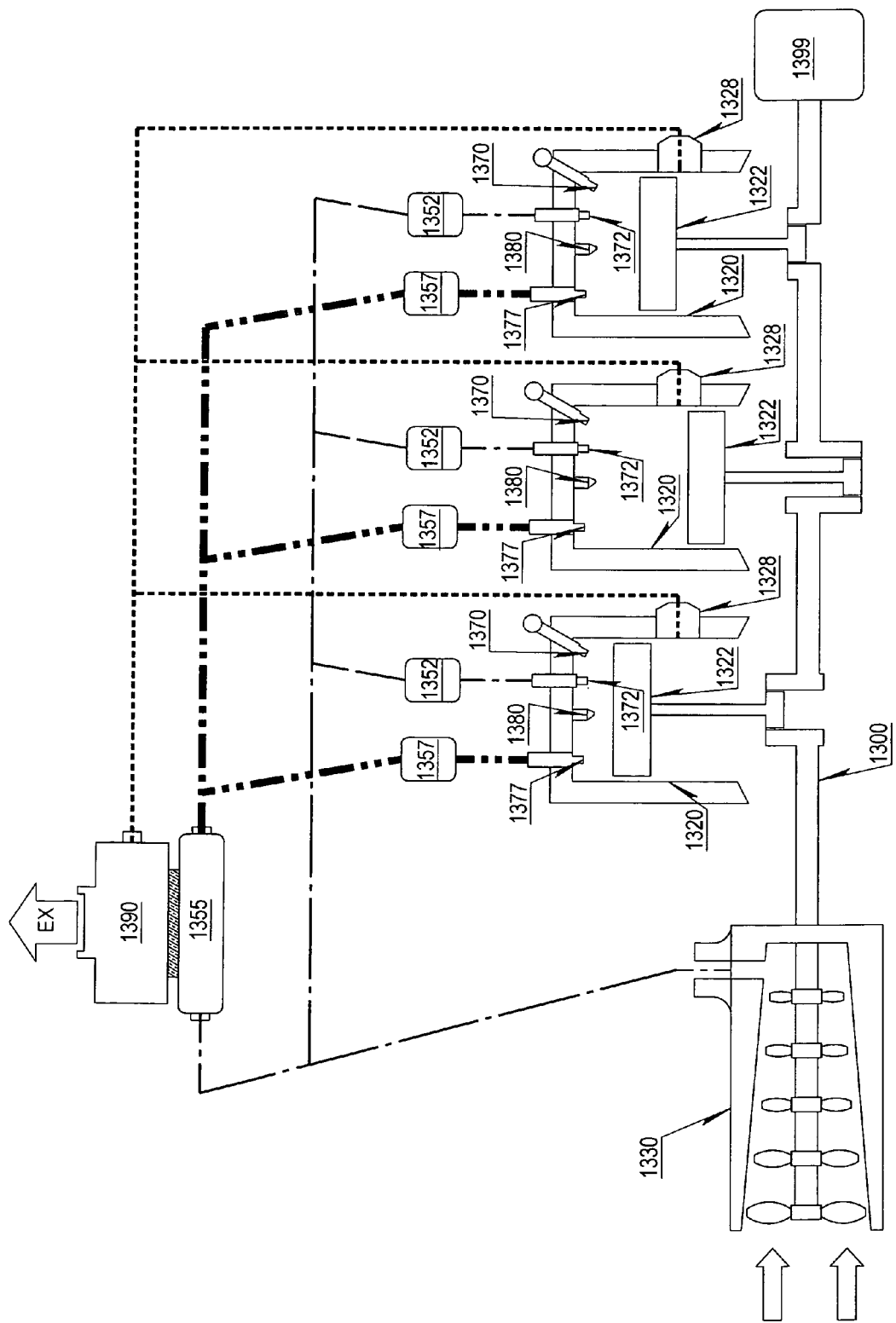
FIG. 30 demonstrates the thirteenth embodiment of MCES including a specialized combination of air-compression means and air-buffer-system for Mackay Cold-Expansion Engine System; wherein an axial-turbine-compressor supplies a high-boost-air for the first-intake-process and the second-intake-process, each cold-air-injector and each reenergize-air-injector is equipped with a mini-buffer.

The thirteenth embodiment shown in FIG. 30 operates on the same principles as the other previously mentioned embodiments of MCES; wherein the Mackay Cold-Expansion Cycle operated in each cold-expansion-chamber 1320 is basically explained by FIG. 39 and FIG. 40; whereas if an active-exhaust-valve is used together with the chamber-wall-port for further increasing the energy efficiency (as shown in FIG. 34 with a combined exhaust means), FIG. 41-44 are adequate to demonstrate the possible process variations of the Mackay Cold-Expansion Cycle.

Figure 31:
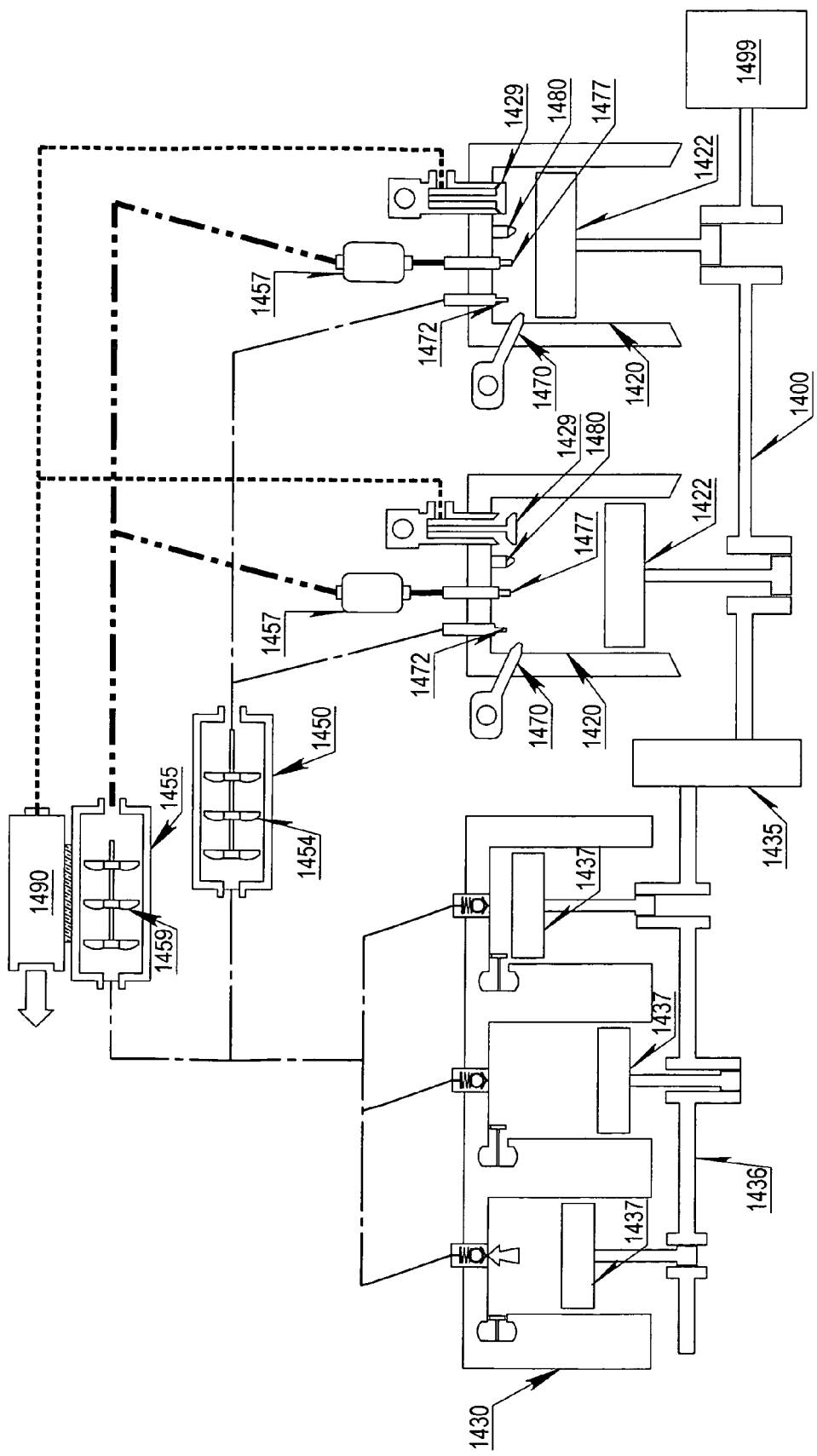
FIG. 31 demonstrates the fourteenth embodiment of MCES including a specialized combination of air-compression means and air-buffer-system for Mackay Cold-Expansion Engine System, which includes multiple air-compressor in parallel configuration to output a constant flow of high-boost-air to a central-buffer; wherein the central-buffer includes free-spinning turbines for stabilizing the air flow velocity to ensure the functionality of each cold-air-injector and each reenergize-air-injector, such that the power-management-unit can adjust the injected air-mass by the actuation time of each cold-air-injector and each reenergize-air-injector.

Now referring to FIG. 31 for the fourteenth embodiment, which is a MCES consisting of a continuous-flow-compressor, a cold-buffer, a reenergize-buffer and a heat-transfer-catalytic-converter.

The components of FIG. 31 are labeled as the continuous-flow-compressor 1430, the compressor-piston 1437, the compressor-crankshaft 1436, the compressor-transmission 1435, the cold-buffer 1450, the cold-buffer-turbine 1454, the reenergize-buffer 1455, the reenergize-buffer-turbine 1459, the heat-transfer-catalytic-converter 1490, the hot-mini-buffers 1457, the cold-expansion-chambers 1420, the pistons 1422, the spark-plugs 1480, the fuel-injectors 1470, the reenergize-air-injectors 1477, the active-exhaust-valve 1429, the crankshaft 1400 and the output shaft 1499.

The continuous-flow-compressor 1430 is consisting of multiple air-compressors in a parallel configuration, such that each compressor-piston is charging a high-boost-air at different portion of the compressor-crankshaft rotation (for example the continuous-flow-compressor 1430 uses three piston type air-compressors to charge high-boost-air every 120 degree of the compressor-crankshaft rotation); wherein the continuous-flow-compressor 1430 generates a continuous flow of high-boost-air into the cold-buffer 1450 and the reenergize-buffer 1455.

The advantage of the continuous-flow-compressor is that, this configuration provides a source of high-boost-air that is constant in pressure and flow speed regardless of the gear setting of the compressor-transmission 1435, and this configuration also the compressor-transmission 1435 to operate in a lower gear ratio for Mackay Cold-Expansion Cycle.

The reason is that, if only one air-compressor is presented, it will output the high-boost-air in only about 30-60 degree of the compressor-crankshaft rotation, which will cause an desired high pressure surge in a low-rpm operation and decrease efficiency; to be more specifically, it means that the reenergize-buffer and the cold-buffer will have to received a short flow of high-boost-air that is at about 25-40 bar if the reenergize-buffer and the cold-buffer are set to have a constant operation pressure of 8-12 bar; and the compressor-crankshaft also needs to rotate much faster than the crankshaft of the cold-expansion-chamber to keep a more constant airflow in both the reenergize-buffer and the cold-buffer.

Ideally, the MCES will operate the air-compression means at its most efficient load with a variable operation speed that depends on the amount of the high-boost-air required to perform the first-intake-process and the second-intake-process, wherein the air-pressures in the cold-buffer and the reenergize-buffer are stabilized to ensure the best performance of the reenergize-air-injectors and the cold-air-injectors.

The cold-buffer-turbine 1454 is a set of free-spinning turbine-fins which will keep the airflow speed constant during the actuation time of each cold-air-injector 1472, thereby injecting an cooled high-boost-air that has an air-mass almost directly linear to the associated actuation time during the first-intake-process.

The reenergize-buffer-turbine 1459 is a set of free-spinning turbine-fins which will keep the airflow speed constant during the actuation time of each reenergize-air-injector 1477, thereby injecting an heated high-boost-air that has an air-mass almost directly linear to the associated actuation time during the second-intake-process.

Each hot-mini-buffer 1457 is installed near the associated reenergize-air-injector 1477 for buffering an adequate amount of heated high-boost-air, thereby preventing the flow resistance of the air-passages from affecting the performance of the associated reenergize-air-injector 1477 in a heavy load operation.

Each cold-expansion-chamber 1420 will perform in a Mackay Cold-Expansion Cycle, which consists of a first-intake-process, a hot-combustion-process, a fuel-cooling-process, a second-intake-process, a cold-expansion-process, and an active-exhaust-process; wherein the fuel-cooling-process may be disabled in a light load operation or an engine idling operation.

The fourteenth embodiment shown in FIG. 31 operates on the same principles as the other previously mentioned embodiments of MCES; wherein the Mackay Cold-Expansion Cycle operated in each cold-expansion-chamber 1420 is basically explained by FIG. 36-38; whereas if a chamber-wall-port is used together with the active-exhaust-valve 1429 for further increasing the energy efficiency (as shown in FIG. 34 with a combined exhaust means), FIG. 39 and FIG. 40 are adequate to demonstrate the possible process variations of the Mackay Cold-Expansion Cycle.

Figure 32:
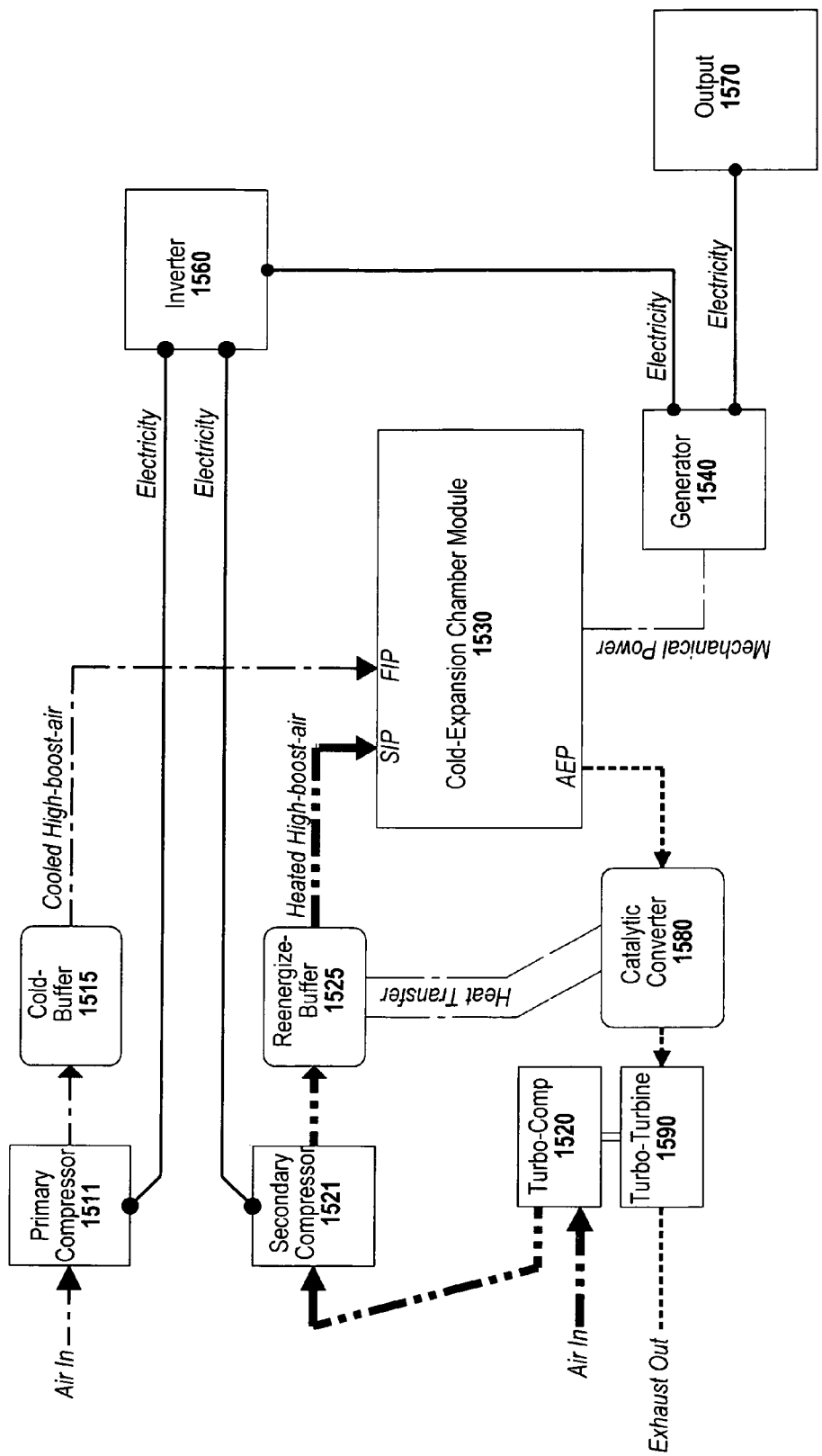
FIG. 32 and FIG. 33 together show the fifteenth embodiment of MCES specialized for the large power generation applications, wherein an inverter is used to power a primary compressor and a secondary compressor; the essential sensor means, and flow control means are shown in FIG. 33.
Figure 33:
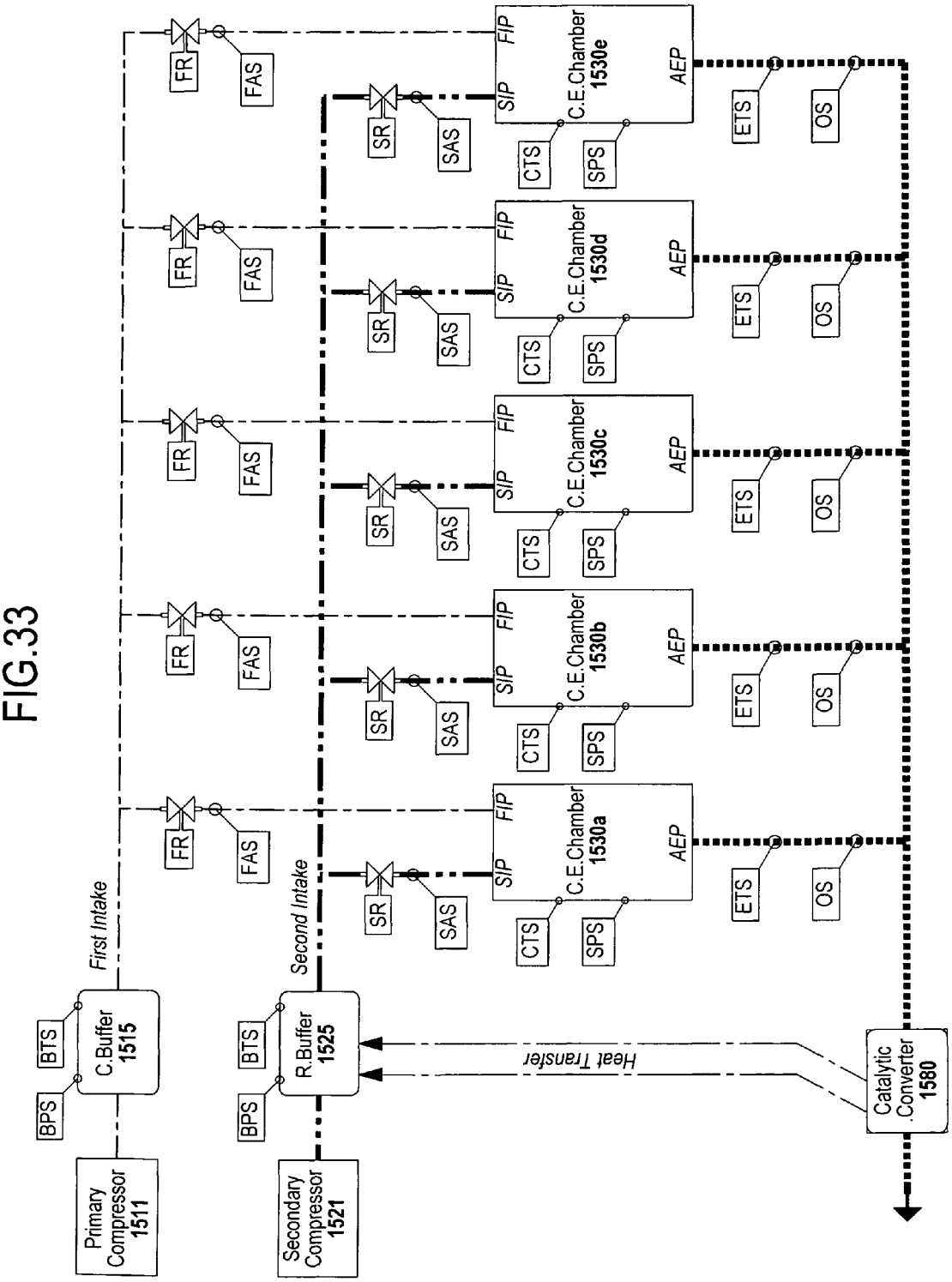

Now referring to FIG. 32 and FIG. 33 for the fifteenth embodiment, which presents one of the best mode of the MCES specialized for the power generation purpose, wherein the MCES includes a large set of cold-expansion-chambers (such as a set of 12-chambers or 24-chambers, wherein this embodiment only shows a set of 5 cold-expansion-chambers for the demonstration purpose), a generator, an inverter-system, a heat-transfer-catalytic-converter, air-compression means, flow-regulators and sensor means for operating a highly-efficient Mackay Cold-Expansion Cycle.

FIG. 32 is the schematic view of the MCES, showing the airflow distribution and the energy distribution between each components of the MCES.

FIG. 33 is the schematic view of the components associated with a set of 5 cold-expansion-chambers; wherein said 5 cold-expansion-chambers are labeled as 1530a-1530e.

The components of FIG. 32 are labeled as the primary-compressor 1511, the secondary-compressor 1521, the cold-buffer 1515, the reenergize-buffer 1525, the turbo-compressor 1520, the turbo-turbine 1590, the cold-expansion-chamber set 1530, the heat-transfer-catalytic-converter 1580, the inverter-system 1560, the generator 1540, and the power-output 1570.

The primary-compressor 1511 is driven by an electrical motor to operate at a controlled speed, such that the operation pressure of the cold-buffer 1515 is sustained at a constant pressure within the range of 4-25 bar.

The turbo-compressor 1520 is driven by the turbo-turbine 1590 to produce a low-boost-air to the secondary-compressor 1521.

The secondary-compressor 1521 is driven by an electrical motor to operate at a controlled speed, such that the operation pressure of the reenergize-buffer 1525 is sustained at a constant pressure within the range of 4-30 bar.

The cold-buffer 1515 will buffer a cooled high-boost-air, which is supplied in to the cold-air-injection means of the cold-expansion-chamber set 1530 for performing the first-intake-process of Mackay Cold-Expansion Cycle; wherein the cold-buffer 1515 may include a cooling means for dissipating the high-boost-air buffered in the cold-buffer 1515.

The reenergize-buffer 1525 will buffer a heated high-boost-air, which is supplied into the reenergize-air-injection means of the cold-expansion-chamber set 1530 for performing the second-intake-process of Mackay Cold-Expansion Cycle; wherein the reenergize-buffer 1525 receives the heat energy transferred from the heat-transfer-catalytic-converter 1580 to heat up the high-boost-air buffered in the reenergize-buffer 1525.

The heat-transfer-catalytic-converter 1580 receives a flow of cold-expansion-medium expelled from the cold-expansion-chamber set 1530; wherein the heat energy of the expelled cold-expansion-medium is transferred to the reenergize-buffer 1525.

The cold-expansion-chamber set 1530 includes at least two cold-expansion-chambers; wherein the cooled high-boost-air is injected into each cold-expansion-chamber during its associated first-intake-process (FIP); the heated high-boost-air is injected into each cold-expansion-chamber during its associated second-intake-process (SIP); a flow of cold-expansion-medium is expelled from each cold-expansion-chamber during its associated active-exhaust-process (AEP); the mechanical power produced during the operation of Mackay Cold-Expansion Cycle is harvested by the generator 1540.

The generator 1540 produces electricity to the inverter system 1560 and the power-output 1570.

The inverter-system 1560 will power the electrical motor of the primary-compressor 1511 and the electrical motor of the secondary-compressor 1521.

The power-management-unit of the MCES will control the operation speed of the electrical motor of the primary-compressor 1511 by adjusting the electrical power output from the inverter-system 1560, thereby regulating an operation pressure of the cold-buffer 1515 for the best overall energy efficiency, wherein the power-management-unit may include a buffer-sensor installed in the cold-buffer 1515 to monitor the airflow data (pressure/flow mass/temperature) therein.

The power-management-unit of the MCES will control the operation speed of the electrical motor of the secondary-compressor 1525 by adjusting the electrical power output from the inverter-system 1560, thereby regulating an operation pressure of the reenergize-buffer 1525 for the best overall energy efficiency, wherein the power-management-unit may include a buffer sensor installed in the reenergize-buffer 1525 to monitor the airflow data (pressure/flow mass/temperature) therein.

Now referring to FIG. 33 for the sensor means and the flow regulators associated with the power-management-unit of the MCES.

FIG. 33 shows a set of 5 cold-expansion-chambers which are labeled as 1530a, 1530b, 1530c, 1530d and 1530e.

The components associated with the first-intake-process include the primary-compressor 1511, the cold-buffer 1515, one first-regulator (FR) for adjusting the airflow from the cold-buffer 1515 to each cold-expansion-chamber, and one first-airflow-sensor (FAS) for monitoring the airflow data from the cold-buffer 1515 to each cold-expansion-chamber.

Each first-airflow-sensor (FAS) reports the airflow data of the associated air-passage to the power-management-unit, so that the power-management-unit can adjust the airflow speed of the associated air-passage by the correspondent first-regulator (FR) to prevent an uneven airflow distribution caused by the flow resistance or other factors during the operation of the MCES.

The first-regulator (FR) is a normally-open airflow regulator, which is used to ensure an evenly distribution of the cooled high-boost-air to each cold-expansion-chamber of the cold-expansion-chamber set 1530 during its associated first-intake-process.

The components associated with the second-intake-process include the secondary-compressor 1521, the reenergize-buffer 1525, one second-regulator (SR) for adjusting the airflow from the reenergize-buffer 1525 to each cold-expansion-chamber, and one second-airflow-sensor (SAS) for monitoring the airflow from the reenergize-buffer 1525 to each cold-expansion-chamber.

Each second-airflow-sensor (SAS) reports the airflow data of the associated air-passage to the power-management-unit, so that the power-management-unit can adjust the airflow speed of the associated air-passage by the correspondent second-regulator (SR) to prevent an uneven airflow distribution caused by the flow resistance or other factors during the operation of the MCES.

The second-regulator (SR) is a normally-open airflow regulator, which is used to ensure an evenly distribution of the heated high-boost-air to each cold-expansion-chamber of the cold-expansion-chamber set 1530 during its associated first-intake-process.

The cold-buffer 1515 includes a buffer-temperature-sensor (BTS) and a buffer-pressure-sensor (BPS), which report the airflow data to the power-management-unit.

The reenergize-buffer 1525 includes a buffer-temperature-sensor (BTS) and a buffer-pressure-sensor (BPS), which report the airflow data to the power-management-unit.

Each cold-expansion-chamber (1530a-1530e) includes a chamber-temperature-sensor (CTS) and a surge-pressure-sensor (SPS), which reports the combustion condition to the power-management-unit.

Each chamber-temperature-sensor (CTS) reports the average temperature of the associated cold-expansion-chamber; this is an indication of the heat loss rate of that cold-expansion-chamber, the power-management-unit takes in this data to compute if the injected air-mass of the second-intake-process requires adjustment or the process durations of Mackay Cold-Expansion Cycle requires adjustment to lower the heat loss rate for the best energy efficiency.

Each surge-pressure-sensor (SPS) reports the surge pressure of the associated cold-expansion- chamber; this indicates if the hot-combustion-process is initiated with an air-fuel-mixture of the designated ratio set by the power-management-unit; for the best energy efficiency, the air-fuel-mixture taken in during the first-intake-process should be at a ratio equal to the stoichiometric ratio or lower than the stoichimoetric ratio, so that the reaction energy of the injected fuel is released at a controlled speed and combustion temperature; whereas a particular high surge pressure is an indication that the hot-combustion-process releases the reaction energy too fast and causes excessive heat loss, therefore, the power-management-unit will then adjust the injected fuel-mass and the injected air-mass of the first-intake-process for better energy efficiency.

Each exhaust-air-passage of the cold-expansion-chamber (1530a-1530e) includes an oxygen-sensor (OS) and an exhaust-temperature-sensor (ETS), which reports the data of the expelled cold-expansion-medium to the power-management-unit.

Each oxygen-sensor (OS) reports the oxygen-gas concentration in the expelled cold-expansion-medium from the associated cold-expansion-chamber, which is an indication that if the cold-expansion-process is performed in an oxygen-rich condition; wherein, for the best expansion efficiency during the cold-expansion-process, an adequate amount of heated high-boost-air should be introduced into the cold-expansion-chamber to accelerate the conversion of carbon-monoxide-gas to carbon-dioxide-gas; in other words, the cold-expansion-medium expelled from the associated cold-expansion-chamber should always have a high oxygen concentration regardless of the engine load condition or the power output condition.

If the oxygen-sensor (OS) reports a particular low oxygen concentration for that particular operation condition, the power-management-unit will need to adjust the mass ratio between the injected air-mass of the first-intake-process and the injected air-mass of the second-intake-process, or the power-management-unit will need to adjust the amount of the injected fuel in the fuel-cooling-process, thereby ensuring a cold-expansion-medium is expanding in an oxygen-rich condition for said accelerated conversion.

Each exhaust-temperature-sensor (ETS) reports the temperature of the expelled cold-expansion-medium from the associated cold-expansion-chamber, which is an indication that if the cold-expansion-medium is expanding within the temperature range (400-1100 degree Celsius) for said accelerated conversion.

By taking in the data from abovementioned sensor means, the power-management-unit of the MCES adjust the operation speed of the primary-compressor, the operation speed of the second-compressor, the actuation time of the cold-air-injection means of each cold-expansion-chamber, the actuation time of the reenergize-air-injection means of each cold-expansion-chamber, the first-regulator (FR) of each cold-expansion-chamber, the second-regulator (SR) of each cold-expansion-chamber, the electrical power distributed to the inverter-system 1560, and the electrical power distributed from the generator 1540 to the power-output 1570, thereby ensuring a highly-efficient operation of Mackay Cold-Expansion Cycle.

The fifteenth embodiment shown by FIG. 32 and FIG. 33 operates on the same principles as the other previously mentioned embodiments of MCES; wherein said at least two cold-expansion-chambers of said cold-expansion-chamber set 1530 can employ the active-exhaust-valves or the chamber-wall-ports or a combination of said two exhaust means to expel the cold-expansion-medium; wherein FIG. 36-46 (Process Chart.1-11) are the references on how to configure a Mackay Cold-Expansion Cycle for any particular applications range from high-rpm light-duty applications to low-rpm heavy-duty applications.

Now referring to FIG. 2-7 again for additional details of each process of Mackay Cold-Expansion Cycle:

The first-intake-process as shown in FIG. 2 is the process to supply an air-fuel-mixture into a cold-expansion-chamber, wherein this process may be performed within the range of 210 degree to 360 degree of crankshaft reference angle for high-rpm applications, whereas this process may be performed within the range of 330 degree to 360 degree of crankshaft reference angle for the low-rpm applications.

At the end of the first-intake-process, the air-fuel-mixture can be at a pressure lower than the operation pressure of the cold-buffer in a light load operation; whereas the air-fuel-mixture can be at a pressure higher than the operation pressure of the cold-buffer in the heavy load operation.

The hot-combustion-process as shown in FIG. 3 is the process to ignite an air-fuel-mixture with the spark-plugs or other available spark-ignition means, thereby forming a hot-combustion-medium to expand in the cold-expansion-chamber; wherein this process may be performed within the range of 325 degree (35 degree before TDC) to 60 degree of crankshaft reference angle; as for the low-rpm power generation applications, it is more preferable to trigger the spark-ignition at a crankshaft reference angle near TDC (such as 10 degree BTDC to 10 degree ATDC) for the best efficiency; as for the high-rpm general applications, the spark-ignition has to be triggered at an earlier crankshaft reference angle (such as 35 degree BTDC to 5 degree BTDC) due to the burning speed of the air-fuel-mixture.

The spark-ignition can be initiated in the range of 35 degree BTDC to 45 degree ATDC to perform a Mackay Cold-Expansion Cycle, however, the first-intake-process should be completed before the top-dead-centre of the associated piston (0 degree of crankshaft reference angle).

The fuel-cooling-process as shown in FIG. 4 is the process to reduce the temperature of the hot-combustion-medium by the vaporization process of a second fuel-injection, and this process should start only after most of the oxygen-gas content of the hot-combustion-medium is combusted into a carbon-monoxide-gas, so that the second fuel-injection will not cause temperature surge within the hot-combustion-medium because the injected fuel of this process is vaporized into a fuel-gas, instead of causing further combustion; wherein the process should be performed in the range of 15 degree to 50 degree of crankshaft reference angle.

The fuel-cooling-process may also be disabled if necessary, the reason for disabling this process can be that the MCES is operating in a light load operation or a engine idling operation, therefore the fuel-cooling-process is disabled to save fuel consumption; another reason for disabling this process can be that the MCES is operating in a high-rpm operation that the equipped fuel-injection means is not capable of injecting a precisely controlled amount of fuel within the designated actuation time, therefore the fuel-cooling-process is disabled in a high-rpm operation to prevent the air-pollution or a loss in the energy efficiency.

FIG. 39 (Process Chart.4) provides an example of a simplified Mackay Cold-Expansion Cycle, wherein the fuel-cooling-process is disabled; it should be noted that, in a operation that the fuel-cooling-process is disabled, the second-intake-process is started only after the average pressure of the hot-combustion-medium has decreased to lower than the operation pressure of the reenergize-buffer.

A simplified Mackay Cold-Expansion Cycle will operate in the following order: the first-intake-process, the hot-combustion-process, the second-intake-process, the cold-expansion-process, and the active-exhaust-process (exhaust-process).

The second-intake-process as shown in FIG. 5 is the process to inject a heated high-boost-air to mix with the hot-combustion-medium after the average pressure of the hot-combustion-medium has decreased to lower than the operation pressure of the reenergize-buffer; wherein this process may be performed within the range of 30 degree to 105 degree of crankshaft reference angle.

The temperature of the hot-combustion-medium will be reduced by 30%-80% by the end of the second-intake-process, wherein the injected air-mass of the second-intake-process may range from 50% to 350% of the injected air-mass of the first-intake-process.

The power-management-unit of the MCES is preferably to adjust the operation pressure of the reenergize-buffer and the actuation time of the reenergize-air-injector, such that this second-intake-process is completed at the earliest possible crankshaft reference angle with a injection of adequate amount of heated high-boost-air; wherein, by setting a higher operation pressure of the reenergize-buffer will enable the reenergize-air-injector to perform the second-intake-process at an earlier crankshaft reference angle, however the power-management-unit should also take in the compression efficiency of the air-compression means into account for adjusting the operation pressure, so that the Mackay Cold-Expansion Cycle will not lose energy efficiency due to an excessive workload on the air-compression means.

For a MCES configuring with a low-pressure air-buffer-system, the second-intake-process may take up to 60 degree of crankshaft rotation to complete, since it takes a longer time for the reenergize-air-injector to finish injecting the designated amount of heated high-boost-air for the best energy efficiency.

The second-intake-process is preferably performed with a specialized reenergize-air-injector capable of high-speed operation and precise airflow control, so that the second-intake-process can be completed in the shortest time possible with the designated amount of heated high-boost-air; it should be noted that, if a insufficient amount of heated high-boost-air is injected, it will delay conversion of the carbon-monoxide-gas to the carbon-dioxide-gas, thereby significantly lowering the energy efficiency of Mackay Cold-Expansion Cycle.

The cold-expansion-process as shown in FIG. 1E is the process to produce power with the cold-expansion-medium after the completion of the second-intake-process; wherein this process may be performed within the range of 45 degree 180 degree of crankshaft reference angle.

The power-management-unit will control components of the MCES in such a way that, the cold-expansion-medium is always expanding in an oxygen-rich low-temperature condition regardless of the engine load condition; wherein the oxygen-gas concentration in the cold-expansion-medium will be high enough that the almost all the carbon-monoxide-gas is converted into the carbon-dioxide-gas before the completion of the cold-expansion-process, thereby transforming as much the reaction energy of the fuel as possible into a expansion force to generate power in the cold-expansion-process; at the same time, the heat current conducting from the cold-expansion-chamber into the engine cooling system is minimized, since the temperature of the cold-expansion-medium is regulated within the range of 400-1100 degree Celsius.

In a light load operation or a medium load operation, the expansion temperature of cold-expansion-medium will be about 400-700 degree Celsius during the cold-expansion-process; in the contrast, the conventional engine will generally have an expansion temperature about 1200-1600 degree Celsius during the entire power-stroke.

In a heavy load operation, the expansion temperature of cold-expansion-medium will be about 700-1100 degree Celsius during the cold-expansion-process; in the contrast, the conventional engine will generally have an expansion temperature about 1600-1800 degree Celsius during the entire power-stroke.

The active-exhaust-process (or the exhaust-process) as shown in FIG. 1F is the process to expel the cold-expansionmedium out of the cold-expansion-chamber with the exhaust-means; wherein, this process may be performed in the range from 120 degree to 345 degree of crankshaft reference angle depending on the applications and the types of the exhaust-means.

For an exhaust-process that uses only the chamber-wall-port to expel the cold-expansion-medium, the chamber-wall-port will generally configured in such a way that, the exhaust-process is performed within the range of 105 degree to 225 degree of crankshaft reference angle.

For a combined-exhaust-process that utilize both the chamber-wall-port and the active-exhaust-valves as the exhaust means to expel the cold-expansion-medium, the chamber-wall-port may expel the cold-expansion-medium within the range of 105 degree to 225 degree of crankshaft reference angle, in the same cycle the active-exhaust-valve may expel the cold-expansion-medium within the range of 180 degree to 330 degree of crankshaft reference angle.

Now referring to FIG. 34 for a cold-expansion-chamber 1620 specialized for the operation of Mackay Cold-Expansion Cycle, which utilizes a combination of the active-exhaust-valve 1629 and the chamber-wall-port 1628 for performing the combined-exhaust-process of Mackay Cold-Expansion Cycle; an exemplary control method is provided as follows:

The components are labeled as the cold-expansion-chamber 1620, the chamber-wall-port 1628, the active-exhaust-valve 1629, the spark-plug 1680, the cold-air-injector 1672, the reenergize-air-injector 1677, the fuel-injector 1670, the piston 1622, and the crankshaft 1600.

In a light load operation of the MCES, the active-exhaust-valve 1629 is shut during the entire cycle of Mackay Cold-Expansion Cycle, so the cold-expansion-medium will flow out of the cold-expansion-chamber from 135 degree to 225 degree of crankshaft reference angle; therefore a portion of the cold-expansion-medium is remained in the cold-expansion-chamber 1620 by the end of the combined-exhaust-process, and the remained cold-expansion-medium will be mixed with the cooled high-boost-air of the next first-intake-process.

In a heavy load operation of the MCES, the active-exhaust-valve 1629 will open from about 180 degree to 300 degree of crankshaft reference angle, therefore the cold-expansion-medium is expelled through the chamber-wall-port 1628 from 135 degree to 225 degree of crankshaft reference angle, while the cold-expansion-medium is also expelling through the active-exhaust-valve 1629 from 180 degree to 300 degree of crankshaft reference angle, thereby the cold-expansion-medium is expelled with a minimized pumping loss and the cooled high-boost-air can be completely filled into the cold-expansion-chamber 1620 for the next first-intake-process to produce a high power output.

In the abovementioned two operations of the MCES, the pumping loss of the combined-exhaust-process is minimized for a better energy efficiency.

Now referring to FIG. 35 for another specialized cold-expansion-chamber 1720 for the operation of Mackay Cold-Expansion Cycle, wherein the cold-expansion-chamber consists of multiple chamber-wall-ports and multiple reenergize-air-injectors for further reducing the heat-loss and the pumping-loss.

The components are labeled as the cold-expansion-chamber 1720, the chamber-wall-ports 1728, the spark-plug 1780, the cold-air-injector 1772, the reenergize-air-injectors 1777, the fuel-injector 1770, the piston 1722, and the crankshaft 1700.

During the cold-expansion-process, the reenergize-air-injectors 1777 will inject the heated high-boost-air at multiple points, which increases the airflow speed and shorten the time required for the second-intake-process, and the hot-combustion-medium will be cooled at a faster rate.

During the exhaust-process, the cold-expansion-medium is expelled out through the chamber-wall-ports in multiple directions.

The abovementioned embodiments may interchange the components to develop further advanced embodiment, wherein FIG. 36-46 (Process Chart.1-11) may serve as references to configure a MCES for any particular applications range from the high-rpm light-duty application to the low-rpm heavy-duty application:

The abbreviations used in the process charts are:
First-Intake-Process: FIP
Second-Intake-Process: SIP
Hot-Combustion-Process: HCP
Fuel-Cooling-Process: FCP
Cold-Expansion-Process: CEP
Active-Exhaust-Process: AEP
Exhaust-Process: EP
Spark-Ignition: SI
Top-Dead-Centre: TDC
Bottom-Dead-Centre: BDC FIG. 36 (Process Chart.1) to FIG. 38 (Process Chart.3) demonstrate the change in the process duration that may be required to set a MCES for a high-rpm application; wherein the second-intake-process is shifted due to the different actuation time of the reenergize-air-injectors, as the reenergize-air-injector can only be initiated at a time that the average pressure of the hot-combustion-medium has decreased to lower than the operation pressure of the reenergize-buffer.

FIG. 39 (Process Chart.4) demonstrates a Simplified Mackay Cold-Expansion Cycle with chamber-wall-port, this chart can be used as a reference for the MCES utilizing a chamber-wall-port without the fuel-cooling-process.

FIG. 40 (Process Chart.5) demonstrates a Mackay Cold-Expansion Cycle with chamber-wall-port, this chart can be used as a reference for the MCES utilizing a chamber-wall-port.

Figure 41:
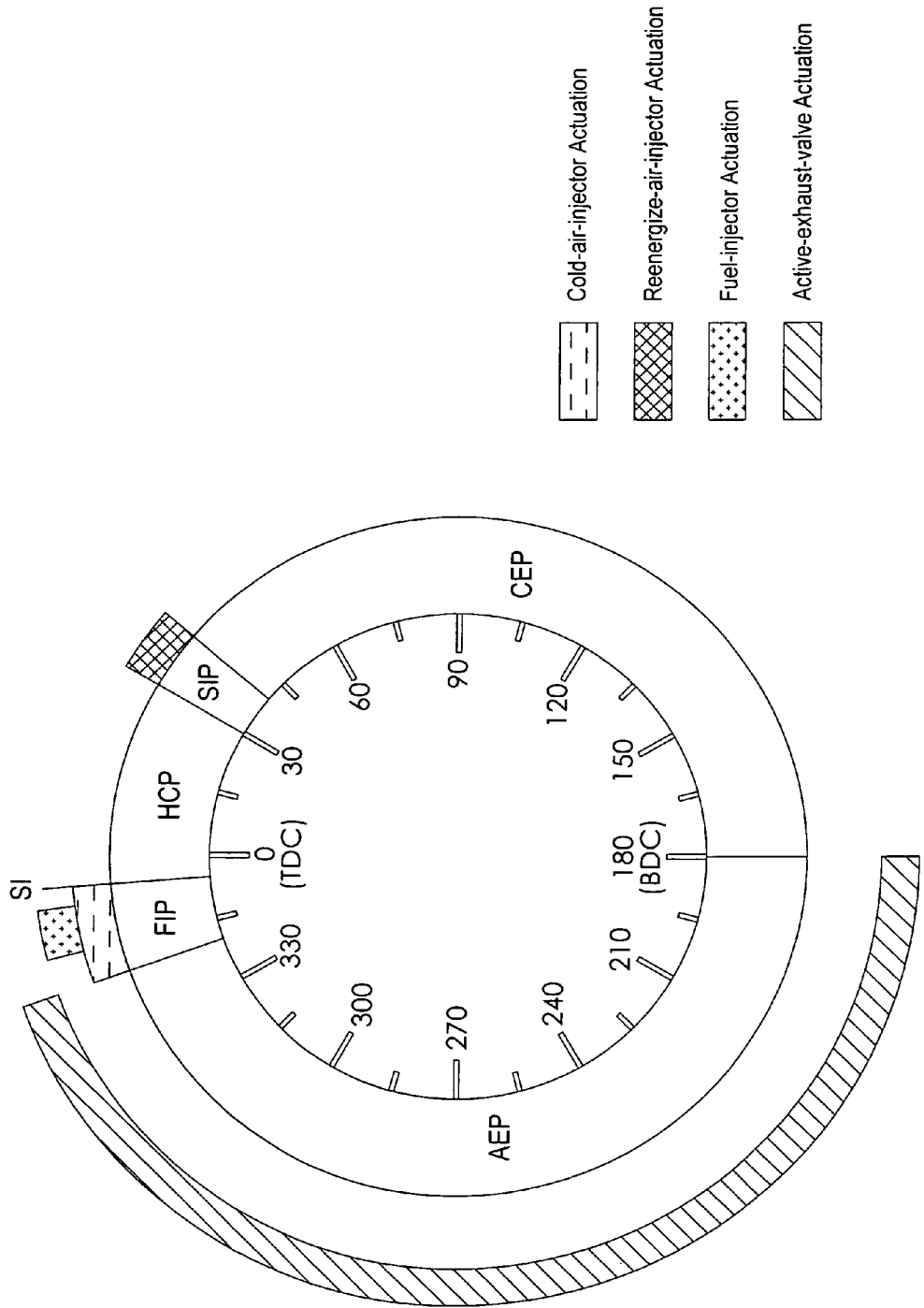

FIG. 41 (Process Chart.6) demonstrates a light load operation of Mackay Cold-Expansion Cycle, this chart can be used as a reference for the low-rpm heavy duty MCES; wherein, it can be noted that the first-intake-process is relatively close to the TDC position, while most of the cold-expansion-medium is expelled out of the cold-expansion-chamber due to the late closing of the active-exhaust-valve.

Figure 42:
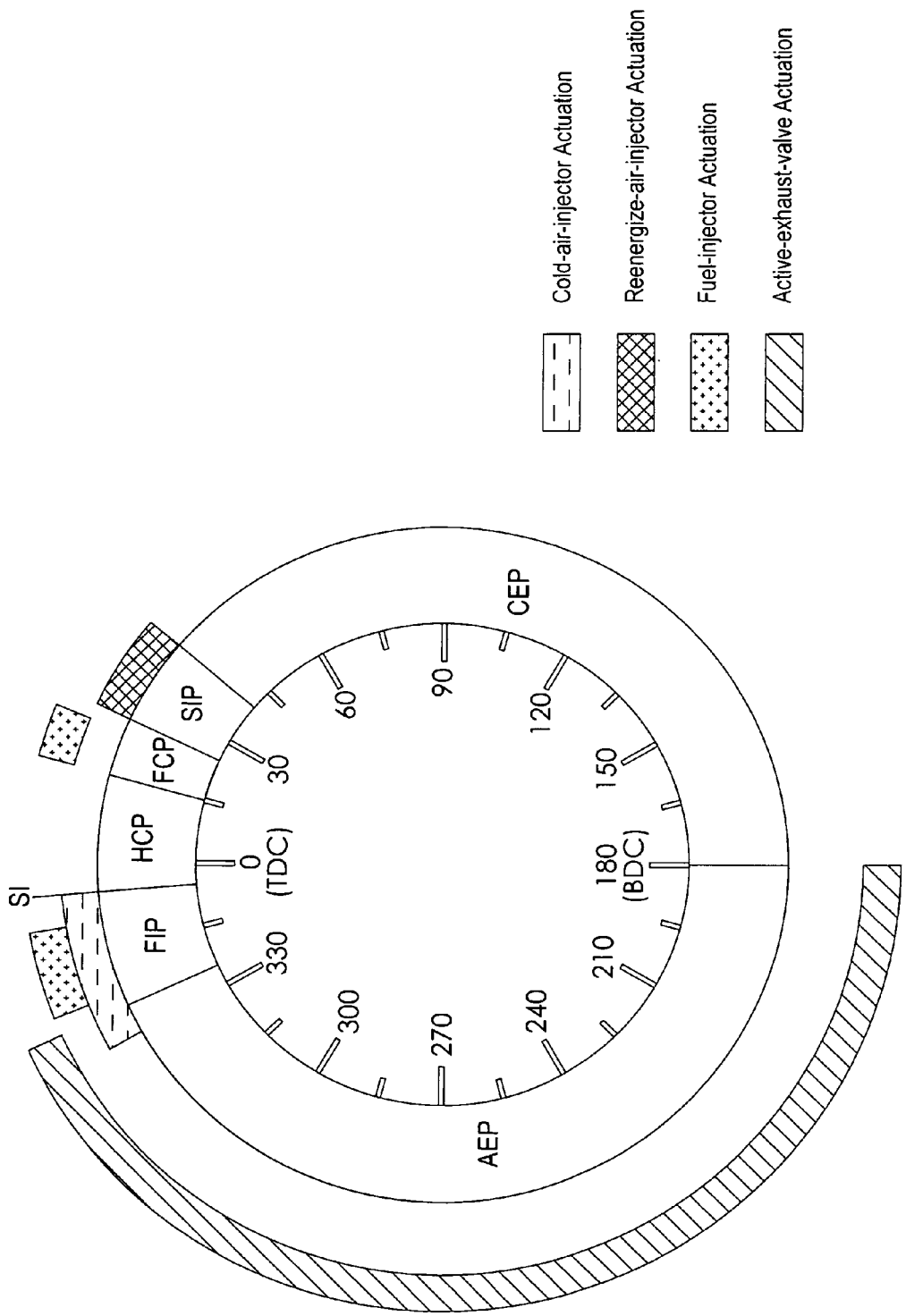
FIG. 42 (Process Chart.7) demonstrates a medium load operation of Mackay Cold-Expansion Cycle for low-rpm heavy-duty engine applications, wherein the first-intake-process is generally commencing near the TDC position due to the low revolution speed.

FIG. 42 (Process Chart.7) demonstrates a medium load operation of Mackay Cold-Expansion Cycle, this chart can be used as a reference for the low-rpm heavy duty MCES; wherein, it can be noted that the closing timing of the active-exhaust-valve is overlapping with the cold-air-injectors to expel out all the cold-expansion-medium; this cause the cold-expansion-medium to be pushed out by the cooled high-boost-air at the beginning of the first-intake-process.

Figure 43:
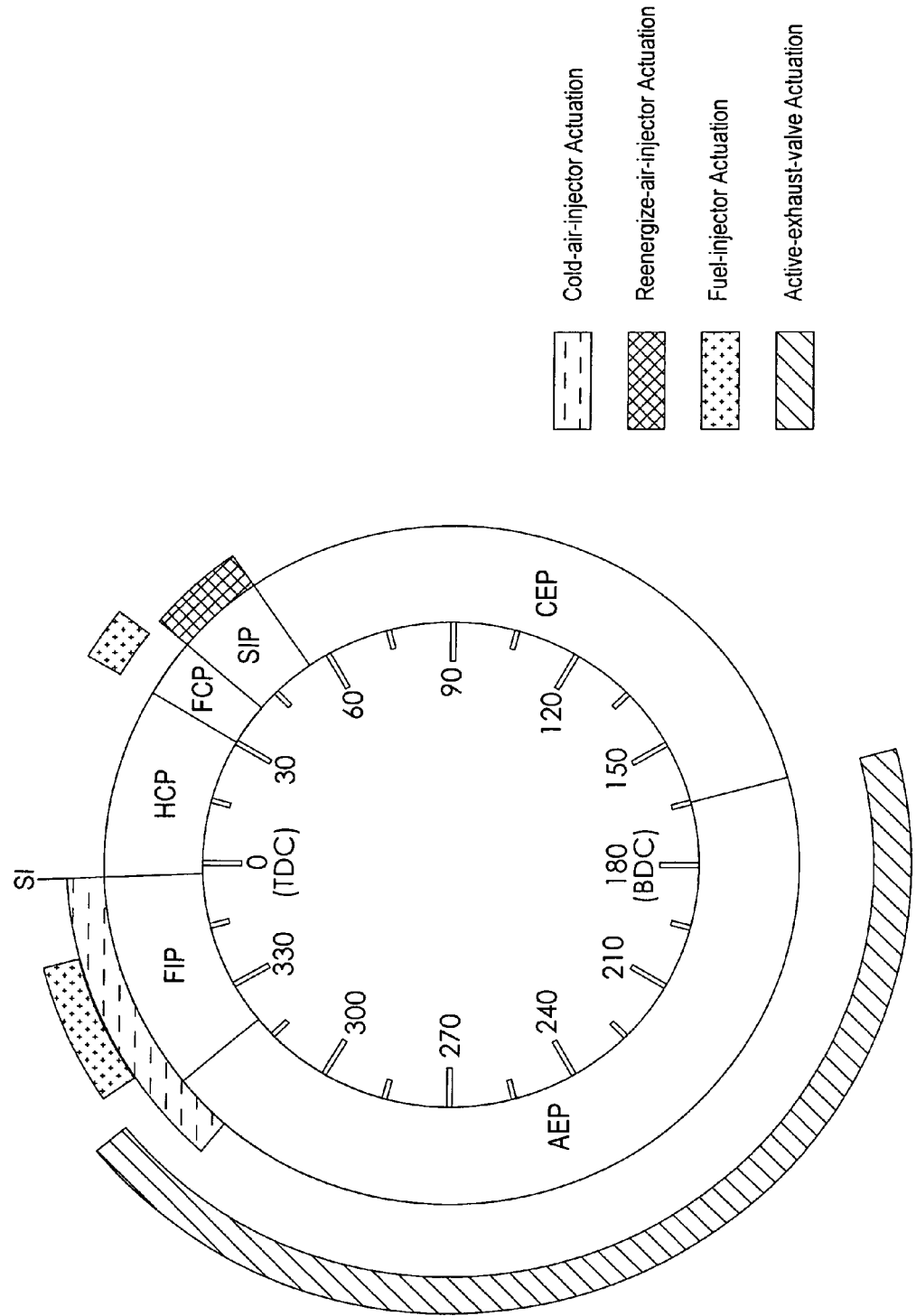
FIG. 43 (Process Chart.8) demonstrates a heavy load operation of Mackay Cold-Expansion Cycle for low-rpm heavy-duty engine applications, wherein the first-intake-process is generally commencing near the TDC position due to the low revolution speed.

FIG. 43 (Process Chart.8) demonstrates a heavy load operation of Mackay Cold-Expansion Cycle, this chart can be used as a reference for the low-rpm heavy duty MCES; wherein, it can be noted that the cold-air-injector is opened from an earlier crankshaft reference angle, and the active-exhaust-valve is closed at an earlier crankshaft reference angle, thereby filling in more fresh cooled high-boost-air to produce a higher power output.

FIG. 44 (Process Chart.9) demonstrates an operation of Mackay Cold-Expansion Cycle with the spark-ignition delayed to after the top-dead-centre; wherein it can be noted that the cold-air-injector finishes the air-injection of the first-intake-process before the top-dead-centre of the piston, and the spark-ignition is performed after the top-dead-centre.

FIG. 45 (Process Chart.10) demonstrates an operation of Mackay Cold-Expansion Cycle for the MCES that utilize a low-pressure type air-buffer-system; wherein, it can be noted that the first-intake-process has to be started relatively earlier due to low airflow speed of the cold-air-injector, the second-intake-process is also taking relatively longer to complete than other MCES configuration due to the low airflow speed of the reenergize-air-injector.

FIG. 46 (Process Chart.11) demonstrates an operation of the simplified Mackay Cold-Expansion Cycle for the MCES that utilize a low-pressure type air-buffer-system and disables the fuel-cooling-process.

To summarize the concept and the effects of the Mackay Cold-Expansion Cycle, the MCES will operate with an extremely low heat loss, which is about 7%-15% of the total fuel energy, wherein the temperature of the exhaust-gas will also reduce by more than 50% in comparison with the conventional engine, and the most significant difference is that the MCES performs the earlier portion of the power-stroke in a stoic (or rich-burn) condition, and performs the later portion of the power-stroke in a low-temperature oxygen-rich condition that allows the oxygen-gas to react spontaneously with the carbon-monoxide-gas to produce more expansion force; in the contrast, a large portion of the fuel energy is dissipated in the catalytic converter and the exhaust tailpipe of the conventional engine.

As a supplementary note, Mackay Cold-Expansion Cycle is capable of operating with multiple fuel sources; as in the example shown in the sixth embodiment, the first-intake-process can supply an air-fuel-mixture consisting of gasoline, and the fuel-cooling-process can inject a fuel of diesel or natural gas or other combustible fuel with lower octane.

The fuel source of a MCES can be gasoline, natural gas, CNG, ethanol, hydrogen, diesel, or any other types of spark-combustible fuel.

The operation pressure of the reenergize-buffer may be adjusted to a higher pressure, thereby increase the airflow speed and initiate the second-intake-process at an earlier crankshaft reference angle in a heavier load operation; it should be noted that this operation pressure should be constant during the entire actuation-time of the reenergize-air-injectors but this operation pressure may be set higher a smoother operation of the second-intake-process, an example is provided as follows:

In a light load operation of the MCES, the power-management-unit sets the operation pressure of the reenergize-buffer at 8 bar, therefore, during the actuation time of the reenergize-air-injector from 30 degree to 40 degree of crankshaft reference angle, the pressure in the reenergize-buffer is maintained at 8 bar in the entire duration of the second-intake-process.

In a heavy load operation of the MCES, the power-management-unit sets the operation pressure of the reenergize-buffer at 12 bar, therefore, during the actuation time of the reenergize-air-injector from 45 degree to 55 degree of crankshaft reference angle, the pressure in the reenergize-buffer is maintained at 12 bar in the entire duration of the second-intake-process; this also increases the airflow speed to enable the reenergize-air-injector to inject more heated high-boost-air in the heavy load operation.

The computation circuit of the power-management-unit may take in the parameters such as the compression efficiency of said air-compressor means, the crankshaft rpm, the spark-ignition timing, the oxygen-gas concentration of the expelled cold-expansion-medium, the airflow data (pressure/airflow-volume/temperature) of the expelled cold-expansion-medium, the airflow data (pressure/temperature) of the reenergize-buffer, the surge-pressure data (surge pressure during the entire down-stroke), and the chamber temperature data (an indication of the heat-loss), thereby configuring the component settings of the MCES for the optimal energy efficiency.

The air-compression means of the MCES may be a scroll-type air-compressor, a screw-type air-compressor, a rotary-type air-compressor, a piston-type air-compressor, a vane-type air-compressor, an axial-turbine type air-compressor, or a centrifugal-turbine type air-compressor; wherein air-compression means requires to be operate at a controlled speed requested by the power-management-unit of the MCES to sustain the operation pressures in the air-buffer-system; wherein said air-compression means can be powered by a transmission coupled to the crankshaft of the cold-expansion-chamber or powered by an electrical motor and an inverter-system.

Many advanced embodiments of Mackay Cold-Expansion Engine System can also be developed by combining or interchanging the components mentioned in the disclosed embodiments for operating the Mackay Cold-Expansion Cycle at a high efficiency.

The invention claimed is:

1. A Cold-Expansion Engine System comprising:
a) at least two cold-expansion-chambers and a power-management-unit, wherein each cold-expansion-chamber includes a piston, a cold-air-injection means, a reenergize-air-injection means, a fuel-supplying means, a spark-ignition means, and an exhaust-means;
b) a cold-buffer for buffering a cooled compressed-air to the cold-air-injection means of said at least two cold-expansion-chambers;
c) a reenergize-buffer for buffering a heated compressed-air to the reenergize-air-injection means of said at least two cold-expansion-chambers;
d) an air-compressor and a compressor-transmission means for providing compressed-air; and
e) said power-management-unit controls all said cold-air-injection means, reenergize-air-injection means, fuel-supplying means, and compressor-transmission to operate each cold-expansion-chamber in a Cold-Expansion Cycle consisting of a first-intake-process, a hot-combustion-process, a fuel-cooling-process, a second-intake-process, a cold-expansion-process, and an exhaust-process, wherein:
said cold-air-injection means and said fuel-supplying means supply an air-fuel-mixture in the first-intake-process;
said air-fuel-mixture is ignited to form a hot-combustion-medium in the hot-combustion-process;
said hot-combustion-medium is cooled by a fuel-injection in the fuel-cooling-process;
said hot-combustion-medium further cooled, after the fuel-cooling-process, by injecting a heated compressed-air to form a cold-expansion-medium in the second-intake-process, wherein, the second-intake-process is commenced within a range between 30 degree after-top-dead-centre of the associated piston and 105 degree after-top-dead-centre of the associated piston; and
said cold-expansion-medium produces power, with a spontaneous combustion of carbon-monoxide and oxygen at a temperature range of 400-1100 degree Celsius, in the cold-expansion-process.

2. A Cold-Expansion Engine System as defined in claim 1, wherein said power-management-unit includes a computation means for computing an actuation-time of each reenergize-air-injector based on the airflow data of said reenergize-buffer and the temperature data of the cold-expansion-medium.

3. A Cold-Expansion Engine System as defined in claim 2, wherein said power-management-unit adjusts the air-pressure in said reenergize-buffer according to engine load.

4. A Cold-Expansion Engine System as defined in claim 3, wherein the power-management-unit disables the fuel-cooling-process of the Cold-Expansion Cycle in a light load operation or in a high-rpm operation.

5. A Cold-Expansion Engine System as defined in claim 4 further comprising:
   f) a turbo-compressor and a turbo-turbine for producing a compressed-air to said air-compressor;
   g) a heat-transfer-catalytic-converter for heating compressed air in said reenergized-buffer; and
   h) said power-management-unit determines an optimal duration of the second-intake-process based on an engine speed data, a compression efficiency data, a spark-ignition timing data, an oxygen-concentration data of the cold-expansion-medium, and an airflow data of the cold-expansion-medium for minimizing heat loss.

6. A Cold-Expansion Engine System as defined in claim 5, wherein the exhaust-means of each cold-expansion-chamber is a chamber-wall-port.

7. A Premix-Intake Cold-Expansion Engine System comprising:
   a) an air-compressor for providing a source of compressed air, which supplies to a cold-buffer and a reenergize-buffer;
   b) a cold-expansion-chamber including a piston, an reenergize-air-injection means, a mixture-injection means, a spark-ignition means, a fuel-injection means, and an exhaust-means;
   c) a cold-buffer for buffering a cooled compressed-air to a premix-chamber through a non-return valve;
   d) a reenergize-buffer for buffering a heated compressed-air to the reenergize-air-injection means; and
   e) a power-management-unit for operating a Cold-expansion Cycle in said cold-expansion-chamber, wherein:
      a hot-combustion-medium is produced by igniting an air-fuel-mixture in a hot-combustion-process;
      a fuel is injected, after said hot-combustion-process, for cooling the hot-combustion-medium by vaporization; and
      a heated compressed air is injected, by said reenergize-air-injection means, into said hot-combustion-medium in a second-intake-process for cooling said hot-combustion-medium to at a temperature lower than 1100 degree Celsius.

8. A Premix-Intake Cold-Expansion Engine System as defined in claim 7 further comprises a heat-transfer-catalytic-converter for heating up a compressed-air in said reenergize-buffer.

9. A series-hybrid type Cold-Expansion Engine System comprising:
   a) a cold-expansion-chambers that includes a piston, a cold-air-injection means, a reenergize-air-injection means, a fuel-supplying means, a spark-ignition means, and an exhaust-means for performing a Cold-Expansion Cycle consisting of a first-intake-process, a hot-combustion-process, a fuel-cooling-process, a second-intake-process, a cold-expansion-process, and an exhaust-process;
   b) a cold-buffer for buffering and supplying a compressed-air to said cold-air-injection means, which injects a calculated amount of compressed air in the first-intake-process;
   c) a reenergize-buffer for buffering and supplying a heated compressed-air to said reenergize-air-injection means, which injects a calculated amount of heated compressed-air between 30 degree after-top-dead-centre of the piston and 105 degree after-top-dead-centre of the piston; and
   d) an air-compressor for providing a source of compressed-air to said cold-buffer and said reenergize-buffer.

10. A series-hybrid type Cold-Expansion Engine System as defined in claim 9 further comprising:
   e) a wheel-motor;
   f) a generator and an inverter-system for driving said air-compressor and wheel-motor;
   g) a turbo-compressor and a turbo-turbine for producing a compress-air to said air-compressor;
   h) a heat-transfer-catalytic-converter for heating compressed air in said reenergize-buffer; and
   i) a power-management-unit for controlling all said cold-air-injection means, reenergize-air-injection means, fuel-supplying means, spark-ignition means, and exhaust-means, wherein:
      a fuel-rich air-fuel-mixture is ignited to produce a hot-combustion-medium in the hot-combustion-process; and
      a calculated amount of heated compressed-air is injected into the hot-combustion-medium in the second-intake-process, forming a low-temperature oxygen-rich cold-expansion-medium.

11. A Cold-Expansion Engine System comprising:
   a) a cold-expansion-chambers which includes a cold-air-injection means, a reenergize-air-injection means, a fuel-supplying means, a spark-ignition means, and an exhaust-means for operating a Cold-expansion Cycle consisting of a first-intake-process, a hot-combustion-process, a second-intake-process, a cold-expansion-process, and an exhaust-process;
   b) an air-compressor for providing a source of compressed air;
   c) an air-buffer-system for supplying a cooled compressed-air, to said cold-air-injection-means, and a heated compressed-air, to said reenergize-air-injection-means; and
   d) a power-management-unit for controlling all said cold-air-injection means, reenergize-air-injection means, fuel-supplying means, spark-ignition means, and exhaust-means, wherein:
      the first-intake-process is performed by supplying an air-fuel-mixture into said cold-expansion-chamber before the top-dead-centre position of said piston;
      the hot-combustion-process is performed by igniting said air-fuel-mixture to a hot-combustion-medium;
      the second-intake-process is performed by injecting a heated compressed-air into the hot-combustion-medium between 30 degree after-top-dead-centre of the piston and 105 degree after-top-dead-centre of the piston;
      the cold-expansion-process is performed by producing power with a cold-expansion-medium at a temperature of 400-1100 degree Celsius; and
      the exhaust-process is performed by expelling the cold-expansion-medium with said exhaust-means.

12. A Cold-Expansion Engine System as defined in claim 11, wherein a fuel-cooling-process is effected by injecting a calculated amount of fuel into cool said hot-combustion-medium.

13. A Cold-Expansion Engine System as defined in claim 12 further comprising:
   e) a heat-transfer-catalytic-converter for heating compressed-air in said air-buffer-system; and
   f) a computation means for determining an optimal duration of the second-intake-process based on an engine speed data, a compression efficiency data, a spark-ignition timing data, an oxygen-concentration data of the cold-expansion-medium, and an airflow data of the cold-expansion-medium.

14. A Cold-Expansion Engine System as defined in claim 13, wherein said fuel-supplying means supplies a high octane fuel in the first-intake-process, and said fuel-supplying means supplies a low octane fuel in the fuel-cooling-process.

* * * * *